US011697327B2

(12) United States Patent
Fukui

(10) Patent No.: US 11,697,327 B2
(45) Date of Patent: Jul. 11, 2023

(54) VEHICLE DOOR WINDOW GLASS SUPPORT STRUCTURE

(71) Applicant: SHIROKI CORPORATION, Fujisawa (JP)

(72) Inventor: Katsuhisa Fukui, Fujisawa (JP)

(73) Assignee: AISIN CORPORATION, Kariya (JP)

( * ) Notice: Subject to any disclaimer, the term of this patent is extended or adjusted under 35 U.S.C. 154(b) by 415 days.

(21) Appl. No.: 16/761,361

(22) PCT Filed: Nov. 9, 2018

(86) PCT No.: PCT/JP2018/041681
§ 371 (c)(1),
(2) Date: May 4, 2020

(87) PCT Pub. No.: WO2019/093484
PCT Pub. Date: May 16, 2019

(65) Prior Publication Data
US 2021/0170835 A1 Jun. 10, 2021

(30) Foreign Application Priority Data

Nov. 10, 2017 (JP) ................................. 2017-217809

(51) Int. Cl.
*B60J 5/04* (2006.01)
*B60J 1/17* (2006.01)
(Continued)

(52) U.S. Cl.
CPC .............. *B60J 1/17* (2013.01); *E05F 15/689* (2015.01); *E05F 11/382* (2013.01);
(Continued)

(58) Field of Classification Search
CPC .. B60J 1/17; B60J 10/76; B60J 5/0402; E05F 15/689; E05F 11/382; E05F 11/483;
(Continued)

(56) References Cited

U.S. PATENT DOCUMENTS 2,132,104 A * 10/1938 Froeliger ................. B60J 10/74
49/440
3,385,000 A * 5/1968 Sturtevant ................ B60J 10/74
49/431

(Continued)

FOREIGN PATENT DOCUMENTS

CN 101132940 A 2/2008
CN 104144808 A 11/2014
(Continued)

OTHER PUBLICATIONS

Office Action (The First Office Action) dated Mar. 29, 2021, by the State Intellectual Property Office of People's Republic of China in corresponding Chinese Patent Application No. 201880072426.4 and an English Translation of the Office Action. (14 pages).

(Continued)

*Primary Examiner* — Jerry E Redman
(74) *Attorney, Agent, or Firm* — Buchanan Ingersoll & Rooney PC

(57) ABSTRACT

A vehicle door window glass support structure includes: a sash part protruding upward with respect to the door panel; and window glass that is elevated or lowered along the sash part, in which the sash part includes a glass position regulating means that determines the position of the window glass in both vehicle interior and exterior directions and an intersecting direction that intersects the vehicle interior and exterior directions at least at a position where the window glass is elevated most. This configuration makes it possible to improve the position accuracy of the window glass with respect to the sash part, enhancing the appearance quality and the support performance of the window glass.

4 Claims, 27 Drawing Sheets

(51) Int. Cl.
*E05F 15/689* (2015.01)
*E05F 11/38* (2006.01)

(52) U.S. Cl.
CPC ... *E05Y 2201/664* (2013.01); *E05Y 2201/668* (2013.01); *E05Y 2201/684* (2013.01); *E05Y 2900/55* (2013.01)

(58) Field of Classification Search
CPC ......... E05Y 2201/664; E05Y 2201/668; E05Y 2201/684; E05Y 2900/55
USPC .................................................. 49/349, 441
See application file for complete search history.

(56) References Cited

U.S. PATENT DOCUMENTS

| | | | | |
|---|---|---|---|---|
| 3,703,053 A * | 11/1972 | De Rees | ............ | B60J 1/17 49/440 |
| 3,763,596 A * | 10/1973 | Anderson | ............ | B60J 10/75 49/492.1 |
| 4,561,211 A * | 12/1985 | Raley | ............ | B60J 10/40 49/374 |
| 4,633,613 A | 1/1987 | Kobayashi et al. | | |
| 4,663,888 A * | 5/1987 | Okamoto | ............ | B60J 1/17 49/489.1 |
| 4,716,682 A * | 1/1988 | De Rees | ............ | B60J 1/17 49/374 |
| 4,788,795 A * | 12/1988 | Pinsonneault | ............ | E05F 11/426 49/362 |
| 4,932,161 A * | 6/1990 | Keys | ............ | B60J 10/32 49/374 |
| 5,012,613 A * | 5/1991 | Sekine | ............ | E05F 15/689 49/362 |
| 5,035,083 A * | 7/1991 | Kruzich | ............ | E05D 13/1276 49/352 |
| 5,054,242 A * | 10/1991 | Keys | ............ | B60J 10/84 49/377 |
| 5,524,388 A * | 6/1996 | Chowdhury | ............ | B60J 10/75 49/377 |
| 5,771,637 A * | 6/1998 | Oikawa | ............ | E05F 11/382 49/416 |
| 5,943,823 A * | 8/1999 | Yoshida | ............ | B60J 5/0402 49/416 |
| 6,305,125 B1 * | 10/2001 | Nozaki | ............ | B60J 1/17 49/419 |
| 6,430,878 B2 * | 8/2002 | Terasawa | ............ | B60R 13/07 49/416 |
| 6,631,586 B1 * | 10/2003 | Nakagomi | ............ | E05F 15/689 49/362 |
| 7,062,880 B2 * | 6/2006 | Renke | ............ | B60J 1/17 49/416 |
| 7,313,888 B2 * | 1/2008 | Ku | ............ | B60J 10/00 49/478.1 |
| 7,421,823 B2 * | 9/2008 | Yoshida | ............ | B60S 1/0411 49/416 |
| 7,726,075 B2 * | 6/2010 | Gross | ............ | B60J 10/15 49/415 |
| 8,650,802 B2 * | 2/2014 | Grudzinski | ............ | B60J 10/7775 49/502 |
| 8,701,349 B2 * | 4/2014 | Krause | ............ | B60J 10/79 49/374 |
| 10,427,511 B2 * | 10/2019 | Blottiau | ............ | B60J 10/79 |
| 10,562,385 B2 * | 2/2020 | Krause | ............ | B60J 10/79 |
| 10,787,851 B2 * | 9/2020 | Freymuth | ............ | B60J 1/17 |
| 10,844,643 B2 * | 11/2020 | Freymuth | ............ | E05F 7/00 |
| 2004/0084931 A1 * | 5/2004 | Omori | ............ | B60J 1/16 296/146.16 |
| 2005/0120502 A1 * | 6/2005 | Yoshida | ............ | B60S 1/0411 15/250.1 |
| 2007/0194601 A1 * | 8/2007 | Karumuri | ............ | B60J 5/0416 296/146.7 |
| 2008/0224501 A1 * | 9/2008 | Zimmer | ............ | B60J 10/78 296/201 |
| 2008/0252097 A1 | 10/2008 | Miyamoto et al. | | |
| 2009/0001755 A1 * | 1/2009 | Fuetterer | ............ | B60J 5/0409 296/146.16 |
| 2015/0048646 A1 | 2/2015 | Yokota | | |
| 2016/0121701 A1 | 5/2016 | Yoshida et al. | | |
| 2016/0129767 A1 * | 5/2016 | Nojiri | ............ | B60J 10/76 49/459 |
| 2017/0087969 A1 * | 3/2017 | Dosaki | ............ | B60J 10/79 |
| 2019/0176579 A1 * | 6/2019 | Takahashi | ............ | B60J 5/0402 |
| 2020/0148165 A1 * | 5/2020 | Schmidt | ............ | B60H 1/243 |
| 2022/0032745 A1 * | 2/2022 | Toyota | ............ | B60J 5/0402 |

FOREIGN PATENT DOCUMENTS

| | | |
|---|---|---|
| CN | 105246723 A | 1/2016 |
| EP | 2 607 127 A2 | 6/2013 |
| JP | 60157883 U | 10/1985 |
| JP | 2004149045 A | 5/2004 |
| JP | 2005255108 A | 9/2005 |
| JP | 2010106548 A | 5/2010 |
| JP | 2014234040 A | 12/2014 |
| JP | 2015021318 A | 2/2015 |
| WO | 2017/076511 A1 | 5/2017 |

OTHER PUBLICATIONS

Office Action (Notice of Reasons for Refusal) dated Jun. 22, 2021, by the Japanese Patent Office in corresponding Japanese Patent Application No. 2017-217809 and an English Translation of the Office Action. (7 pages).

International Search Report (PCT/ISA/210) and translation and Written Opinion (PCT/ISA/237) dated Dec. 18, 2018, by the Japanese Patent Office as the International Searching Authority for International Application No. PCT/JP2018/041681.

* cited by examiner

VEHICLE DOOR WINDOW GLASS SUPPORT STRUCTURE

TECHNICAL FIELD

The present invention relates to a vehicle door window glass support structure.

BACKGROUND ART

In a vehicle door having window glass that is elevated or lowered with respect to a door panel, a glass elevating/lowering device (window regulator) performs elavating/lowering operation of the window glass while determining the position of the window glass. Specifically, in the case of a side door of a vehicle, the glass elevating/lowering device supports the window glass so as to regulate the position in the vehicle interior and exterior directions and the front-rear direction while movably operating the window glass in the elevating/lowering (vertical) directions.

For example, in the glass elevating/lowering device of Patent Literature 1, a guide rail extending in the elevating/lowering directions is attached to an inner panel of a door, and the glass elevating/lowering device performs elevating/lowering operation while sliding a slider that supports the window glass with respect to the guide rail. The slider movement is regulated in the vehicle interior and exterior directions and in the front-rear directions with respect to the guide rail, thereby stabling supporting the window glass. Various types of glass elevating/lowering devices have been proposed in addition to this, such as those that use a rotating arm to support the window glass, and it is necessary, in all of these, to stabilize the window glass in a direction other than the elevating/lowering directions.

CITATION LIST

Patent Literature

Patent Literature 1: Japanese Patent Application Laid-Open Publication No. 2015-21318

SUMMARY OF INVENTION

Technical Problem

Since the window glass in the fully closed state is held in a state in which its peripheral edge is sealed along a sash part of the door and the vehicle body, it is particularly necessary to ensure position accuracy for a portion (sash part or the like) located along the peripheral edge of the window glass in the fully closed state. In a glass elevating/lowering device as disclosed in Patent Literature 1, a guide rail serving as a position reference of the window glass is attached to an inner panel of the door. In other words, the location where the window glass position is regulated (the guide rail) is separated from the location where the position accuracy with respect to the window glass is required (the sash part). This leads to a problem that a highly strict accuracy control is required in consideration of an error in assembling the guide rail to the inner panel, an accuracy error between the inner panel and the sash part, or the like.

In recent years, there have been diversified door designs including a configuration with increasing popularity in which the outer surface of the sash part of the door is substantially flush with the window glass. This type of door is required to achieve higher position accuracy for the window glass with respect to the sash part, and thus needs to perform more facilitated and reliable position control between the window glass and the sash part.

The present invention has been made on the basis of the above awareness of the problems, and aims to provide a vehicle door window glass support structure capable of achieving excellent position accuracy in the window glass with respect to the sash part.

Solution to Problem

A vehicle door window glass support structure of the present invention includes: a sash part protruding upward with respect to the door panel; and window glass that is elevated or lowered along the sash part, in which the sash part includes a glass position regulating means that determines the position of the window glass in both vehicle interior and exterior directions and an intersecting direction that intersects the vehicle interior and exterior directions at least at a position where the window glass is elevated most.

As an example, the glass position regulating means includes a guide section that is provided in the sash part and is surrounded by a pair of walls arranged opposite the vehicle interior and exterior directions and a pair of walls arrange opposite the intersecting direction so as to be continuous to a longitudinal direction of the sash part. There is provided a slider that is secured to the window glass and slidably inserted into the guide section of the guide rail, and the position of the window glass is determined by the slider and walls of the guide section.

It is preferable to have a configuration in which the sash part includes a guide rail that is open toward the vehicle exterior side and extends in the longitudinal direction of the sash part and that internally includes a guide section, and the window glass is positioned on the vehicle exterior side of the guide rail. In this case, the slider includes: a glass securing part secured to a vehicle interior side surface of the window glass arranged opposite an open portion of the guide rail; and a sliding part located at vehicle interior side with respect to the glass securing part so as to be slidably disposed in the guide section.

It is preferable that the sliding part of the slider includes: a sliding base having a solid structure that brings an outer surface into contact with walls forming the guide section; a first elastic contact part provided at different position in the longitudinal direction of the sash part with respect to the sliding base and elastically deformably coming in contact with at least one of a pair of the walls arranged opposite the intersecting direction out of the guide section; and a second elastic contact part provided at different position in the longitudinal direction of the upright pillar sash with respect to the sliding base and elastically deformably coming in contact with at least one of a pair of the walls arranged opposite the vehicle interior and exterior directions out of the guide section.

It is possible to have a configuration in which a door sash surrounding a window opening opened and closed by the window glass is provided above the door panel, and the sash part to which the present invention is applied is an upright pillar sash extending downward from an end of an upper sash located at an upper edge of the door sash. In this case, the intersecting direction that intersects the vehicle interior and exterior directions are inner and outer peripheral directions of the door sash that defines the window opening as an inner peripheral side.

Advantageous Effects of Invention

According to the present invention, the glass position regulating means provided in the sash part determines the window glass position in the vehicle interior and exterior directions and in the intersecting direction intersecting the vehicle interior and exterior directions. This makes it possible to enhance the relative position accuracy between the window glass and the sash part with facilitated accuracy control.

DESCRIPTION OF EMBODIMENTS

Figure 1:
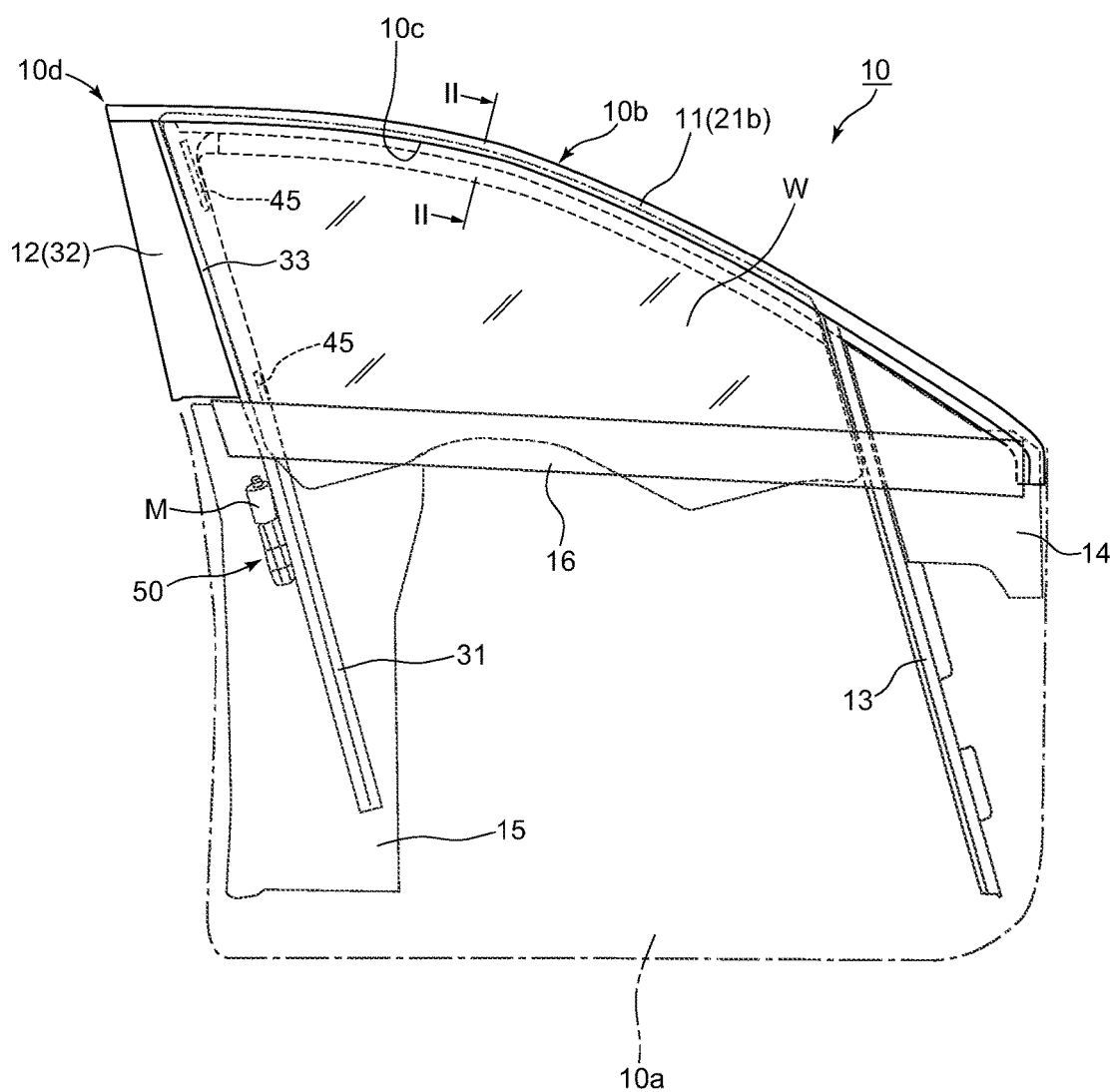
FIG. 1 is a view of a vehicle door when viewed from a vehicle exterior side.

Hereinafter, embodiments of the present invention will be described with reference to the drawings. A door 10 illustrated in FIG. 1 is a side door attached to a side of a right front seat of a vehicle body (not illustrated), and the vehicle body has a door opening (not illustrated) opened and closed by the door 10. The door 10 includes a door panel 10a (virtually illustrated with a one-dot chain line) and a door sash 10b. There is provided a window opening 10c surrounded by the upper edge of the door panel 10a and the door sash 10b.

In the following description, the vehicle interior side and the vehicle exterior side correspond to the inside and outside of the vehicle body in a state where the door 10 is closed, and a direction connecting the vehicle interior side and the vehicle exterior side (a thickness direction of the door 10) will be referred to as vehicle interior and exterior directions. On the door sash 10b, the side facing the window opening 10c is defined as an inner peripheral side, the opposite side of the window opening 10c (the side facing an inner edge of a body opening in a state where the door 10 is closed) is defined as an outer peripheral side, and a direction connecting the inner peripheral side and the outer peripheral side is referred to as inner and outer peripheral directions.

Although not illustrated, the door panel 10a is a combination of an inner panel located on the vehicle interior side and an outer panel located on the vehicle exterior side. A door panel inner space (not illustrated) is formed between the inner panel and the outer panel, and an upper edge of the door panel inner space opens toward the window opening 10c.

The door sash 10b includes an upper sash 11 located at an upper edge of the door 10, an upright pillar sash 12 and a front sash 13 extending substantially vertically from the upper sash 11 toward the door panel 10a. The upright pillar sash 12 is located at the rearmost portion of the door sash 10b, and the upper corner at the rear of the door 10 is a door corner part 10d where the rear end of the upper sash 11 and the upper end of the upright pillar sash 12 meet. The upright pillar sash 12 and the front sash 13 extend substantially in parallel. The upright pillar sash 12 forms a rear edge of the window opening 10c while the front sash 13 forms a front edge of the window opening 10c. Further, the upper sash 11 forms the upper edge of the window opening 10c.

The upright pillar sash 12 extends downward (diagonally downward) from the door corner part 10d and is inserted into the door panel inner space. The upper sash 11 extends forward from the door corner part 10d and curves downward in the middle of running forward. The front end of the upper sash 11 is inserted into the door panel inner space of the door panel 10a. The front sash 13 extends downward (diagonally downward) from an intermediate position of the upper sash 11 so as to be inserted into the door panel inner space. The upper sash 11, the upright pillar sash 12, and the front sash 13 are each secured to the door panel 10a inside the door panel inner space.

In the door panel inner space, a mirror bracket 14 is provided at a front portion, and a lock bracket 15 is provided at a rear portion. The mirror bracket 14 and the lock bracket 15 are each secured to the door panel 10a, the front sash 13 is secured to the mirror bracket 14, and the upright pillar sash 12 is secured to the lock bracket 15. A part of the mirror bracket 14 has a shape that protrudes upward from the door panel 10a and fits in a triangular space between the upper sash 11 and the front sash 13. A door mirror (not illustrated) or the like is attached to the protruded portion on the mirror bracket 14. A door lock mechanism (not illustrated) or the like is attached to the lock bracket 15.

A belt line reinforcement 16 extending in front-rear directions is arranged near the upper edge of the door panel inner space. The belt line reinforcement 16 includes at least an outer reinforcement located on the vehicle exterior side. The front part of the outer reinforcement is secured to the mirror bracket 14 and the rear part thereof is secured to the lock bracket 15. The belt line reinforcement 16 may include an inner reinforcement located on the vehicle interior side in addition to the outer reinforcement.

There is provided window glass W to be elevated and lowered along the upright pillar sash 12 and the front sash 13 to open and close the window opening 10c. The window glass W is a plate-shaped glass member having a vehicle exterior side surface W1 facing the vehicle exterior side, a vehicle interior side surface W2 facing the vehicle interior side, and an edge surface W3 facing the outer peripheral side (refer to FIG. 19). The window glass W is elevated and lowered between a fully closed position (a position shown in FIG. 1 and a position shown in FIG. 20 by solid line) and a fully open position (a position shown in FIG. 20 by two-dot chain line) by a window regulator 40 described below. The upper edge of the window glass W reaches the upper sash 11 at the fully closed position. The window glass W lowered from the fully closed position to the fully open position is housed in the door panel inner space.

Figure 2:
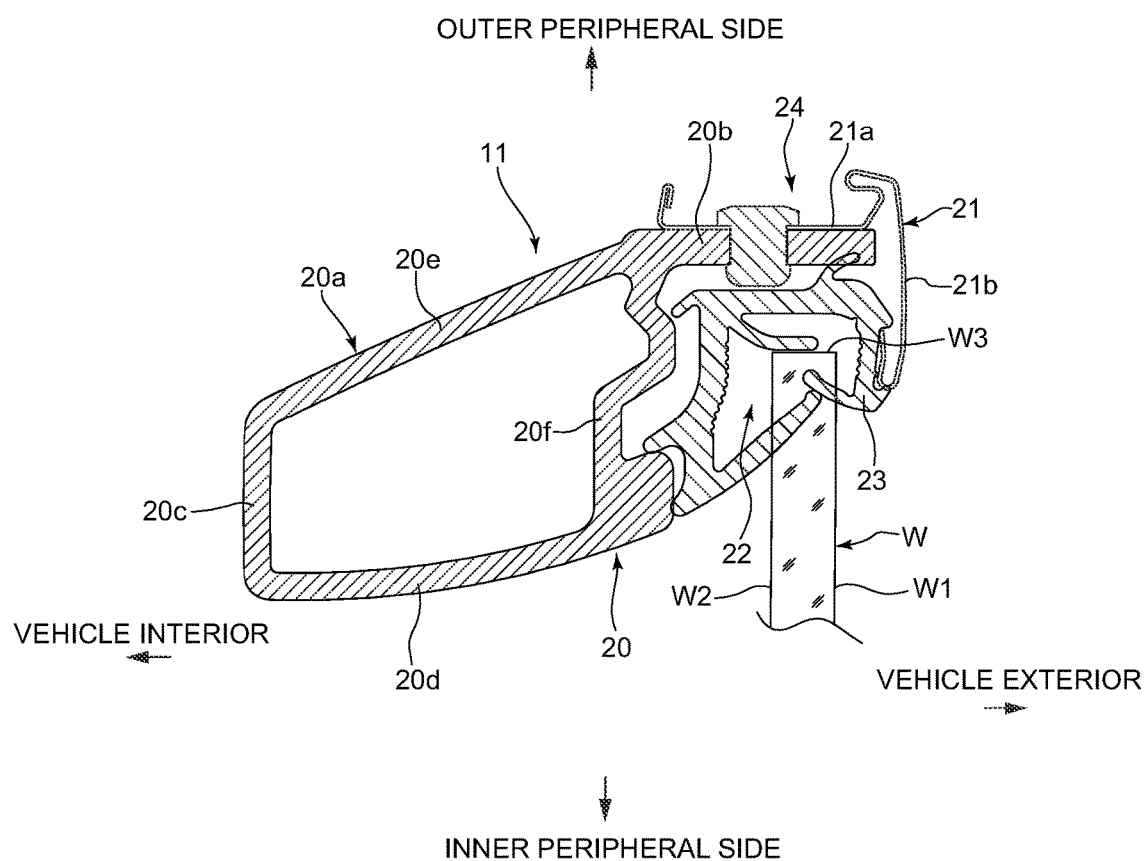
FIG. 2 is a cross-sectional view of an upper sash along line II-II in FIG. 1.

As illustrated in FIG. 2, the upper sash 11 includes a combination of a sash body 20 located on the vehicle interior side and a sash molding 21 located on the vehicle exterior side.

The sash body 20 is a thick metal long member that makes the upper sash 11 a rigid body. The sash body 20 includes: a frame part 20a having a hollow cross-sectional shape located on the vehicle interior side; and a plate part 20b protruding from the frame part 20a toward the vehicle exterior side. The frame part 20a includes a vehicle interior side wall 20c located on the vehicle interior side; an inner peripheral side wall 20d extending from an inner peripheral side end of the vehicle interior side wall 20c toward the vehicle exterior side; an outer peripheral side wall 20e extending from an outer peripheral side end of the vehicle interior side wall 20c toward the vehicle exterior side; and a vehicle exterior side wall 20f that connects vehicle exterior side ends of the inner peripheral side wall 20d and the outer peripheral side wall 20e. The plate part 20b protrudes from the vicinity of the boundary between the outer peripheral side wall 20e and the vehicle exterior side wall 20f toward the vehicle exterior side.

The sash molding 21 is a metal long member thinner than the sash body 20 and includes: a support 21a overlapping the outer peripheral side of the plate part 20b; and a design part 21b located on the vehicle exterior side of the support 21a. The plate part 20b and the support 21a are secured by rivets or the like. That is, the upper sash 11 has a configuration in which the frame part 20a located on the vehicle interior side and the design part 21b located on the vehicle exterior side are connected with each other by a connecting part including the plate part 20b and the support 21a.

The upper sash 11 includes a glass run storage 22 formed as a recess surrounded by the vehicle exterior side wall 20f of the frame part 20a, the plate part 20b, and the support 21a. The glass run storage 22 is open toward the inner peripheral side and houses a glass run 23 formed of an elastic body. The glass run storage 22 is provided with an uneven shape for preventing the glass run 23 from falling off to the inner peripheral side. The glass run 23 has a recessed cross-sectional shape along the inner surface of the glass run storage 22 and includes on its inner side a plurality of elastically deformable lip parts.

As illustrated in FIG. 2, the upper edge of the window glass W enters the glass run storage 22 at the fully closed position of the window glass W. The window glass W that has entered the glass run storage 22 presses the lip part of the glass run 23 to be elastically deformed. This allows the lip part of the glass run 23 to come into close contact with each of a vehicle exterior side surface W1, a vehicle interior side surface W2, and an edge surface W3 of the window glass W, forming a water-tight state that prevents entry of raindrops or the like to the vehicle interior side, as well as elastically holding the upper edge of the window glass W by the glass run 23.

The upper sash 11 is further equipped with a weather-strip holder 24 on the outer peripheral side opposite to the glass run storage 22. The weather-strip holder 24 is a recess including the support 21a and bent portions formed on the vehicle interior and vehicle exterior sides of the support 21a toward the outer peripheral side. The weather-strip holder 24 is open toward the outer peripheral side and fittingly holds a leg of a weather-strip (not illustrated) formed of an elastic body. The weather-strip includes an elastic contact part protruding from the weather-strip holder 24 to the outer peripheral side. When the door 10 is closed, the elastic contact part of the weather-strip comes into contact with an inner edge of the door opening of a vehicle body and is elastically deformed. As will be described below, the weather-strip is also continuous to the part along the upright pillar sash 12. Accordingly, the space between the entire door sash 10b and the door opening comes into a water-tight sealed state by the weather-strip in a state where the door 10 is closed.

The upper sash 11 maintains the above-described general cross-sectional shape from the rear end position on the door corner part 10d side to a position connected to the upper end of the front sash 13 (referred to as a front corner part). Although not illustrated, the sash molding 21 is not provided in the portion of the upper sash 11 that is more frontward of the front corner part, with omission of the glass run storage 22. The front sash 13 is provided with a glass run storage (not illustrated) having a recessed cross-sectional shape that is continuous with the glass run storage 22 of the upper sash 11, and the glass run 23 is held inside the glass run storage of the front sash 13 so as to be disposed downward from the front corner part.

Figure 3:
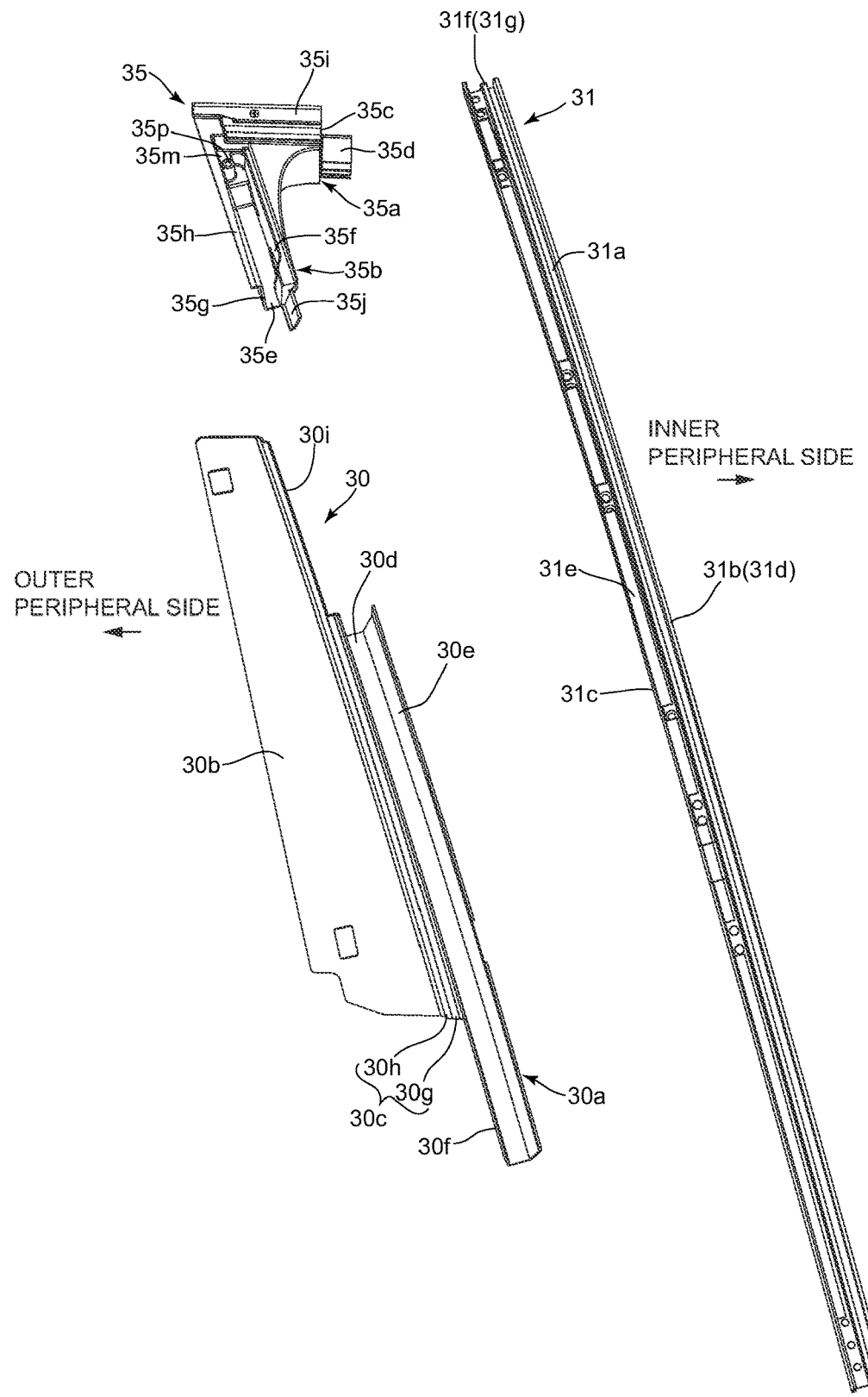
FIG. 3 is a view of a disassembled upright pillar sash when viewed from the vehicle exterior side.
Figure 4:
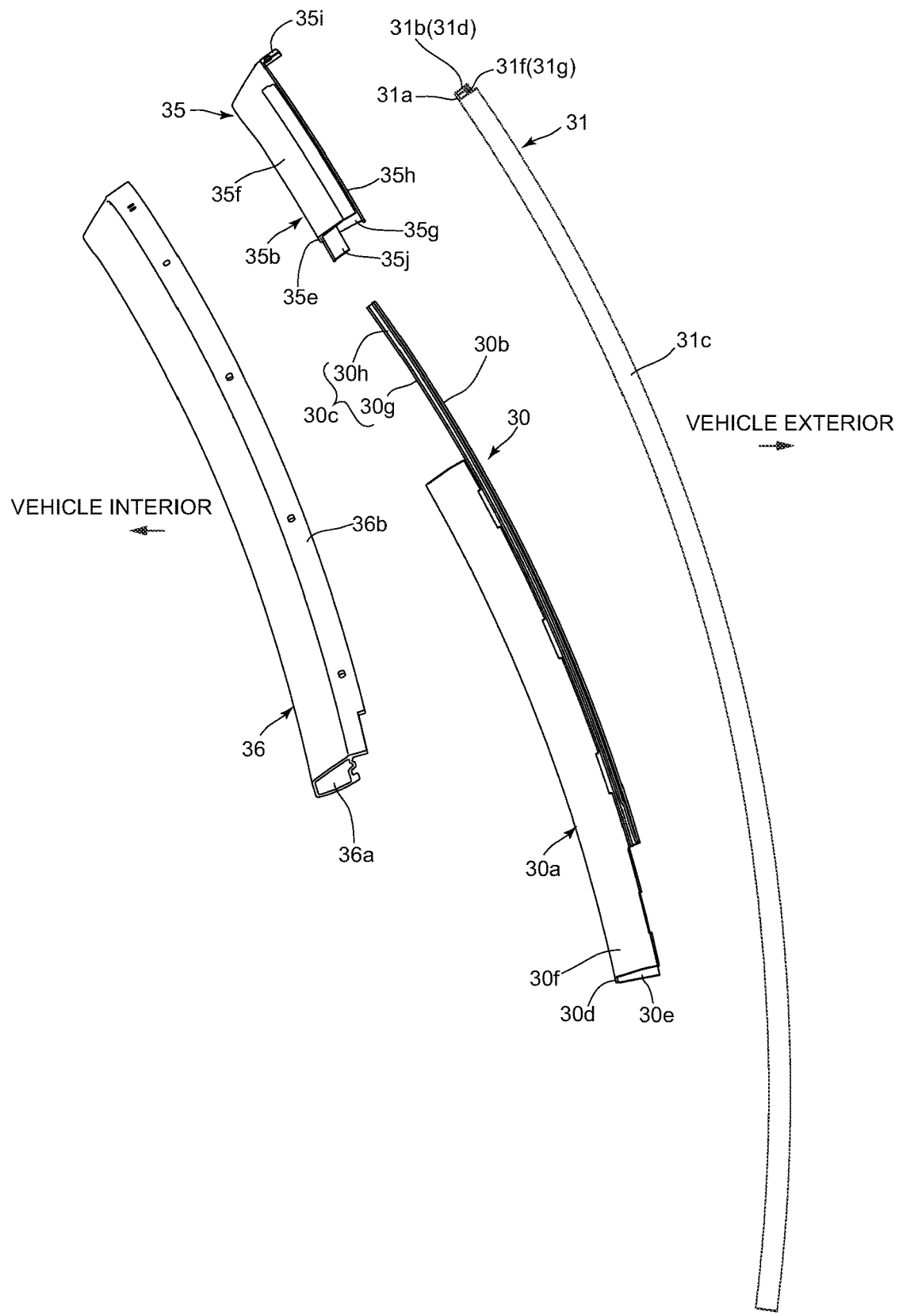
FIG. 4 is a rear view of the disassembled upright pillar sash.
Figure 9:
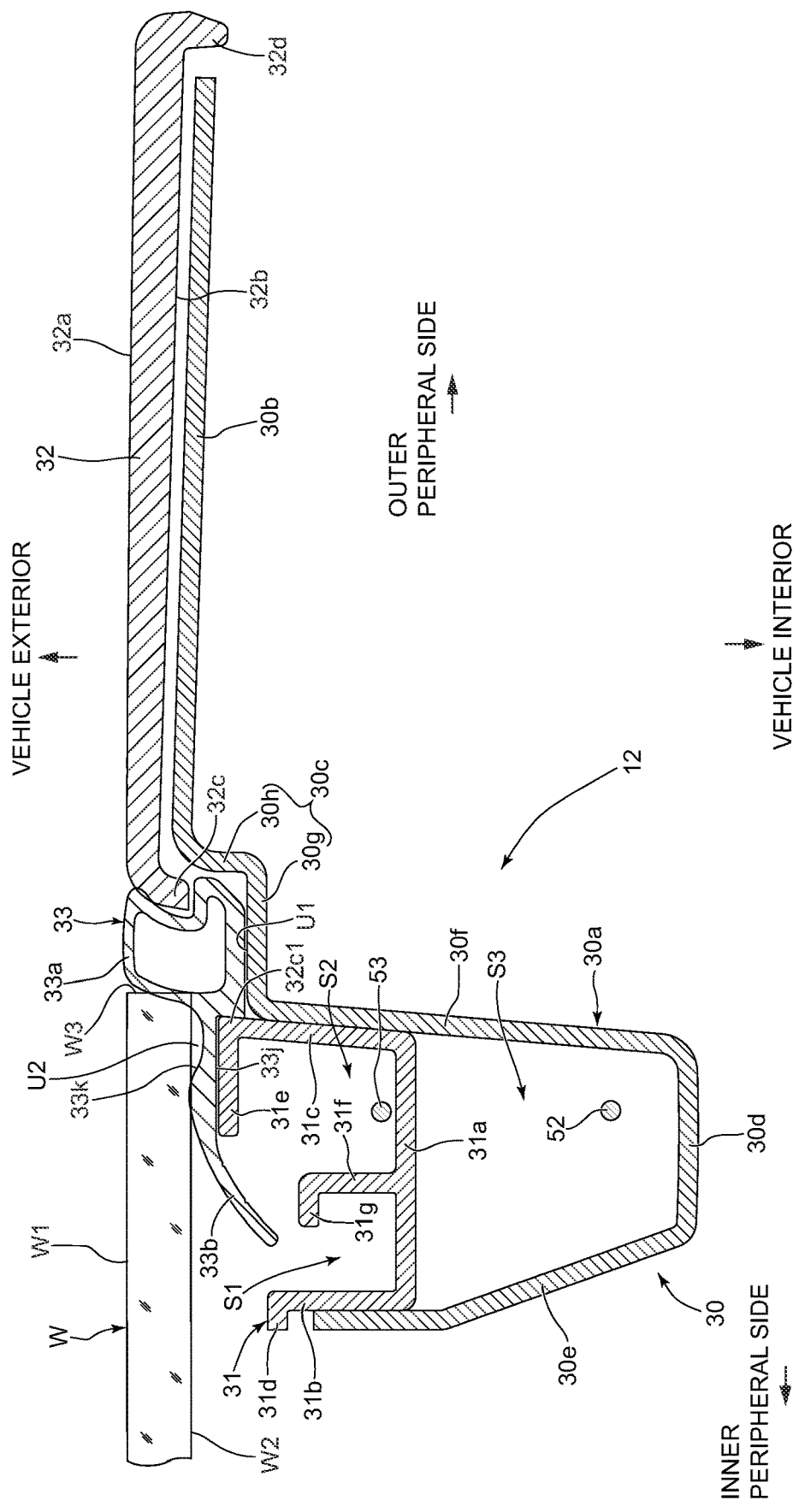
FIG. 9 is a cross-sectional view of an upright pillar sash at a position along line IX-IX in FIG. 23.

As illustrated in FIGS. 3 and 4, the upright pillar sash 12 has a configuration combining an inner sash 30 and a guide rail 31, each of which is a metal long member. Note that the inner sash 30 and the guide rail 31 can also be formed of a nonmetallic material such as a synthetic resin. As illustrated in FIG. 9, a garnish 32 and an elastic cover 33 are attached to the vehicle exterior side of the inner sash 30 and the guide rail 31.

The inner sash 30 includes: a frame part 30a located on the vehicle interior side; a design part 30b located on the vehicle exterior side; and a step part 30c connecting the frame part 30a and the design part 30b. The frame part 30a is a part corresponding to the frame part 20a in the upper sash 11. More specifically, as illustrated in FIG. 9, the frame part 30a includes: a vehicle interior side wall 30d located on the vehicle interior side; an inner peripheral side wall 30e extending from an inner peripheral side end of the vehicle interior side wall 30d toward the vehicle exterior side; and an outer peripheral side wall 30f extending from an outer peripheral side end of the vehicle interior side wall 30d to the vehicle exterior side. The outer peripheral side wall 30f extends substantially straight in the vehicle interior and exterior directions. The inner peripheral side wall 30e includes an inclined region increasing distance with respect to the outer peripheral side wall 30f (having a larger amount of protrusion toward the inner peripheral side) as being farther from the vehicle interior side wall 30d, while the vehicle exterior side of the inclined region is defined as a parallel region being substantially parallel with the inner peripheral side wall 30e.

Unlike the sash body 20 of the upper sash 11 in which the frame part 20a has a closed cross-sectional shape, the inner sash 30 of the upright pillar sash 12 has a bursiform cross-section that is open toward the vehicle exterior side without connecting the vehicle exterior side end of the inner peripheral side wall 30e and the vehicle exterior side end of the outer peripheral side wall 30f in the frame part 30a.

The step part 30c of the inner sash 30 includes: an outer peripheral extension 30g extending from the vehicle exterior side end of the outer peripheral side wall 30f toward the outer peripheral side; and a vehicle exterior extension 30h extending from the outer peripheral side end of the outer peripheral extension 30g toward the vehicle exterior side. The design part 30b extends from the vehicle exterior side end of the vehicle exterior extension 30h toward the outer peripheral side.

The guide rail 31 has a recessed cross-sectional shape that opens toward the vehicle exterior side and is disposed so as to fit inside the open portion of the inner sash 30 on the vehicle exterior side of the frame part 30a having a bursiform cross-sectional shape. More specifically, the guide rail 31 includes a vehicle interior side wall 31a located on the vehicle interior side; an inner peripheral side wall 31b extending from an inner peripheral side end of the vehicle interior side wall 31a toward the vehicle exterior side; and an outer peripheral side wall 31c extending from an outer peripheral side end of the vehicle interior side wall 31a to the vehicle exterior side. A bent part 31d and a cover wall 31e protruding toward the inner peripheral side are provided at the vehicle exterior side end of the inner peripheral side wall 31b and the vehicle exterior side end of the outer peripheral side wall 31c, respectively. The guide rail 31 further includes: a partition wall 31f protruding to the vehicle exterior side from an intermediate position of the vehicle interior side wall 31a in the inner and outer peripheral directions; and a holding wall 31g protruding to the inner peripheral side from the vehicle exterior side end of the partition wall 31f.

The three walls (the inner peripheral side wall 31b, the outer peripheral side wall 31c, and the partition wall 31f) and the vehicle interior side wall 31a connecting these three walls form a first section S1 and a second section S2 mutually adjacent in the inner and outer peripheral directions within the guide rail 31. The holding wall 31g partially closes the vehicle exterior side of the first section S1 while forming a gap with the inner peripheral side wall 31b. The cover wall 31e partially closes the vehicle exterior side of the second section S2 while forming a gap with the partition wall 31f.

The partition wall 31f is provided at a position closer to the inner peripheral side wall 31b than to the outer peripheral side wall 31c, so that the second section S2 is larger than the first section S1 in the inner and outer peripheral directions. The amount of protrusion to the vehicle exterior side with respect to the vehicle interior side wall 31a is the largest on the outer peripheral side wall 31c, the next largest on the inner peripheral side wall 31b, and the smallest on the partition wall 31f. Therefore, the second section S2 is wider in both the inner and outer peripheral directions and the vehicle interior and exterior directions than the first section S1. Furthermore, the cover wall 31e forming the vehicle exterior side surface of the second section S2 is longer in the inner and outer peripheral directions than the holding wall 31g forming the vehicle exterior side surface of the first section S1.

In a state where the guide rail 31 is combined with the inner sash 30, the guide rail 31 closes the opening on the vehicle exterior side of the frame part 30a. The end of the inner peripheral side wall 30e comes in contact with the bent part 31d, determining the relative positions of the inner sash 30 and the guide rail 31 in the vehicle interior and exterior directions (refer to FIG. 14). The inner peripheral side wall 31b and the outer peripheral side wall 31c are respectively in contact with the inner peripheral side wall 30e and the outer peripheral side wall 30f from the inside of the frame part 30a, and this contact achieves integration of the inner sash 30 and the guide rail 31 in the inner and outer peripheral directions. The vehicle interior side wall 31a of the guide rail 31 connects the inner peripheral side wall 30e and the outer peripheral side wall 30f of the inner sash 30 in the inner and outer peripheral directions. This leads to formation of a third section S3 surrounded by the vehicle interior side wall 30d, the inner peripheral side wall 30e, the outer peripheral side wall 30f, and the vehicle interior side wall 31a. The third section S3 is located adjacent to the first section S1 and the second section S2 on the vehicle interior side, being separated from the first section S1 and the second section S2 by the vehicle interior side wall 31a.

Figure 10:
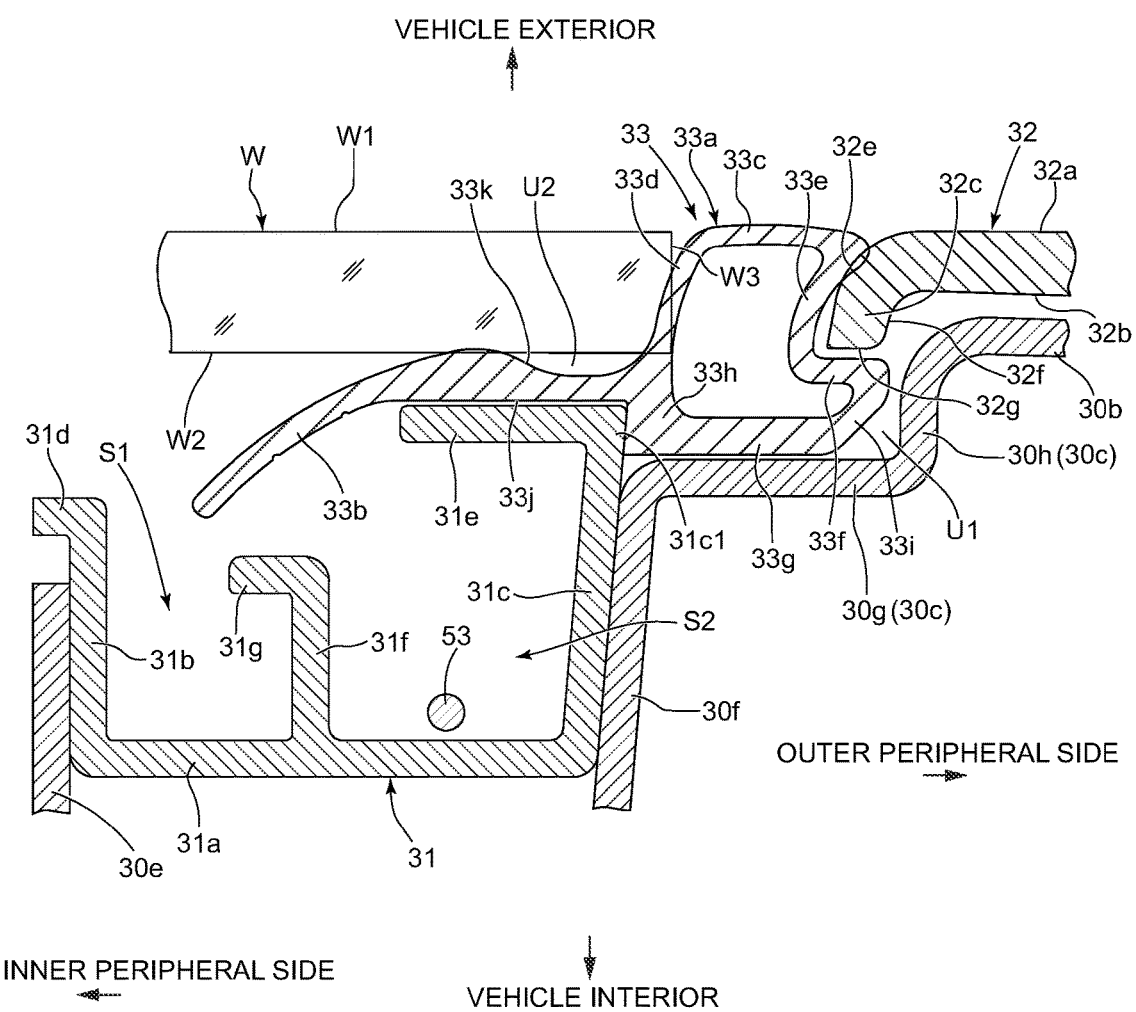
FIG. 10 is an enlarged cross-sectional view of a part of FIG. 9.
Figure 11:
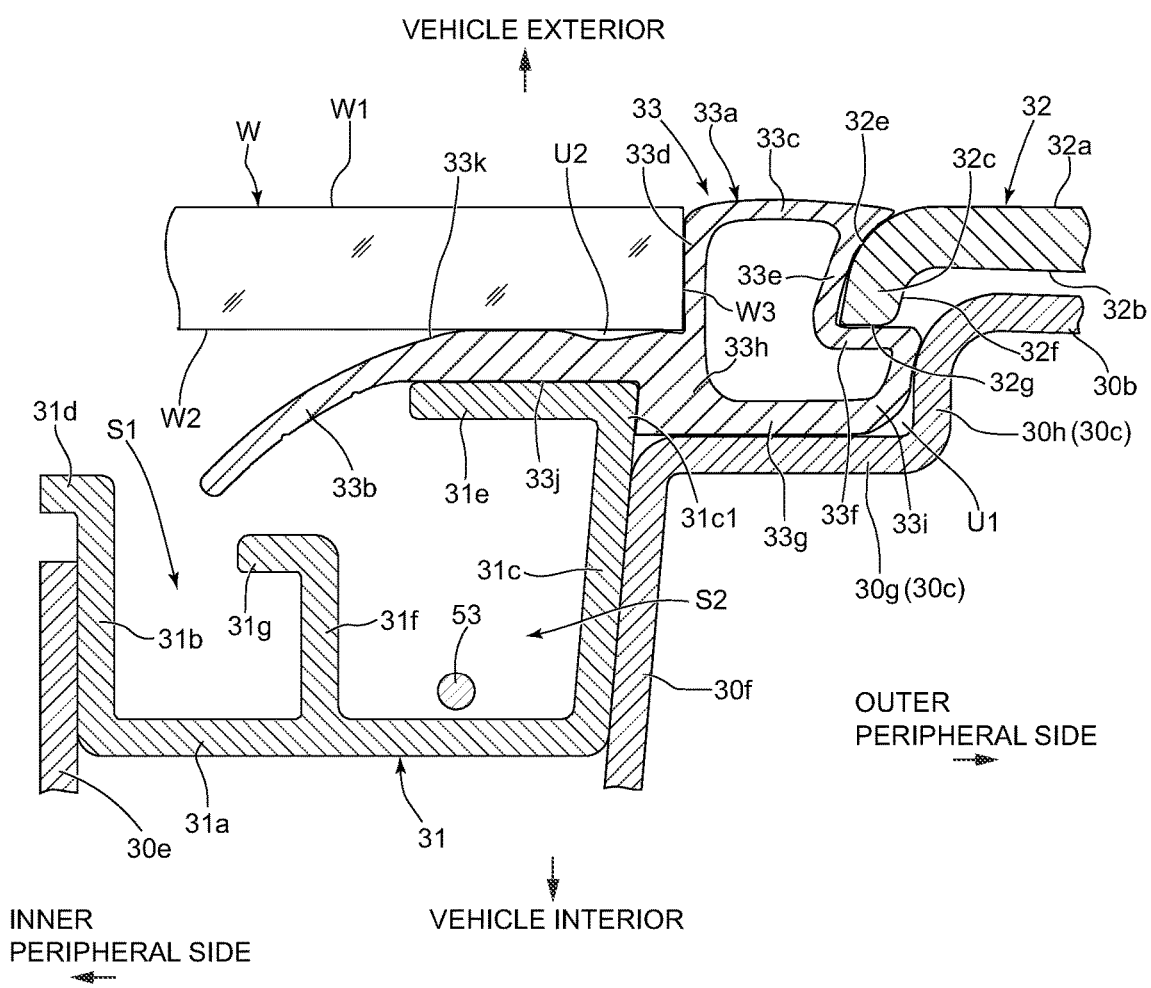
FIG. 11 is a cross-sectional view similar to FIG. 10, illustrating a state in which an elastic cover is elastically deformed.

In a state where the inner sash 30 and the guide rail 31 are combined, the outer peripheral side wall 31c of the guide rail 31 protrudes toward the vehicle exterior side from the outer peripheral extension 30g of the inner sash 30 so as to form a positioning part 31c1 located on the inner peripheral side of the step part 30c (refer to FIGS. 9 to 11). This leads to formation of a holding recess U1 that is open to the vehicle exterior side and having the outer peripheral extension 30g as a bottom with the vehicle exterior extension 30h and the positioning part 32c1 of the step part 30c as both side walls, on the outside (vehicle exterior side and outer peripheral side) of the frame part 30a (refer to FIGS. 9 to 11).

The cover wall 31e formed continuously with the outer peripheral side wall 31c on the guide rail 31 faces the window glass W so as to be separated on the vehicle interior side. The cover wall 31e is located on the vehicle exterior side with respect to the outer peripheral extension 30g, forming a gap U2 communicating with the holding recess U1 between the vehicle interior side surface W2 of the window glass W and the cover wall 31e (FIGS. 9 to 11).

The garnish 32 is a long member that extends in the longitudinal direction of the upright pillar sash 12 so as to cover the vehicle exterior side of the design part 30b. The garnish 32 includes: a vehicle exterior side surface 32a facing the vehicle exterior side; and a vehicle interior side surface 32b facing the vehicle interior side and that is arranged opposite the design part 30b. In the inner and outer peripheral directions, the garnish 32 has a width that covers the entire design part 30b. The inner peripheral side edge and the outer peripheral side edge of the garnish 32 are respectively provided with an inner peripheral edge 32c and an outer peripheral edge 32d curved (bent) toward the vehicle interior side and protruding toward the vehicle interior side with respect to the vehicle interior side surface 32b.

More specifically, as illustrated in FIGS. 10 and 11, the inner peripheral edge 32c of the garnish 32 includes an inner peripheral side surface 32e facing the inner peripheral side, an outer peripheral side surface 32f facing the outer peripheral side, and an end surface 32g facing the vehicle interior side. The inner peripheral side surface 32e is a surface that is continuous with the vehicle exterior side surface 32a, having an inclined shape protruding toward the inner peripheral side while proceeding toward the vehicle interior side, as well as having a curved shape protruding toward the inner peripheral side (especially, a predetermined region from a portion connected to the vehicle exterior side surface 32a is provided as a protruding curved surface). The outer peripheral side surface 32f is a surface that is continuous with the vehicle interior side surface 32b, having an inclined shape protruding toward the inner peripheral side while proceeding toward the vehicle interior side, as well as having a curved shape recessed toward the inner peripheral side (especially, a predetermined region from a portion connected to the vehicle interior side surface 32b is provided as a recessed curved surface). The end surface 32g connects a vehicle interior side end of each of the inner peripheral side surface 32e and the outer peripheral side surface 32f, having a planar shape facing the vehicle interior side.

The boundary portion on the inner sash 30 between the design part 30b and the vehicle exterior extension 30h has a curved shape, and the curved shape of the inner peripheral side surface 32e and the outer peripheral side surface 32f on the inner peripheral edge 32c follows the curved shape of the inner sash 30. Additionally, a part of the tip side of the inner peripheral edge 32c including the end surface 32g is located on the inner peripheral side of the vehicle exterior extension 30h so as to enter the inside of the holding recess U1. The vehicle exterior side surface 32a of the garnish 32 is located at substantially the same position as the vehicle exterior side surface W1 of the window glass W in the vehicle interior and exterior directions, while the end surface 32g is located at a position close to the vehicle interior side surface W2 of the window glass W in the vehicle interior and exterior directions.

Figure 13:
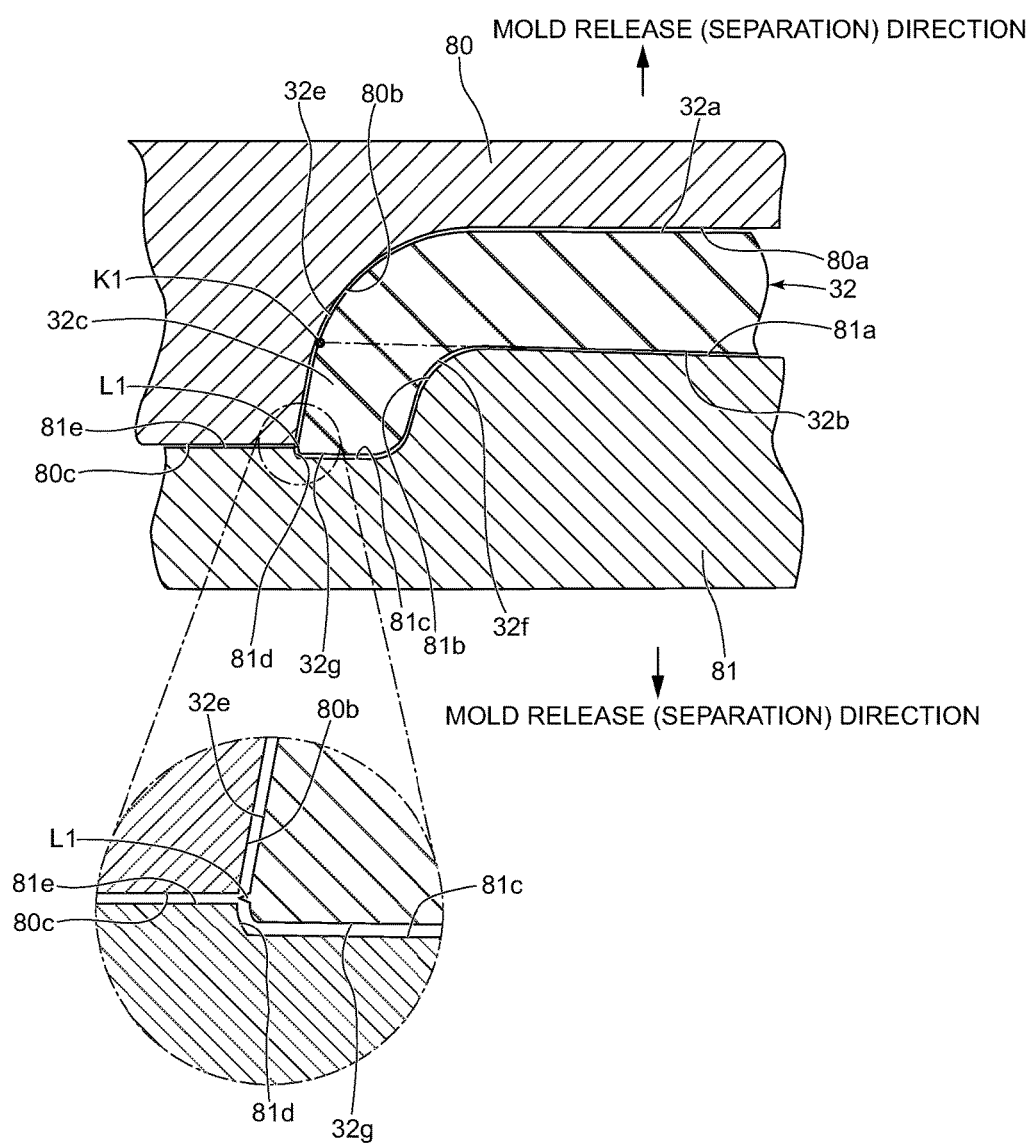
FIG. 13 is a cross-sectional view illustrating a state in which a garnish constituting the upright pillar sash is being molded.

The garnish 32, being a molded product formed of a material such as a synthetic resin, is molded using a molding die illustrated in FIG. 13. This molding die includes an upper die 80 and a lower die 81 relatively movable in the front and back directions of the garnish 32 (corresponding to the vehicle interior and exterior directions when the garnish 32 is assembled to the upright pillar sash 12) when the vehicle exterior side surface 32a and the vehicle interior side surface 32b are respectively defined as front and back.

The upper die 80 includes: a planar first formation region 80a to form the vehicle exterior side surface 32a of the garnish 32; and a second formation region 80b to form a part of the inner peripheral side surface 32e while extending in a curved recessed shape following the first formation region 80a. The lower die 81 includes: a planar first formation region 81a to form the vehicle interior side surface 32b of the garnish 32; a second surface formation region 81b to form the outer peripheral side surface 32f while extending in a curved protruding shape following the first formation region 81a; a third formation region 81c that is continuous from the second surface formation region 81b to form the end surface 32g; and a fourth formation region 81d that is continuous from the third formation region 81c to form a part of the inner peripheral side surface 32e. The upper die 80 includes a mating surface 80c following the second formation region 80b while the lower die 81 includes a mating surface 81e following the fourth formation region 81d. The mating surface 80c and the mating surface 81e are planar surfaces that face each other in contact and approach directions of the upper die 80 and the lower die 81.

As illustrated in FIG. 13, the second formation region 80b and the fourth formation region 81d are aligned so as to be continuous with each other, the upper die 80 and the lower die 81 are brought closer to each other until the mating surface 80c and the mating surface 81e come into contact with each other. Then the garnish 32 is formed by the inner surfaces of the upper die 80 and the lower die 81 (each of formation regions 80a, 80b, 81a, 81b, 81c, and 81d). Although not illustrated, inner surfaces of the upper die 80 and the lower die 81 also include a region for forming the outer peripheral edge 32d, meaning not only the inner peripheral edge 32c but also the outer peripheral edge 32d are formed by the upper die 80 and the lower die 81.

When the upper die 80 and the lower die 81 are separated from each other in the front and back directions of the garnish 32 after molding, a parting line L1 (refer to FIG. 13) will be formed in the inner peripheral edge 32c of the garnish 32 at a position corresponding to the boundary between the mating surface 80c and the mating surface 81e. The parting line L1 is located on the vehicle interior side of an intersection K1 (refer to FIG. 13) at which a virtual line (virtual plane) extending from the vehicle interior side surface 32b of the garnish 32 intersects the inner peripheral side surface 32e.

The garnish 32 can be formed of metal (for example, a steel plate rolled product, an aluminum alloy die-cast product) other than the synthetic resin.

The elastic cover 33, a long member formed of an elastic body, extends in the longitudinal direction of the upright pillar sash 12 so as to be adjacent to the inner peripheral side of the garnish 32. The elastic cover 33 includes: a hollow part 33a having a hollow cross-sectional shape; and a cantilevered lip part 33b protruding toward the inner peripheral side from the hollow part 33a.

FIG. 10 illustrates the shape of the elastic cover 33 in an initial state (free state) under no pressure of the window glass W or the garnish 32. Each parts of the elastic cover 33 in the initial state have the following shapes and structures.

The hollow part 33a of the elastic cover 33 has an internal space having a closed cross-sectional structure surrounded by a vehicle exterior side wall 33c, an inner peripheral side wall 33d, an outer peripheral side wall 33e, an outer peripheral protruding wall 33f, a vehicle interior side wall 33g, an inner peripheral side base wall 33h, and an outer peripheral side base wall 33i.

The vehicle exterior side wall 33c, located on the vehicle exterior side, has a positional relationship to be located side by side with the vehicle exterior side surface W1 of the window glass W and the vehicle exterior side surface 32a of the garnish 32 in the inner and outer peripheral directions. The inner peripheral side wall 33d extends from the inner peripheral side end of the vehicle exterior side wall 33c to the lip part 33b, so as to be located at a position facing the edge surface W3 of the window glass W in the inner and outer peripheral directions. The outer peripheral side wall 33e and the outer peripheral protruding wall 33f form an L shape along the inner peripheral edge 32c of the garnish 32, in which the outer peripheral side wall 33e faces the inner peripheral side surface 32e while the outer peripheral protruding wall 33f faces the end surface 32g.

The vehicle interior side wall 33g comes in contact with the outer peripheral extension 30g of the inner sash 30. The position of the elastic cover 33 (the hollow part 33a in particular) in the vehicle interior and exterior directions is determined by the contact of the vehicle interior side wall 33g with the outer peripheral extension 30g. The vehicle interior side wall 33g also comes in contact with the bent part 35h of the connecting member 35 (refer to FIGS. 16 to 18) at the door corner part 10d where the connecting member 35 is provided.

The inner peripheral side base wall 33h is formed at a corner between the inner peripheral side end of the vehicle interior side wall 33g and the lip part 33b, and comes into contact with the positioning part 31c1 of the guide rail 31. The outer peripheral side base wall 33i connects the outer peripheral side end of each of the outer peripheral protruding wall 33f and the vehicle interior side wall 33g and has an inclined shape protruding toward the outer peripheral side while proceeding from the vehicle interior side (the vehicle interior side wall 33g) to the vehicle exterior side (the outer peripheral protruding wall 33f). The shape and size of the hollow part 33a in the initial state are set such that the outer peripheral side base wall 33i is separated from the step part 30c (a triangular space is formed between the outer peripheral side base wall 33i, the outer peripheral extension 30g, and the vehicle exterior extension 30h) in a state where the inner peripheral side base wall 33h is in contact with the positioning part 31c1 (refer to FIG. 10). That is, the position of the elastic cover 33 in the inner and outer peripheral directions is determined by the contact of the inner peripheral side base wall 33h with the positioning part 31c1.

In the hollow part 33a, the vehicle interior side wall 33g and the inner peripheral side base wall 33h are thick, while the vehicle exterior side wall 33c, the inner peripheral side wall 33d, the outer peripheral side wall 33e, and the outer peripheral protruding wall 33f are thin. In other words, the hollow part 33a is thick and is excellent in stability in a portion that is held (positioned) in contact with the inner sash 30 and the guide rail 31 in the holding recess U1, while the portion sandwiched between the window glass W and the garnish 32 is thin and is highly elastically deformable.

The lip part 33b of the elastic cover 33 extends from the hollow part 33a between the inner peripheral side wall 33d and the inner peripheral side base wall 33h toward the inner peripheral side. A predetermined range on the base end side of the lip part 33b connected to the hollow part 33a is inserted into the gap U2 between the window glass W and the cover wall 31e, while the tip end of the lip part 33b protrudes toward the inner peripheral side from the gap U2.

As illustrated in FIG. 10, the lip part 33b in the initial state (free state) has a planar shape in which a vehicle interior side surface 33j facing the cover wall 31e runs along the cover wall 31e, and the vehicle exterior side surface 33k facing the vehicle interior side surface W2 of the window glass W has an uneven shape. More specifically, the base end portion of the vehicle exterior side surface 33k close to the hollow part 33a (the inner peripheral side wall 33d) is a recessed shape that is recessed toward the vehicle interior side, and the inner peripheral side of the recessed portion has a protruding shape bulging toward the vehicle exterior side. The thickness of the protruding portion of the lip part 33b in the vehicle interior and exterior directions is greater than the width of the gap U2.

A portion of the lip part 33b protruding from the gap U2 toward the inner peripheral side is elastically deformable. The protruding portion of the lip part 33b has a curved shape so as to protrude toward the vehicle interior side while proceeding to the inner peripheral side, and the tip of the lip part 33b is located in the vicinity of the tip of the holding wall 31g of the guide rail 31.

As illustrated in FIG. 10, the elastic cover 33 in the initial state (free state) has a relationship in which a part of the inner peripheral side wall 33d (a region close to the lip part 33b) of the hollow part 33a and a protruding shape of the vehicle exterior side surface 33k of the lip part 33b overlap the window glass W. There is also a relationship in which a part of the outer peripheral side wall 33e (a region close to the vehicle exterior side wall 33c) of the hollow part 33a overlaps the garnish 32. These overlapping portions are pressed by the window glass W and the garnish 32 so as to elastically deform the elastic cover 33, leading to the holding state illustrated in FIG. 11.

In the holding state of FIG. 11, the inner peripheral side wall 33d of the hollow part 33a of the elastic cover 33 is pressed by the window glass W while being shaped to run along the edge surface W3. The pressing force from the window glass W acts toward the outer peripheral side so as to press the hollow part 33a against the garnish 32, and the outer peripheral side wall 33e increases the degree of adhesion with the inner peripheral side surface 32e of the garnish 32. Furthermore, a pressing force acts on the hollow part 33a in the inner peripheral direction also from the garnish 32, and the inner peripheral side wall 33d comes into close contact with the edge surface W3 of the window glass W. Therefore, the hollow part 33a of the elastic cover 33 adheres to both the window glass W and the garnish 32 while elastically deforming in the inner and outer peripheral directions, so as to close the gap between the window glass W and the garnish 32 with high water-tightness. The vehicle exterior side wall 33c of the hollow part 33a is substantially flush with the vehicle exterior side surface W1 of the window glass W and the vehicle exterior side surface 32a of the garnish 32.

When the inner peripheral side wall 33d of the hollow part 33a is pressed against the edge surface W3 of the window glass W due to the inclined shape in the initial state (refer to FIG. 10), the wall 33d also receives the pressing force toward the vehicle interior side in addition to the pressing force toward the outer peripheral side. That is, the hollow part 33a is pressed by the component force from the window glass W toward the outer peripheral side and the component force toward the vehicle interior side. This makes the vehicle interior side wall 33g to be pressed against the outer peripheral extension 30g. This pressing causes a force to push and spread the vehicle interior side wall 33g in the inner and outer peripheral directions. Since the inner peripheral side base wall 33h is in a shape that comes into contact with the positioning part 32c1 in the initial state (FIG. 10), the inner peripheral side base wall 33h maintains the close contact with the positioning part 32c1 and determines the position of the hollow part 33a in the inner and outer peripheral directions. Meanwhile, there is room in the initial state (FIG. 10) between the outer peripheral side base wall 33i and the step part 30c, and thus, the hollow part 33a presses the portion from the outer peripheral side base wall 33i to the outer peripheral protruding wall 33f against the vehicle exterior extension 30h while reducing the space between the step part 30c and the outer peripheral side base wall 33i.

In the holding state of the elastic cover 33 illustrated in FIG. 11, the protruding portion of the vehicle exterior side surface 33k in the lip part 33b is pressed by the vehicle interior side surface W2 of the window glass W, and the lip part 33b is compressed and deformed in the vehicle interior and exterior directions to achieve water-tight sealing of the inside of the gap U2. Performing the sealing by the lip part 33b at the vehicle interior side surface W2 of the window glass W in addition to the sealing by the hollow part 33a at the edge surface W3 of the window glass W will further enhance the water-tightness between the window glass W and the upright pillar sash 12.

In the door 10 of the present embodiment in particular, the components of the window regulator 40 are incorporated in the upright pillar sash 12 as described below. Therefore, using the elastic cover 33 to seal the portion between the window glass W and the upright pillar sash 12 with high water-tightness will be highly effective.

With the configuration of the elastic cover 33 in which the portion held by the holding recess U1 and sandwiched between the window glass W and the garnish 32 is formed as the hollow part 33a, it is possible to achieve a seal member having excellent stability in cross-sectional structure compared to the case of a partially open cross section or a cantilevered form. As a result, the hollow part 33a can be reliably brought into contact with the window glass W and each of portions of the upright pillar sash 12 (the step part 30c, the positioning part 31c1, and the inner peripheral edge 32c of the garnish 32) with an appropriate contact pressure while absorbing variations in component accuracy and assembly accuracy of the elastic cover 33 and its peripheral members (the inner sash 30, the guide rail 31, the garnish 32), leading to achievement of high water-tightness.

Furthermore, even when the gap between the window glass W and the garnish 32 has variations in the inner and outer peripheral directions, the hollow part 33a can maintain a stable external width in the inner and outer peripheral directions.

Furthermore, with the configuration in which the outer peripheral side base wall 33i has a predetermined space between the step part 30c in the hollow part 33a in the initial state (FIG. 10), and the elastic cover 33 is elastically deformed in a direction to reduce the space when forming the holding state (FIG. 11), it is possible to enhance the performance of absorbing variations in accuracy.

In the hollow part 33a in the holding state of FIG. 11, using a configuration in which the substantially L-shaped outer peripheral side wall 33e and the outer peripheral protruding wall 33f are fitted to the inner peripheral edge 32c of the garnish 32 would achieve higher stability. As described above, the hollow part 33a receives the pressing force from the window glass W to the outer peripheral side and the vehicle interior side due to the inclined shape of the inner peripheral side wall 33d in the initial state (FIG. 10), and the vehicle interior side wall 33g comes in contact with the outer peripheral extension 30g of the inner sash 30, thereby regulating the movement toward the vehicle interior side. Furthermore, the outer peripheral protruding wall 33f faces the end surface 32g of the inner peripheral edge 32c of the garnish 32, thereby regulating the movement (falling off) of the hollow part 33a to the vehicle exterior side. This makes it possible to stably hold the hollow part 33a in the vehicle interior and exterior directions.

Although details will be described below, the first section S1 of the guide rail 31 is a portion that slidably supports shoes 43 and 44 of the sliders 45 and 46 that support the window glass W. That is, the position of the window glass W in the inner and outer peripheral directions is determined by the inner peripheral side wall 31b and the partition wall 31f constituting the first section S1 of the guide rail 31, and the position of the window glass W in the vehicle interior and exterior directions is determined by the vehicle interior side wall 31a and the holding wall 31g. The positioning part 31c1 for positioning the elastic cover 33 in the inner and outer peripheral directions is a part of the guide rail 31. That is, both the window glass W and the elastic cover 33 are positioned with reference to the guide rail 31. This makes it possible to achieve a stable positional relationship (suppressing positional variation) between the window glass W and the elastic cover 33. Since the elastic cover 33 functions as a sealing member by being pressed by the window glass W in the holding state (FIG. 11). Therefore, when the positional relationship between the window glass W and the elastic cover 33 is stable, the degree of adhesion of the elastic cover 33 to the window glass W and each of components of the upright pillar sash 12 will be stabilized, leading to achievement of high water-tightness by the elastic cover 33. Furthermore, as described below, since the elastic cover 33 allows the lip part 33b to come in contact with the sliders 45 and 46. Therefore, when the positional relationship between the window glass W and the elastic cover 33 is stable, it is possible to suppress a change in the load on the sliders 45 and 46, leading to achievement of enhanced sliding performance of the sliders 45 and 46 with respect to the guide rail 31.

The garnish 32 and the elastic cover 33 are parts that form the appearance of the upright pillar sash 12 when the door 10 is viewed from the vehicle exterior side. The upright pillar sash 12 has a flash surface structure in which the garnish 32 is arranged in a positional relationship substantially flush with the vehicle exterior side surface W1 of the window glass W. The elastic cover 33 is held in a highly accurate and stable state in which the hollow part 33a is unlikely to bulge toward the vehicle exterior side as described above. Accordingly, it is possible to have an appearance having aesthetic excellence in the flash surface structure as well as in the window glass W and the garnish 32 while achieving excellent water-tightness.

In addition, the garnish 32 sets the position of the parting line L1 generated by the molding to the vehicle interior side of the intersection K1 (the position where the vehicle interior side surface 32b is extended) on the inner peripheral side surface 32e of the inner peripheral edge 32c (refer to FIG. 13). This configuration makes it possible to reliably cover the parting line L1 with the elastic cover 33 even when there is some variation in accuracy. Since the parting line L1 is not visible in the appearance, the garnish 32 has good appearance, contributing to the aesthetic improvement in the upright pillar sash 12.

The elastic cover 33 includes the lip part 33b located on the vehicle interior side of the window glass W and covers most of the guide rail 31 from the vehicle exterior side, in addition to the hollow part 33a which is visible directly in the appearance of the upright pillar sash 12 between the window glass W and the garnish 32. With this configuration, the internal structure of the upright pillar sash 12 is covered on the inner peripheral side of the garnish 32 with substantially no visibility in the appearance, leading to achievement of an excellent aesthetic appearance even in a region where the window glass W and the upright pillar sash 12 overlap in the vehicle interior and exterior directions.

Figure 12:
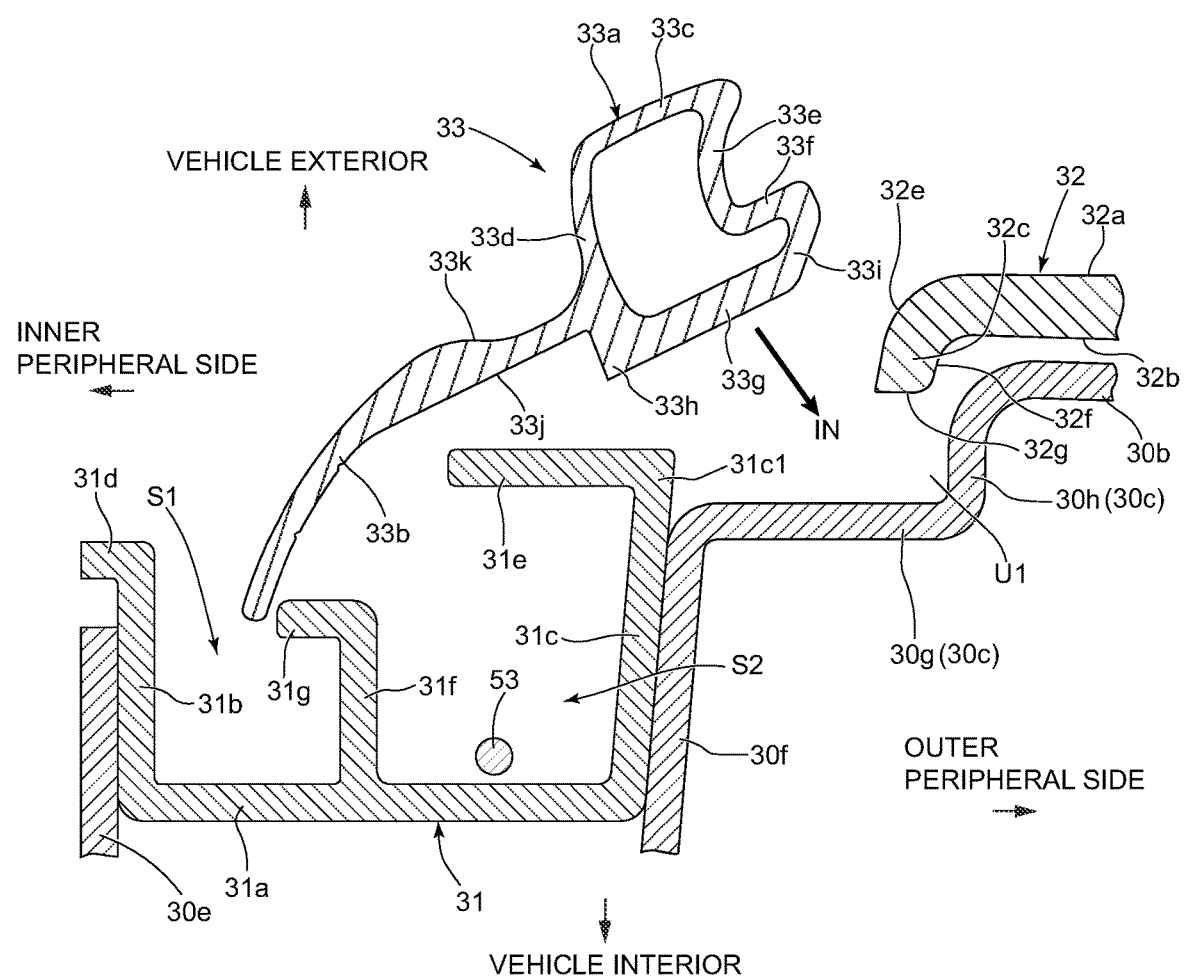
FIG. 12 is a cross-sectional view illustrating a state in which the elastic cover is being assembled to the upright pillar sash.

As illustrated in FIG. 12, the state in which the window glass W does not exist at the cross-sectional position of the upright pillar sash 12 to be attached is produced when the elastic cover 33 is to be attached to the upright pillar sash 12. Specifically, the window glass W is lowered to the fully open position (refer to FIG. 20). In this state, the elastic cover 33 is inclined as illustrated in FIG. 12, and the hollow part 33a is inserted in the direction of an arrow IN. The hollow part 33a enters the holding recess U1 after passing between the positioning part 31c1 of the guide rail 31 and the inner peripheral edge 32c of the garnish 32. At this time, the outer peripheral side base wall 33i of the elastic cover 33 and the inner peripheral side surface 32e of the garnish 32 come in contact with each other. The outer peripheral side base wall 33i and the inner peripheral side surface 32e form an inclined shape so as to push the hollow part 33a toward the inner peripheral side as proceeding in an insertion direction (arrow IN). Therefore, the hollow part 33a is inserted into the holding recess U1 through the space with the positioning part 31c1 while being compressed and contracted in the inner and outer peripheral directions. Since the outer peripheral side base wall 33i and the inner peripheral side surface 32e have mutually smooth inclined shapes, the hollow part 33a can be smoothly inserted into the holding recess U1.

After the hollow part 33a is inserted into the holding recess U1 along the arrow IN in FIG. 12, the elastic cover 33 is rotated clockwise in FIG. 12. This movement allows the outer peripheral side wall 33e and the outer peripheral protruding wall 33f of the elastic cover 33 to be fitted to the inner peripheral edge 32c of the garnish 32, leading to the stable holding state of the elastic cover 33 illustrated in FIG. 10. At this time, falling off of the hollow part 33a of the elastic cover 33 from the holding recess U1 to the inner peripheral side or the vehicle exterior side is restricted by the positioning part 31c1 and the inner peripheral edge 32c. That is, the position of the hollow part 33a of the elastic cover 33 is determined in both the vehicle interior and exterior directions and the inner and outer peripheral directions with respect to the holding recess U1. Accordingly, even in a state where the window glass W is opened (the state where the window glass W is omitted from FIG. 10), the elastic cover 33 after attachment is stably held by the upright pillar sash 12.

As described above, the upper sash 11 and the upright pillar sash 12 have partially different cross-sectional structures. The upper sash 11 and the upright pillar sash 12 having different cross-sectional structures are connected with each other via the connecting member 35 at the door corner part 10d. The connecting member 35 is manufactured by die-casting a metal such as aluminum. The connecting member 35 includes: a first frame part 35a located on an extension of the upper sash 11; and a second frame part 35b located on an extension of the upright pillar sash 12.

The front end of the first frame part 35a of the connecting member 35 is a contact end surface 35c facing the rear end of the sash body 20 of the upper sash 11. The contact end surface 35c has a shape including the frame part 20a and the plate part 20b in the sash body 20, and a region corresponding to a hollow part of the frame part 20a is closed in the contact end surface 35c. This makes it possible to reliably bring the rear end surface of the sash body 20 into contact with the contact end surface 35c.

Figure 6:
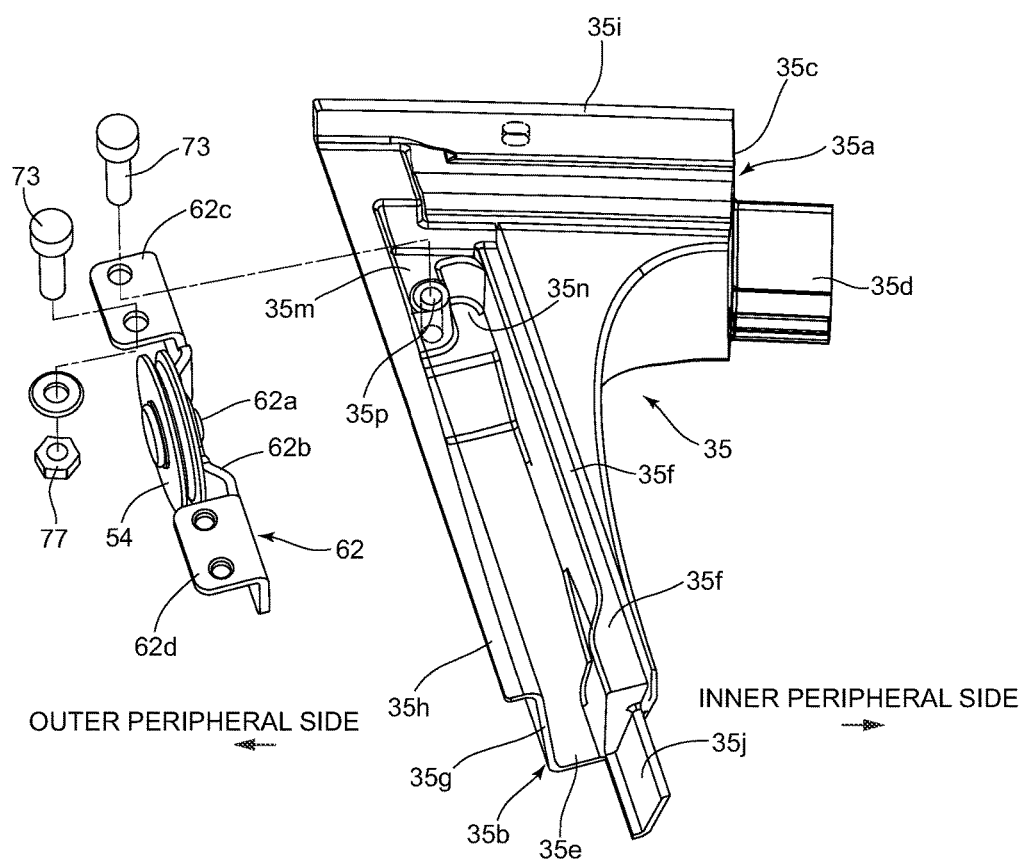
FIG. 6 is a perspective view of a connecting member constituting the door corner part when viewed from the vehicle exterior side.
Figure 7:
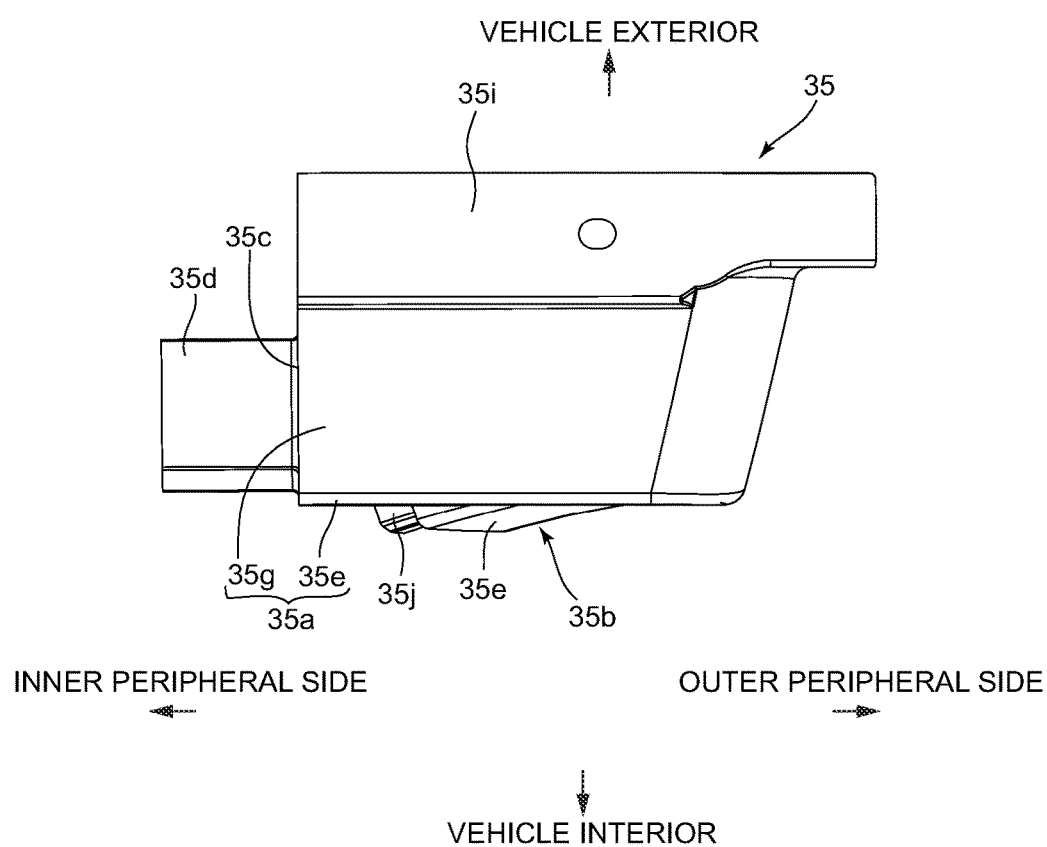
FIG. 7 is a top view of the connecting member.

An insertion projection 35d is provided to project forward from the contact end surface 35c (refer to FIGS. 6 and 7). The insertion projection 35d has a shape to run along the inner surface of the hollow frame part 20a. The insertion projection 35d is inserted into the frame part 20a in a state where the rear end surface of the sash body 20 is in contact with the contact end surface 35c. In this state, the connecting member 35 and the sash body 20 are joined by means such as welding.

At an upper end of the connecting member 35, there is provided a plate part 35i which is continuous with the plate part 20b of the upper sash 11 in a state where the upper sash 11 and the first frame part 35a are joined with each other. A weather-strip (not illustrated) held by the weather-strip holder 24 of the upper sash 11 extends to above the connecting member 35 and is continuously held by the plate part 35i.

The lower end of the second frame part 35b of the connecting member 35 has a shape corresponding to a portion of the inner sash 30 of the upright pillar sash 12 excluding the design part 30b. More specifically, the connecting member 35 includes: a vehicle interior side wall 35e continuous with the vehicle interior side wall 30d; an inner peripheral side wall 35f continuous with the inner peripheral side wall 30e; and an outer peripheral side wall 35g continuous with the outer peripheral side wall 30f. Furthermore, a bent part 35h continuous with a part of the outer peripheral extension 30g on the inner peripheral side is provided at the vehicle exterior side end of the outer peripheral side wall 35g.

The inner peripheral side wall 35f of the second frame part 35b have partially different thicknesses in the inner and outer peripheral directions. The inner peripheral side wall 35f is thick near the lower end of the second frame part 35b, and an insertion projection 35j is provided to project downward from the lower end surface of the inner peripheral side wall 35f (refer to FIGS. 6 and 7). The insertion projection 35j has a shape to run along the inner surface of the frame part 30a of the inner sash 30, and the insertion projection 35j is inserted into the frame part 30a in a state where the upper end surface of the inner sash 30 is in contact with the lower end surface of the second frame part 35b. In this state, the connecting member 35 and the inner sash 30 are joined by means such as welding.

The design part 30b and the step part 30c of the inner sash 30 (the whole of the vehicle exterior extension 30h and a part of the outer peripheral side of the outer peripheral extension 30g) extend to the upper end of the upright pillar sash 12. At a position above the joint between the lower end surface of the second frame part 35b and the upper end surface of the inner sash 30, the edge of the bent part 35h on the connecting member 35 comes in contact with a vertically extending side contact surface 30i formed on the step part 30c (refer to FIGS. 16 to 18).

Figure 16:
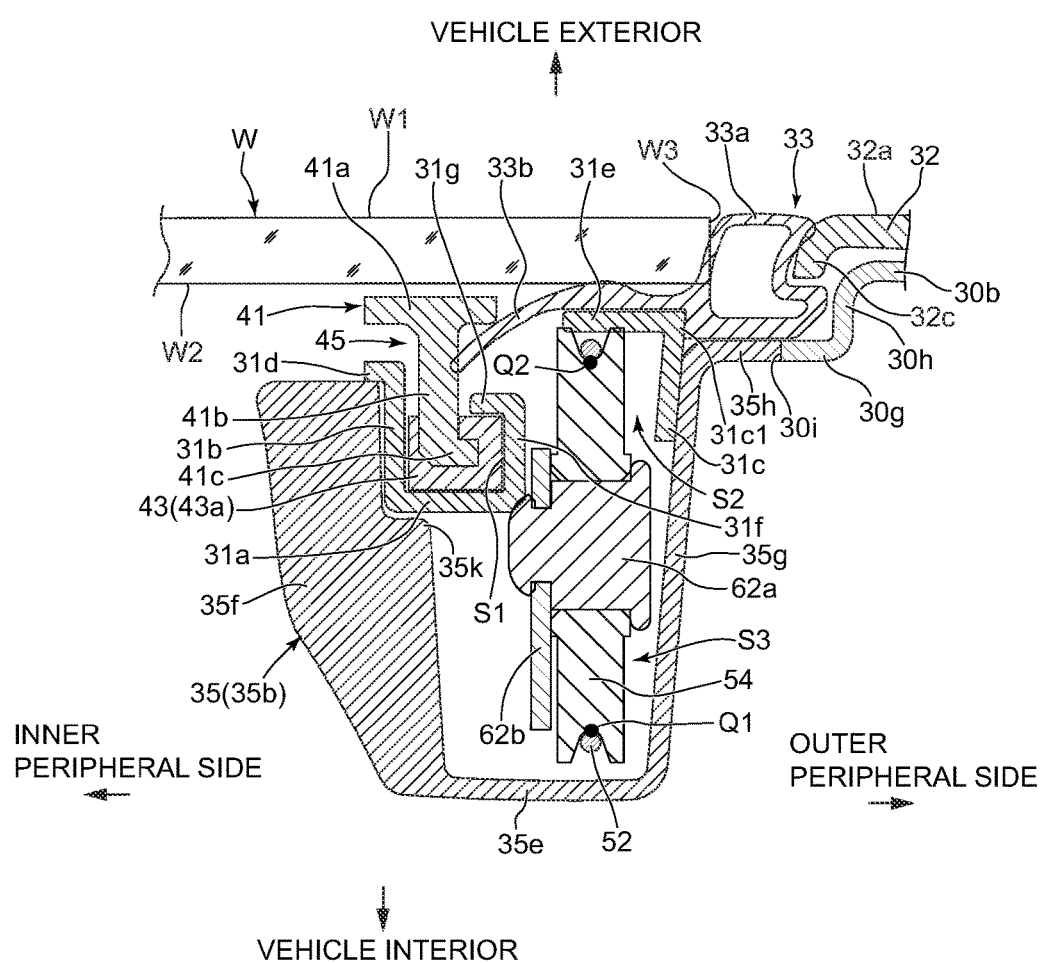
FIG. 16 is a cross-sectional view of the upright pillar sash at a position along line XVI-XVI in FIG. 23.
Figure 17:
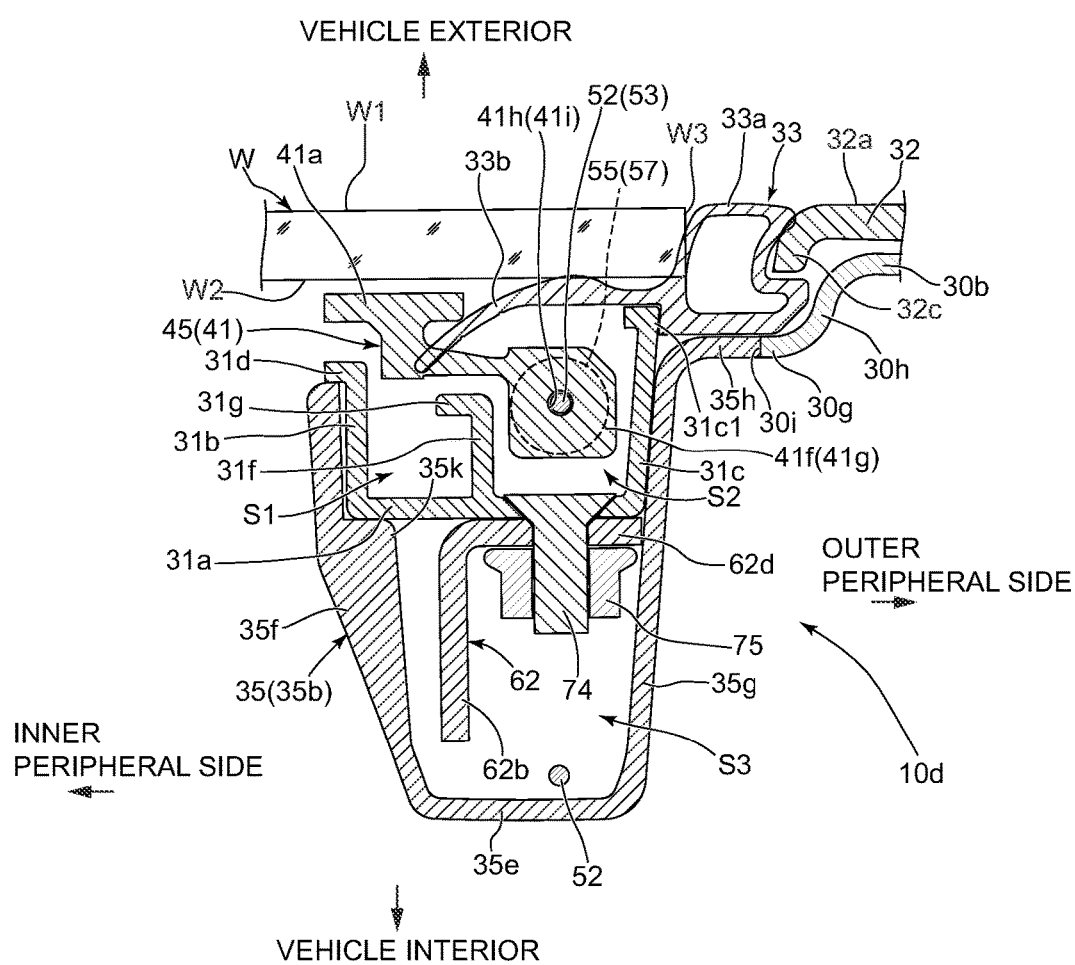
FIG. 17 is a cross-sectional view of the upright pillar sash at a position along line XVII-XVII in FIG. 23.

As illustrated in FIGS. 16 and 17, the vehicle exterior side end of the inner peripheral side wall 35f comes in contact with the bent part 31d of the guide rail 31, thereby determining the position of the connecting member 35 with respect to the inner sash 30 in the vehicle interior and exterior directions. In addition, similar to the general cross-section (FIG. 9) of the upright pillar sash 12, a third section S3 is formed, inside the second frame part 35b joined to the upright pillar sash 12, so as to be surrounded by the vehicle interior side wall 35e, the inner peripheral side wall 35f, the outer peripheral side wall 35g, and the vehicle interior side wall 31a of the guide rail 31.

By joining the first frame part 35a and the second frame part 35b respectively to the sash body 20 and the inner sash 30 as described above, the upper sash 11 and the upright pillar sash 12 are connected via the connecting member 35, thereby forming the door corner part 10d.

Figure 5:
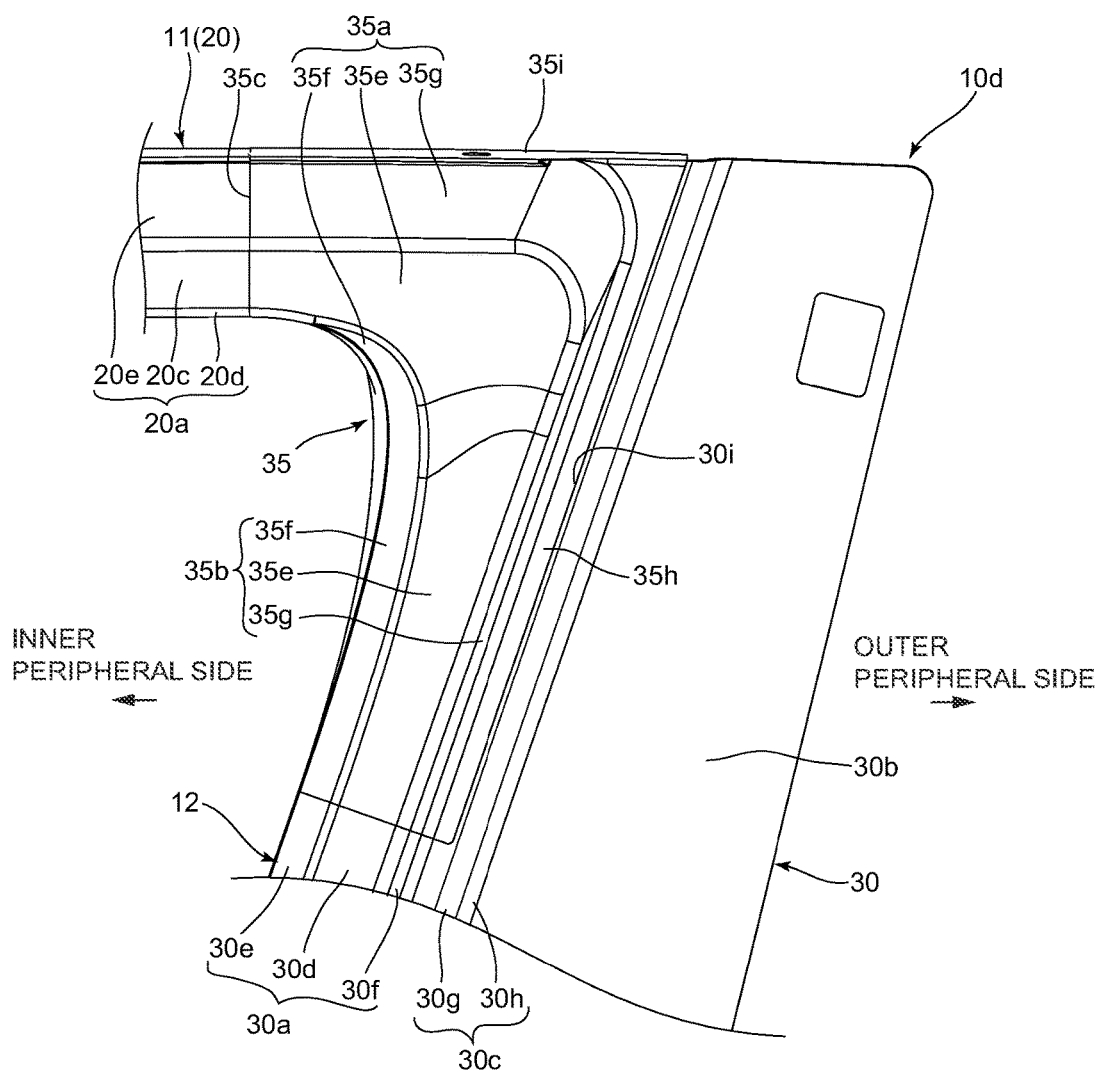
FIG. 5 is a view of a door corner part of a door sash viewed from the vehicle interior side.

The vehicle interior side wall 35e of the connecting member 35 has an L-shape extending forward and downward from the position near the upper end of the upright pillar sash 12 when viewed from the vehicle interior side as illustrated in FIG. 5. The vehicle interior side wall 35e is substantially flush with each of the vehicle interior side wall 20c of the upper sash 11 and the vehicle interior side wall 30d of the upright pillar sash 12. The inner peripheral side wall 35f of the connecting member 35 extends forward and downward while bending, and is substantially flush with each of the inner peripheral side wall 20d of the upper sash 11 and the inner peripheral side wall 30e of the upright pillar sash 12. Similarly, the outer peripheral side wall 35g of the connecting member 35 extends forward and downward while bending, and is substantially flush with each of the outer peripheral side wall 20e of the upper sash 11 and the outer peripheral side wall 30f of the upright pillar sash 12. That is, the frame part 20a of the upper sash 11 (excluding the vehicle exterior side wall 20f) and the frame part 30a of the upright pillar sash 12 are smoothly connected with each other by the first frame part 35a and the second frame part 35b of the connecting member 35.

The connecting member 35 changes the internal shape of the second frame part 35b in accordance with the difference in the position in the vertical direction. As illustrated in FIG. 16 and FIG. 17, unlike the inner peripheral side wall 30e of the inner sash 30 in the general cross section (refer to FIG. 9), the inner peripheral side wall 35f in the second frame part 35b gradually increases its thickness from the portion connected to the vehicle interior side wall 35e toward the vehicle exterior side. Consequently, the inner peripheral side wall 35f overlaps a part of the guide rail 31 in the inner and outer peripheral directions, thereby forming a step part 35k shaped to fit into a corner at the boundary between the vehicle interior side wall 31a and the inner peripheral side wall 31b, on the inner peripheral side wall 35f (refer to FIGS. 16 and 17). Further above the second frame part 35b, the inner peripheral side wall 35f extends forward to be continuous to the first frame part 35a as illustrated in FIG. 18.

Furthermore, the second frame part 35b also has partially different thicknesses in the vehicle interior and exterior directions with respect to the vehicle interior side wall 35e. The thickness of the vehicle interior side wall 35e is substantially the same as the thickness of the vehicle interior side wall 30d of the inner sash 30 near the lower end of the second frame part 35b. As illustrated in FIGS. 6, 16, and 17, the vehicle interior side wall 35e extends upward while substantially maintaining this thickness, and the third section S3 ensures a sufficient width in the vehicle interior and exterior directions up to a position near the upper end of the upright pillar sash 12.

Figure 18:
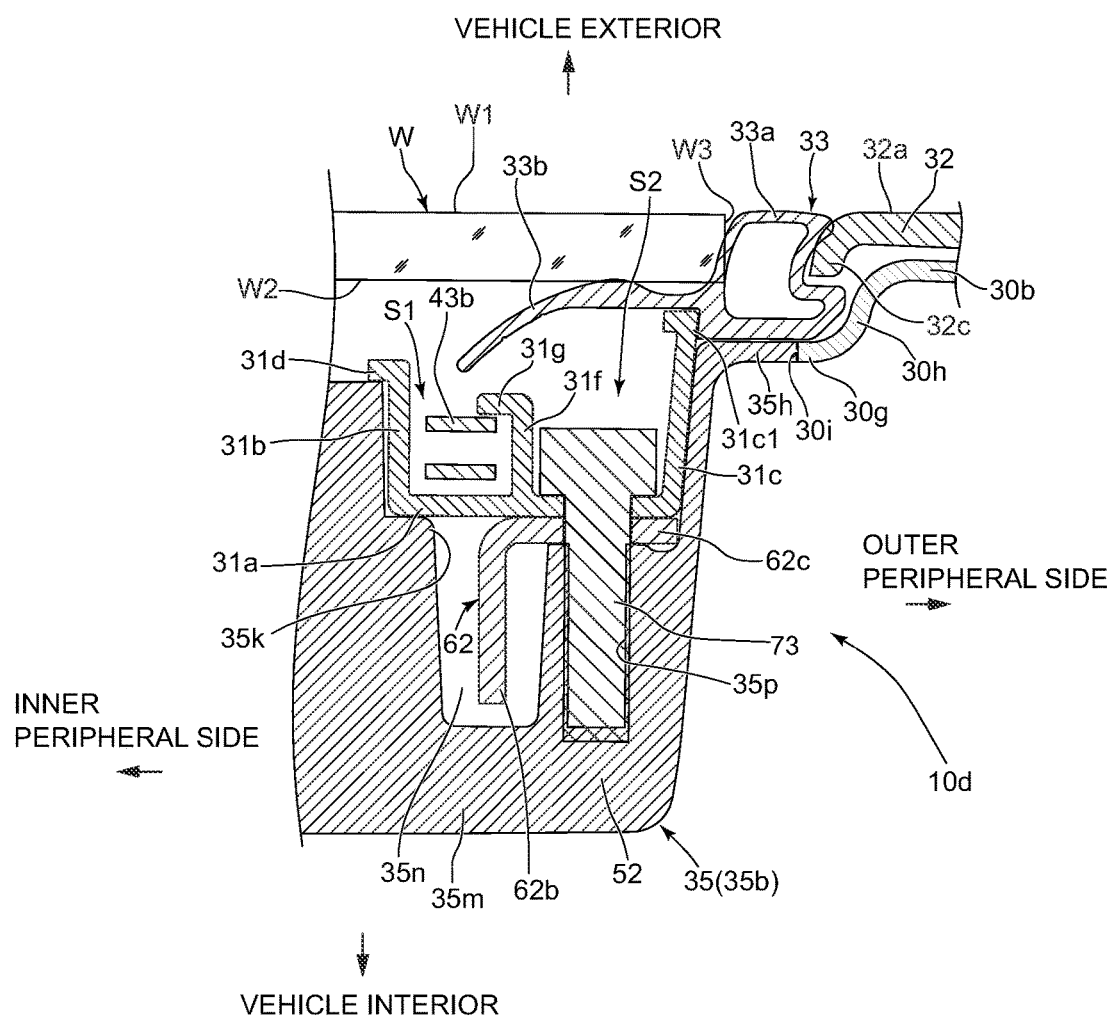
FIG. 18 is a cross-sectional view of the upright pillar sash at a position along line XVIII-XVIII in FIG. 23.

As illustrated in FIG. 6 and FIG. 18, at a position above the second frame part 35b (at a position on the rear extension of the first frame part 35a), the region continuing upward to the above-described vehicle interior side wall 35e is defined as a thick part 35m whose thickness is partially increased up to a position in the proximity of the vehicle interior side wall 31a of the guide rail 31. The thick part 35m forms a seat surface facing the vehicle exterior side. There are provided an escape recess 35n as a part of the third section S3 and a screw hole 35p communicating with the escape recess 35n, formed to be recessed from the seat surface to the vehicle interior side. The escape recess 35n is a space having an L-shaped cross-sectional shape including: a first region located on the vehicle interior side of the first section S1 and the second section S2 along the vehicle interior side wall 31a; and a second region obtained by extending a portion of the first region corresponding to the first section S1 toward the vehicle interior side. The screw hole 35p is a cylindrical hole that extends a portion of the first region of the escape recess 35n corresponding to the second section S2 toward the vehicle interior side, having a female screw formed on its inner peripheral surface. Each of the escape recess 35n and the screw hole 35p is a bottomed recess or hole recessed from the vehicle exterior side toward the vehicle interior side and do not penetrate (open) onto the vehicle interior side surface of the second frame part 35b.

As described above, the connecting member 35 having a complicated structure having a different cross-sectional shape and thickness depending on the difference in the position of the door sash 10b in the longitudinal direction can be manufactured with high precision by die casting. Moreover, since the connecting member 35 as a die-cast product can internally form the bottomed screw hole 35p or the thick part 35m or the like with high precision without forming a mold release hole or the like on the outer surface, it is possible to achieve both high internal functionality and excellent appearance.

As illustrated in FIG. 4, the upright pillar sash 12 further includes an inner cover 36 that covers the inner sash 30 and the connecting member 35 from the vehicle interior side. Note that the cross-sectional views of the upright pillar sash 12 (FIGS. 9 to 11 and FIGS. 14 to 18) omit illustration of the inner cover 36. The inner cover 36 includes: a frame part 36a having a cross-sectional shape substantially corresponding to the cross-sectional shape of the frame part 30a of the inner sash 30 and the second frame part 35b of the connecting member 35; and a plate part 36b protruding from the frame part 36a toward the vehicle exterior side.

The plate part 36b of the inner cover 36 has a shape that is continuous with the plate part 35i of the connecting member 35. A weather-strip holder (not illustrated) formed of another component is attached from the plate part 35i to the plate part 36b. The weather-strip is continuously held by the portions from the weather-strip holder 24 (refer to FIG. 2) of the upper sash 11 to the weather-strip holder on the plate part 35i and the plate part 36b, and is arranged over the entire outer peripheral portions of the door sash 10b including the door corner part 10d.

The door 10 includes a window regulator 40 (refer to FIGS. 8, 22 to 24) for performing elevating and lowering drive of the window glass W. The window regulator 40 is incorporated in the upright pillar sash 12.

Figure 8:
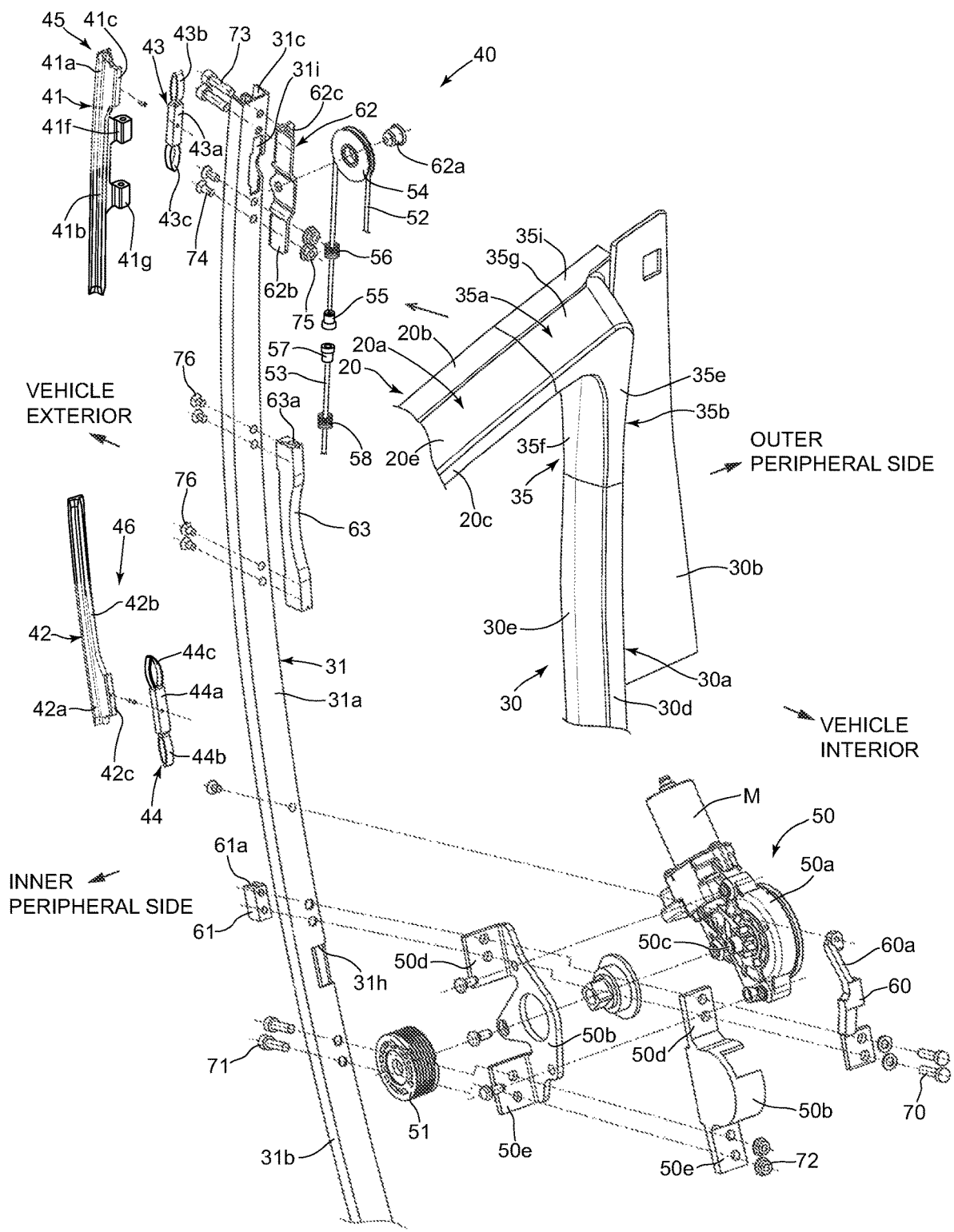
FIG. 8 is an exploded perspective view of a window regulator.
Figure 21:
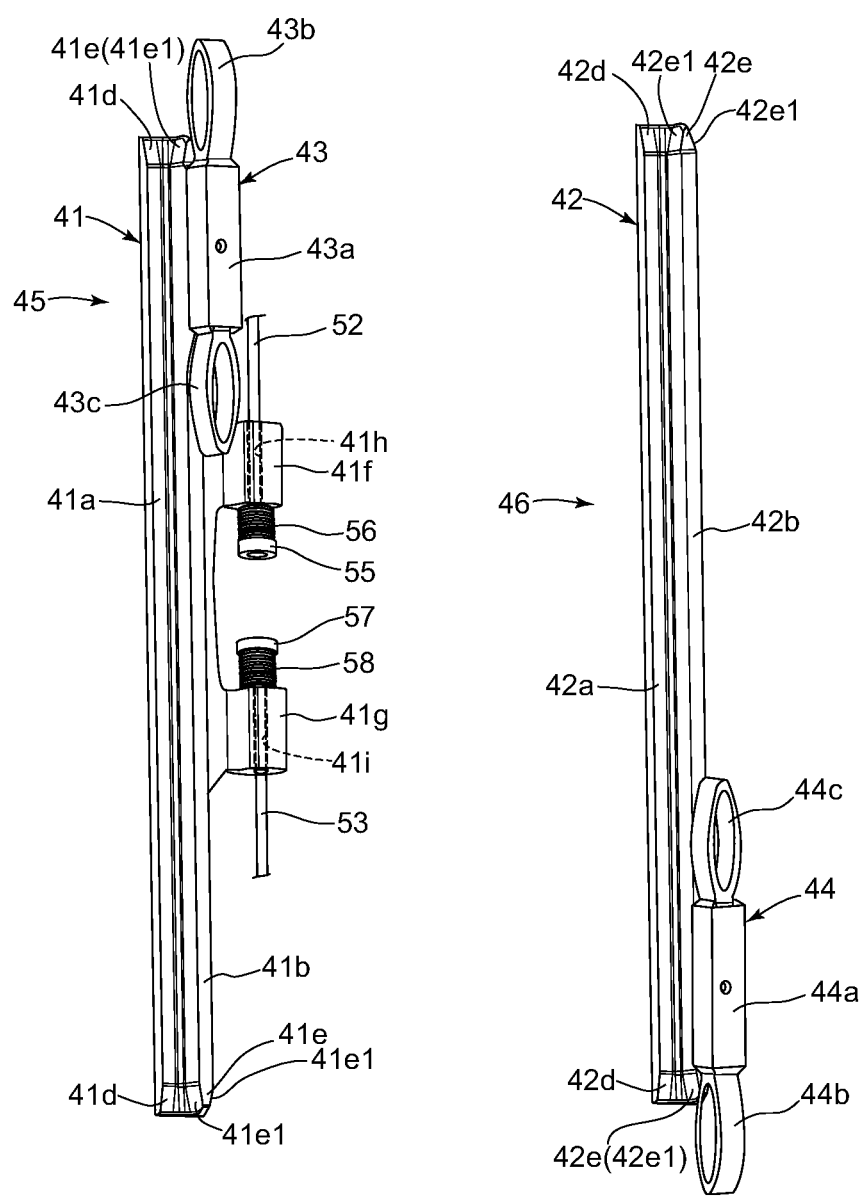
FIG. 21 is a perspective view of two sliders.

The window regulator 40 includes: two shoe bases, namely, upper and lower shoe bases 41 and 42 secured to the window glass W; and two shoes, namely, upper and lower shoes 43 and 44, which is mounted on each of the shoe bases 41 and 42 and supported to be vertically slidable with respect to the guide rail 31. As illustrated in FIGS. 8 and 21, the shoe 43 is attached to the shoe base 41 to form the upper slider 45 while the shoe 44 is attached to the shoe base 42 to form the lower slider 46. The guide rail 31 that forms the upright pillar sash 12 in cooperation with the inner sash 30 also functions as a vertical movement guide part for the sliders 45 and 46 in the window regulator 40.

The guide rail 31 extends downward below the inner sash 30 and the inner cover 36 (refer to FIGS. 3 and 4). The guide rail 31 is exposed, not surrounded by the inner sash 30 or the inner cover 36 in the internal space of the door panel 10a. A motor unit 50 including a motor M as a drive source of the window regulator 40 is attached to an exposed portion of the guide rail 31 in the internal space of the door panel 10a (refer to FIGS. 1, 8, and 19).

One end of each of a first wire 52 and a second wire 53 is connected to a winding drum 51 (refer to FIGS. 8, 22 to 24) built in the motor unit 50. The first wire 52 extends upward from the winding drum 51 so as to be wound around a guide pulley 54 rotatably supported near the upper end of the guide rail 31 (door corner part 10d), and then turns downward, with the other end connected to the shoe base 41 of the slider 45 from above. The second wire 53 extends upward from the winding drum 51, having the other end connected to the shoe base 41 of the slider 45 from below.

Rotating the winding drum 51 by driving the motor M of the motor unit 50 relatively changes the winding amount of the first wire 52 and the second wire 53 with respect to a spiral groove formed on a peripheral surface of the winding drum 51. Rotating the winding drum 51 in the first direction to increase the winding amount of the first wire 52 will pull the slider 45 (shoe base 41) upward by the first wire 52, so as to move the slider 45 upward while allowing the sliding movement of the shoe 43 along the guide rail 31. Rotating the winding drum 51 in the second direction to increase the winding amount of the second wire 53 will pull the slider 45 (shoe base 41) downward by the second wire 53, so as to move the slider 45 downward while allowing the sliding movement of the shoe 43 along the guide rail 31. The wires 52 and 53, opposite to the side on which the winding amount increases, are unwound (loosened) from the winding drum 51 so as to follow the movement of the slider 45. Vertical movement of the slider 45 causes the window glass W secured to the shoe base 41 to perform vertical operation. The slider 46 secured to the window glass W via the shoe base 42 moves together with the window glass W while allowing sliding movement of the shoe 44 along the guide rail 31 so as to stabilize the posture of the window glass W. The detailed structure of the window regulator 40 that operates as described above will be described.

Out of the elements included in the slider 45 and the slider 46, the shoe base 41 and the shoe base 42 secured to the window glass W are rigid bodies formed of metal or the like. Each of the shoe 43 and the shoe 44 moving along the guide rail 31 is formed of a material such as synthetic resin having a lower hardness than the metal or the like forming the guide rail 31 in order to achieve smooth movement while preventing abnormal noise and vibration.

Figure 15:
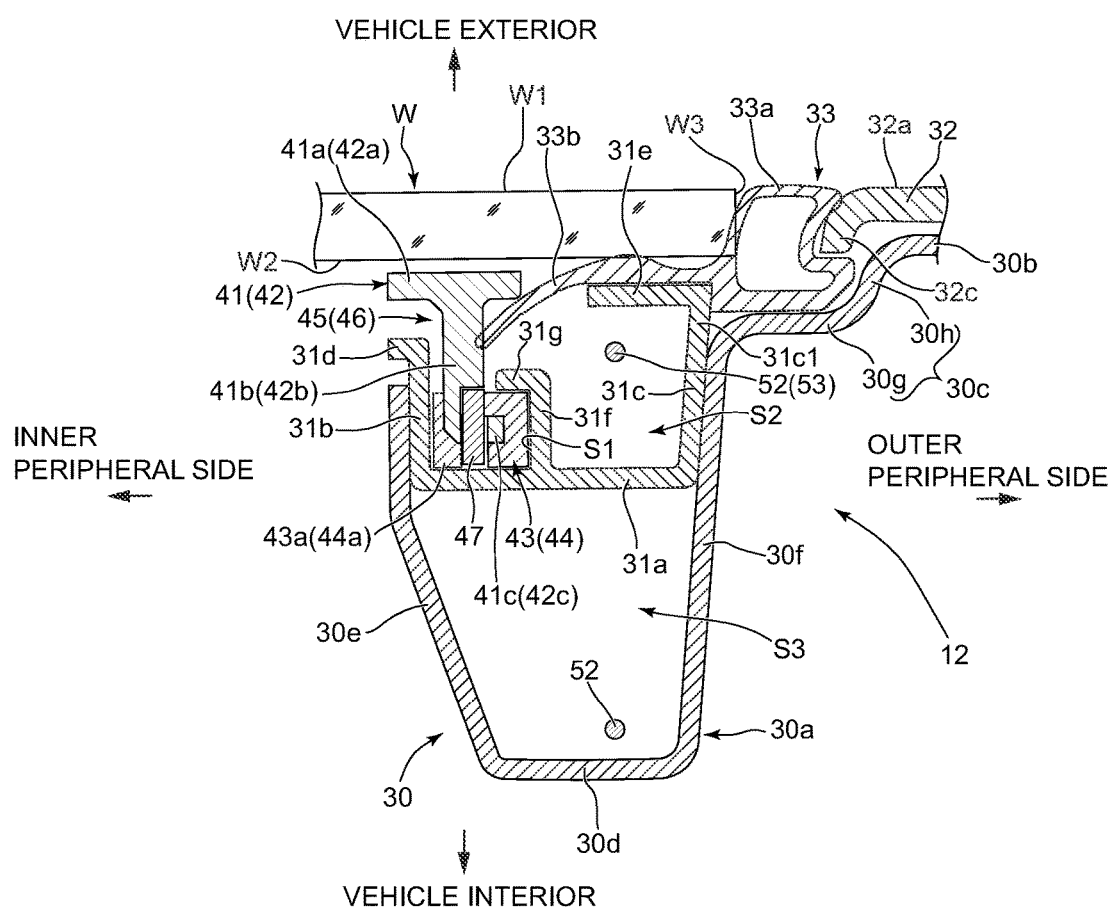
FIG. 15 is a cross-sectional view of the upright pillar sash at a position along line XV-XV in FIG. 24.

As illustrated in FIGS. 8 and 21, the shoe base 41 has a vertically long shape, and includes: a glass support 41a located on the vehicle exterior side; a connection part 41b protruding toward the vehicle interior side from the glass support 41a; and a shoe support 41c provided at the vehicle interior side end of the connection part 41b. As illustrated in FIGS. 15 and 16, the glass support 41a is a plate part whose front and back surfaces (side surfaces) facing the vehicle interior and exterior directions, with the vehicle exterior side surface of the glass support 41a arranged opposite the vehicle interior side surface W2 of the window glass W. The connection part 41b is a plate part that protrudes from the vehicle interior side surface of the glass support 41a, having both side surfaces facing the inner and outer peripheral directions. That is, the glass support 41a and the connection part 41b of the shoe base 41 have a substantially T-shaped cross section perpendicular to the longitudinal direction (refer to FIG. 25(A)).

Figure 25:
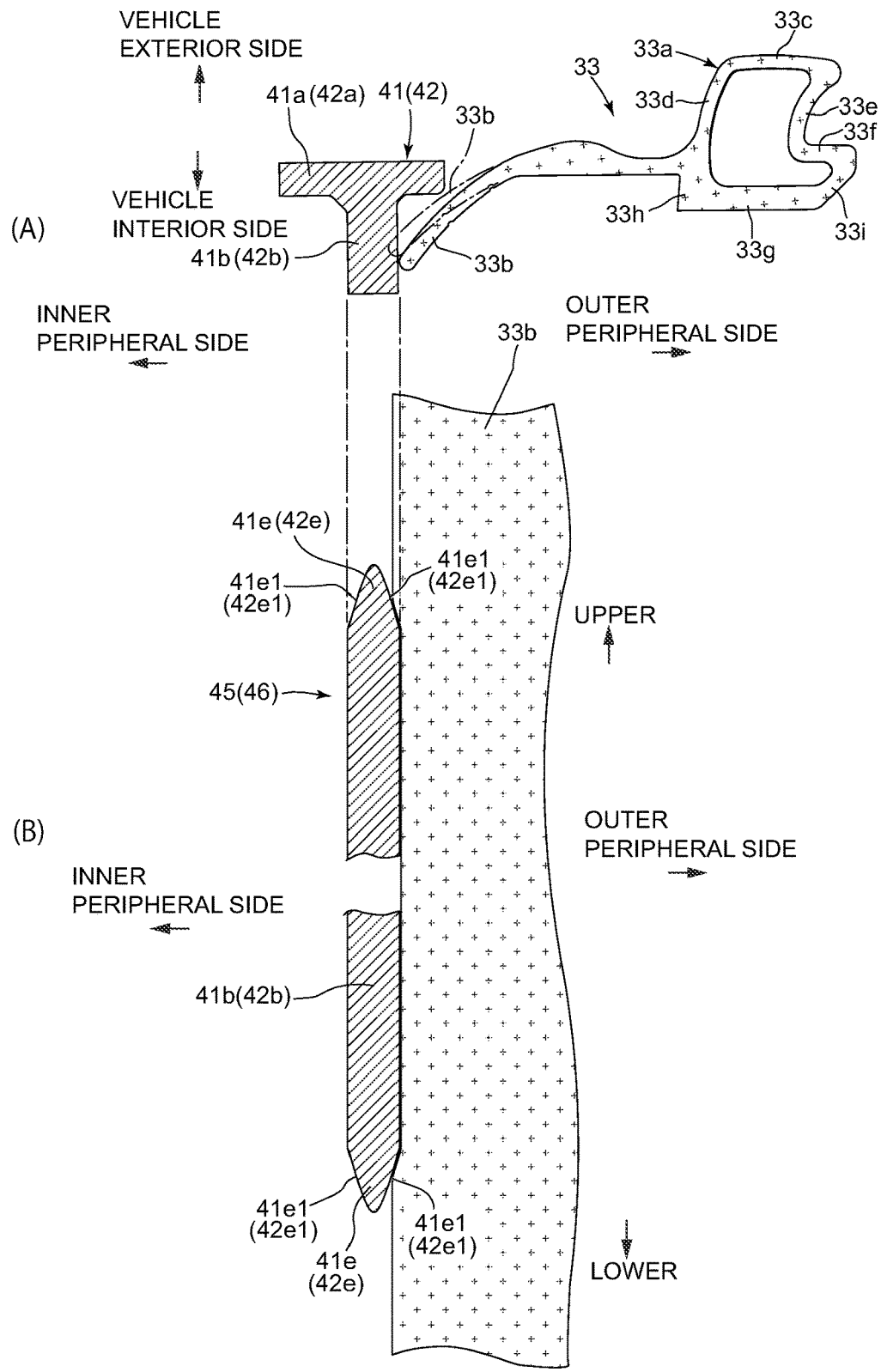
FIG. 25 is a cross-sectional view illustrating a contact relationship between a shoe base of the slider and a lip part of the elastic cover.

The glass support 41a and the connection part 41b each have a load reduction part 41d and a load reduction part 41e at both ends in the longitudinal direction. The surface of the glass support 41a facing the vehicle interior side is a tapered surface that is inclined toward the vehicle exterior side while approaching the tip near the end in the longitudinal direction. A tapered portion (having a shape that gradually reduces the cross-sectional area) formed by this tapered surface is the load reduction part 41d. As illustrated in FIG. 25(B), a side surface facing the inner peripheral side and a side surface facing the outer peripheral side individually form tapered surfaces 41e1 that reduce the distance between each other while proceeding to the tip at a portion near the end of the connection part 41b in the longitudinal direction.

A tapered portion (having a shape that gradually reduces the cross-sectional area) formed by these tapered surfaces 41e1 is the load reduction part 41e.

The surface of the glass support 41a facing the vehicle exterior side is secured to the vehicle interior side surface W2 of the window glass W by bonding or the like. A portion of the connection part 41b on the upper end side increases the amount of protrusion toward the vehicle interior side and passes through the space between the inner peripheral side wall 31b and the holding wall 31g of the guide rail 31, and then enters the first section S1 (refer to FIGS. 15 and 16). The shoe support 41c is provided in the protruding portion of the connection part 41b inserted into the first section S1. The shoe support 41c has an L-shaped cross-sectional shape in which the vehicle interior side end of the connection part 41b is bent toward the outer peripheral side. The shoe 43 is to be attached to the shoe support 41c (refer to FIGS. 15 and 16).

As illustrated in FIG. 8 and FIG. 21, the shoe 43 has a vertically long shape and includes: a sliding base 43a located in the middle in the longitudinal direction; and a first elastic contact part 43b and a second elastic contact part 43c respectively protruding from the upper and lower ends of the sliding base 43a. The sliding base 43a is a solid structure having a substantially rectangular cross section perpendicular to the longitudinal direction of the shoe 43. The shoe support 41c is inserted into the sliding base 43a. The sliding base 43a is secured to the shoe support 41c via a connection pin 47 (refer to FIG. 15).

The first elastic contact part 43b is an elongated ring-shaped body protruding from the upper end surface of the sliding base 43a, having a shape in which a pair of curved parts protruding toward vehicle interior and exterior directions is connected at upper and lower ends, with a hollow part between the pair of curved parts penetrating in the inner and outer peripheral directions. With this shape, the first elastic contact part 43b is easily elastically deformed in the vehicle interior and exterior directions.

The second elastic contact part 43c is an elongated ring-shaped part protruding from the lower end surface of the sliding base 43a, having a shape in which a pair of curved parts protruding toward the inner and outer peripheral directions is connected at upper and lower ends, with a hollow part between the pair of curved parts penetrating in the vehicle interior and exterior directions. With this shape, the second elastic contact part 43c is easily elastically deformed in the inner and outer peripheral directions.

The shoe 43 is inserted into the first section S1 of the guide rail 31 (refer to FIGS. 15 and 16). In the shoe base 41, the connection part 41b connecting the glass support 41a and the shoe support 41c passes between the inner peripheral side wall 31b and the holding wall 31g without interfering with the guide rail 31. Four outer surfaces of the sliding base 43a having a rectangular cross section slidably and opposedly come in contact with the vehicle interior side wall 31a, the inner peripheral side wall 31b, the partition wall 31f, and the holding wall 31g of the guide rail 31 surrounding the first section S1. With this configuration, the shoe 43 is supported so as to be slidable in the vertical direction within the first section S1 while being regulated in the movement with respect to the guide rail 31 in the vehicle interior and exterior directions and the inner and outer peripheral directions.

The first elastic contact part 43b of the shoe 43 faces the vehicle interior side wall 31a and the holding wall 31g arranged opposite each other in the vehicle interior and exterior directions within the first section S1 (refer to FIG. 18). The first elastic contact part 43b is biased in either vehicle interior side or the vehicle interior side so as to maintain a state of contact with either the holding wall 31g or the vehicle interior side wall 31a. This suppresses backlash of the shoe 43 in the vehicle interior and exterior directions. In the present embodiment, the first elastic contact part 43b is biased in a direction (vehicle exterior side) to come in contact with the holding wall 31g (refer to FIG. 18).

The second elastic contact part 43c of the shoe 43 faces the inner peripheral side wall 31b and the partition wall 31f arranged opposite the inner and outer peripheral directions within the first section S1. The second elastic contact part 43c is biased in a direction that is either the inner peripheral side and the outer peripheral side so as to maintain a state of contact with either the inner peripheral side wall 31b or the partition wall 31f. This suppresses backlash of the shoe 43 in the inner and outer peripheral directions.

Compared with the first elastic contact part 43b and the second elastic contact part 43c, which are thin and hollow and thus easily elastically deformed, the sliding base 43a has a thicker solid structure and a higher hardness. This configuration enables the shoe 43 to slide with high positioning accuracy with respect to the guide rail 31 in both the vehicle interior and exterior directions and the inner and outer peripheral directions.

The lip part 33b of the elastic cover 33 is in a free state (state where the base portion of the lip part 33b is merely held between the vehicle interior side surface W2 of the window glass W and the cover wall 31e of the guide rail 31 as illustrated in FIG. 9), with the portion near the tip located on the movement trajectory of the shoe base 41. Therefore, the vertical movement of the slider 45 in a state of being supported on the guide rail 31 via the shoe 43 will allow the lip part 33b to come in contact with the shoe base 41 and receive a pressing force so as to be elastically deformed.

More specifically, FIGS. 9 to 11 and FIGS. 14 to 18 illustrate the shape of the lip part 33b in the free state. FIGS. 25(A) and 25(B) illustrate the shape of the lip part 33b in contact with the shoe base 41. FIG. 25(A) illustrates a cross section perpendicular to the longitudinal direction of the shoe base 41. FIG. 25(B) illustrates a cross section in the longitudinal direction of the shoe base 41. As illustrated in FIG. 25(A), the lip part 33b allows its intermediate portion to pass through a position near the corner of the glass support 41a on the outer peripheral side and on the vehicle interior side and allows its tip portion to come in contact with the outer peripheral side surface of the connection part 41b. The tip portion of the lip part 33b is pressed by the shoe base 41, whereby the lip part 33b is elastically deformed toward the vehicle interior side and the outer peripheral side with the part sandwiched between the vehicle interior side surface W2 of the window glass W and the cover wall 31e as a fulcrum. The shape of the lip part 33b before elastic deformation is illustrated by a one-dot chain line in FIG. 25(A). Since the lip part 33b originally has a curved shape that is easily elastically deformed in the direction and thus can be smoothly deformed without applying an excessive load to the shoe base 41.

Furthermore, the load reduction part 41e is formed at both ends of the connection part 41b where the tip portion of the lip part 33b is first pressed by the vertically moving shoe base 41. As illustrated in FIG. 25(B), the load reduction part 41e has a tapered shape whereby the tapered surface 41e1 provided on both sides in the inner and outer peripheral directions reduces the cross-sectional area toward the end (traveling direction) of the shoe base 41 and reduces the contact pressure onto the lip part 33b. Therefore, the moving shoe base 41 always starts to press the lip part 33b smoothly with a small load by the load reduction part 41e.

Similar to the load reduction part 41e of the connection part 41b, the load reduction parts 41d provided at both ends of the glass support 41a have an effect of reducing the load when the glass support 41a comes into contact with the lip part 33b. As illustrated by a one-dot chain line in FIG. 25(A), the lip part 33b is designed so as to be in proximity to the glass support 41a without coming into contact with the glass support 41a in a free state not to be pressed by the connection part 41b. This allows the load reduction part 41d to have an auxiliary role that functions only when the lip part 33b approaches exceeding the designed position to come into contact with the glass support 41a due to variations in accuracy or the like.

As described above, with the presence of the load reduction part 41e and the load reduction part 41d provided on the shoe base 41, the smooth elastic deformation of the lip part 33b and the smooth movement of the shoe base 41 can be achieved without causing an obstruction between the shoe base 41 and the lip part 33b. Furthermore, it is possible to obtain an effect of suppressing an abnormal sound (such as chattering sound of the lip part 33b) generated between the shoe base 41 and the lip part 33b. The load reduction part 41e and the load reduction part 41d on the upper end side contribute to improving the smoothness of operation when the shoe base 41 moves upward, while the load reduction part 41e and the load reduction part 41d on the lower end side contribute to improving the smoothness of operation when the shoe base 41 moves downward.

Note that the connection part 41b of the shoe base 41 may also employ an asymmetric structure having the tapered surface 41e1 only on the outer peripheral side with which the tip portion of the lip part 33b comes in contact instead of a configuration having a tapered surface 41e1 on both the inner peripheral side and the outer peripheral side like the above-described load reduction part 41e.

Similar to the shoe base 41, the shoe base 42 has a vertically long shape, and includes: a glass support 42a located on the vehicle exterior side; a connection part 42b protruding toward the vehicle interior side from the glass support 42a; and a shoe support 42c provided at the vehicle interior side end of the connection part 42b. (refer to FIGS. 8 and 21).

The shoe base 42 has substantially the same structure as the shoe base 41 described above (structure in which the glass support 41a, the connection part 41b, and the shoe support 41c are turned upside down) and arrangements and the roles with respect to the guide rail 31 in individual portions are similar to those of the shoe base 41, and thus, detailed description is omitted. The load reduction part 41d and the load reduction part 42e (tapered surfaces 41e2) formed at the upper and lower ends of the glass support 42a also function similar to the load reduction part 41d and the load reduction part 41e of the shoe base 41. In FIGS. 25(A) and 25(B), reference numerals in parentheses indicate portions of the shoe base 42 corresponding to the shoe base 41.

The shoe 44 includes a sliding base 44a having a solid structure, and a first elastic contact part 44b and a second elastic contact part 44c respectively protruding from the lower end and the upper end of the slide base 44a. The sliding base 44a, the first elastic contact part 44b, and the second elastic contact part 44c have substantially the same structure as the sliding base 43a, the first elastic contact part 43b, and the second elastic contact part 43c of the shoe 43 described above, respectively (structure in which the first elastic contact part 43b and the second elastic contact part 43c are exchanged upside down) in which arrangements and roles of individual portions with respect to the guide rail 31 are similar to the shoe 43 side, and thus, detailed description is omitted.

As described above, the lower slider 46 has the basic structure similar to the upper slider 45. FIG. 15 illustrates a cross-sectional position passing through the slider 45 and also illustrates signs indicating the components of the slider 46 in parentheses in order to indicate that the slider 46 is also guided by the guide rail 31 in a similar manner.

Figure 20:
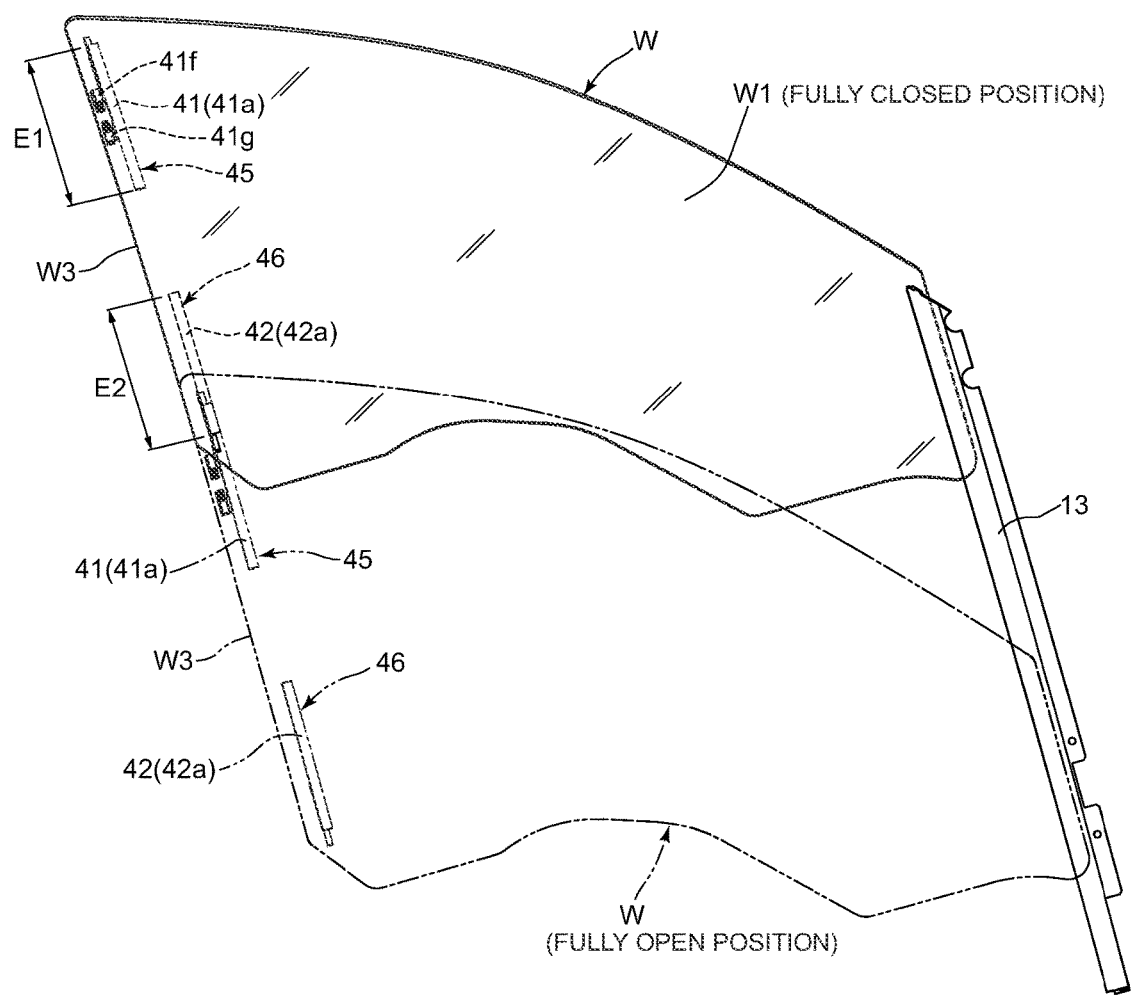
FIG. 20 is a side view illustrating a positional relationship between window glass and a slider.

As illustrated in FIG. 20, the shoe base 41 of the slider 45 and the shoe base 42 of the slider 46 individually support the rear edge side along the upright pillar sash 12 in the window glass W. The glass support 41a of the shoe base 41 located above is secured to the window glass W over a range E1 (FIG. 20) in the vertical direction from the vicinity of the upper end of the rear edge of the window glass W downward. The glass support 42a of the shoe base 42 located below is secured to the window glass W over a range E2 (FIG. 20) in the vertical direction from the vicinity of the lower end of the rear edge of the window glass W upward.

In this manner, since the slider 45 and the slider 46 constituting the window regulator 40 support the window glass W at positions largely separated in the vertical direction, the position accuracy and stability of the window glass W are extremely high in the portion along the upright pillar sash 12. In particular, as illustrated in FIG. 20, the window glass W has a configuration in which the rear edge along the upright pillar sash 12 is vertically longer than the front edge along the front sash 13. By arranging the slider 45 and the slider 46 at positions spaced from each other near the upper end and the lower end of the rear edge of the window glass W, it is possible to dramatically increase the effective support length with respect to the window glass W in the vertical direction, enabling acquisition of sufficient stability and support strength even in a structure in which a single-side edge in the front-rear directions supports the window glass W.

In the upper slider 45, a shoe 43 is provided near the upper end of the shoe base 41, while in the lower slider 46, a shoe 44 is provided near the lower end of the shoe base 42 (refer to FIGS. 8, 21, 23, and 24). This arrangement makes it possible to obtain the largest shoe pitch (the interval in the vertical direction between the two shoes 43 and 44) within a range in the vertical direction where the shoe bases 41 and 42 are provided. The greater the shoe pitch, the higher the easiness in suppressing the inclination of the window glass W with respect to the guide rail 31 (inclination in the inner and outer peripheral directions in particular), leading to highly accurate support and higher stability of the window glass W.

The upright pillar sash 12 supporting the window glass W with such excellent accuracy and stability includes no elastic member such as the glass run 23 of the upper sash 11 for holding the window glass W in the vehicle interior and exterior directions. The elastic cover 33 coming in contact with the rear edge of the window glass W ensures waterproofness between the window glass W and the upright pillar sash 12 (garnish 32) and functions as an external component of the upright pillar sash 12, making it possible to have a cross-sectional shape more compact and simple compared to the glass run 23.

As illustrated in FIGS. 8 and 21, the shoe base 41 constituting the upper slider 45 further includes a portion for connecting the first wire 52 and the second wire 53. A pair of upper and lower arms protruding sideways from the connection part 41b is provided below the shoe support 41c (refer to FIG. 8), and a wire end support 41f and a wire end support 41g are provided at the tip of individual arms. The wire end supports 41f and 41g are individually formed integrally with the main body of the shoe base 41.

With the shoe 43 inserted into the first section S1 of the guide rail 31, the wire end support 41f and the wire end support 41g individually enter the second section S2 (refer to FIG. 17). Each of the wire end supports 41f and 41g has a wire insertion hole 41h and a wire insertion hole 41i respectively penetrating in the vertical direction. Each of the wire insertion hole 41h and the wire insertion hole 41i is a hole having a closed cross-sectional shape that is open only at both ends in the vertical direction and not having an opening on the sides (vehicle interior and exterior directions or inner and outer peripheral directions).

The first wire 52 is inserted into the wire insertion hole 41h of the wire end support 41f, and a wire end 55 to which the end of the first wire 52 is connected is located below the wire end support 41f. The first wire 52 extends upward from the wire insertion hole 41h through the inside of the second section S2. The upper end surface of the wire end 55 (an end surface on the side to which the first wire 52 is connected) comes in contact with the lower end surface of the wire end support 41f, thereby regulating the upward movement of the wire end 55 with respect to the shoe base 41 (force generated by pulling the wire end 55 upward will be transmitted to the shoe base 41).

The wire end 55 has a large diameter flange near the lower end, and a compression spring 56 is inserted between the flange and the wire end support 41f. The wire end 55 is biased downward with respect to the shoe base 41 by the compression spring 56, and the slack of the first wire 52 is removed by the biasing force.

The second wire 53 is inserted into the wire insertion hole 41i of the wire end support 41g, and a wire end 57 to which the end of the second wire 53 is connected is located above the wire end support 41g. The second wire 53 extends downward from the wire insertion hole 41i through the second section S2. The lower end surface of the wire end 57 (an end surface on the side to which the second wire 53 is connected) comes in contact with the upper end surface of the wire end support 41g, thereby regulating the downward movement of the wire end 57 with respect to the shoe base 42 (force generated by pulling the wire end 57 downward will be transmitted to the shoe base 41).

The wire end 57 has a large diameter flange near the upper end, and a compression spring 58 is inserted between the flange and the wire end support 41g. The wire end 57 is biased upward with respect to the shoe base 41 by the compression spring 58, and the slack of the second wire 53 is removed by the biasing force.

The first section S1 in which the shoes 43 and 44 are inserted, and the second section S2 in which the wire end supports 41f and 41g of the shoe bases 41 and 42 are disposed, are located on the vehicle exterior side with respect to the vehicle interior side wall 31a of the guide rail 31. Meanwhile, the motor unit 50 is attached to the vehicle interior side surface of the vehicle interior side wall 31a of the guide rail 31 in the door panel inner space below the belt line reinforcement 16.

As illustrated in FIG. 8, the motor unit 50 includes: a drive unit 50a equipped with a motor M, a reduction gear mechanism, or the like; and a drum housing 50b that rotatably houses the winding drum 51. The peripheral surface of the drum housing 50b has a notch to allow passage of the first wire 52 and the second wire 53 extending from the winding drum 51. When the drive unit 50a and the drum housing 50b are combined, a drive shaft 50*c* provided on the drive unit 50*a* is linked to a shaft hole of the winding drum 51, allowing the driving force of the motor M to be transmitted to the winding drum 51.

The motor unit 50 is secured to the guide rail 31 by bringing upper and lower brackets 50*d* and 50*e* provided on the drum housing 50*b* into contact with the vehicle interior side surface of the vehicle interior side wall 31*a* and then bolting the contact portion. When the motor unit 50 is secured, the center of rotation of the winding drum 51 (axis of the drive shaft 50*c*) faces the inner and outer peripheral directions.

Figure 22:
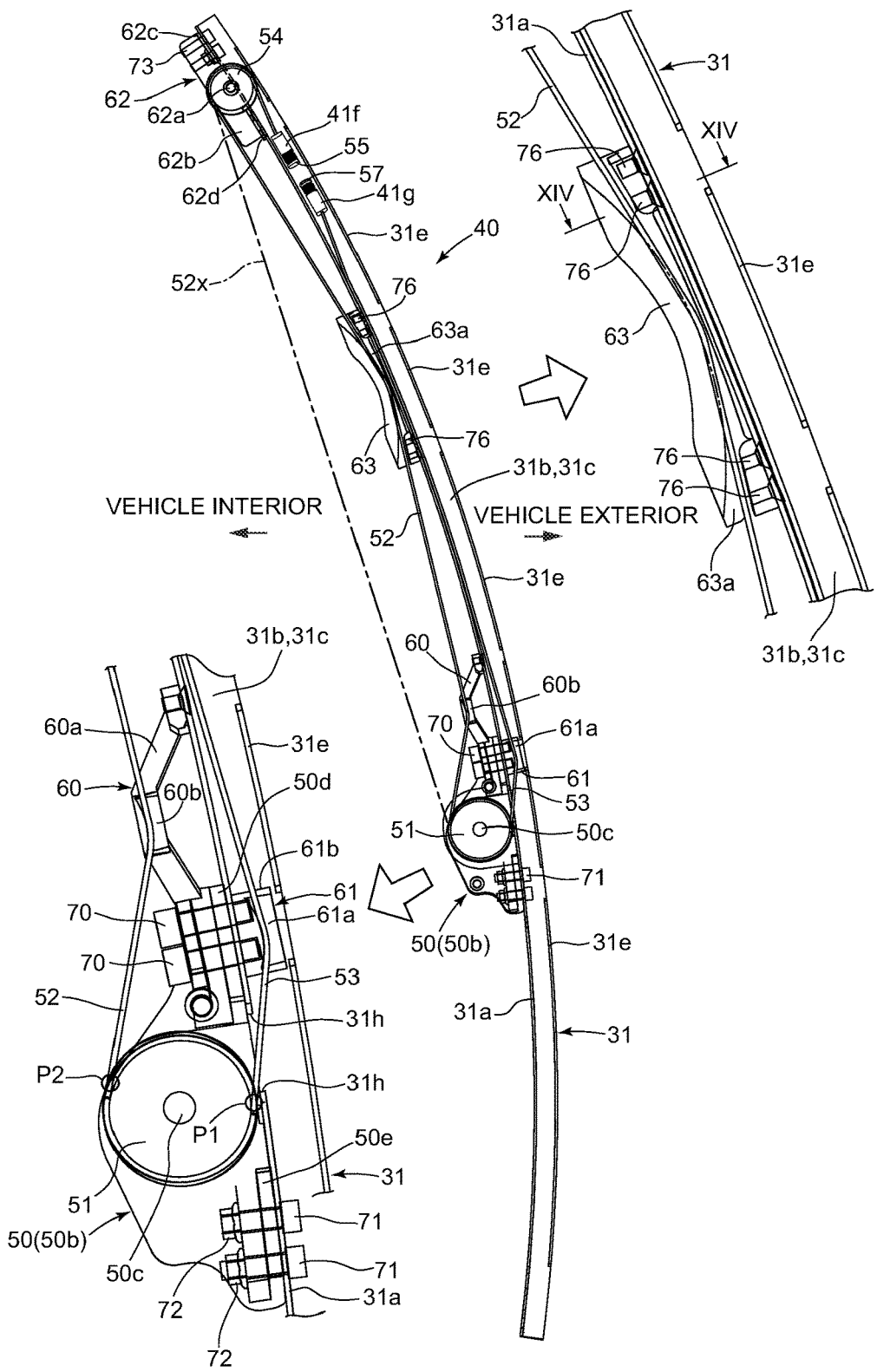
FIG. 22 is a partial see-through rear view of the window regulator.

The vehicle interior side wall 31*a* of the guide rail 31 is provided with a through hole 31*h* formed between the fastening positions of the bracket 50*d* and the bracket 50*e* in the vertical direction (refer to FIGS. 8 and 22). The through hole 31*h* is provided in a region of the vehicle interior side wall 31*a* that forms the second section S2 (a region closer to the outer peripheral side in the inner and outer peripheral directions).

At a position slightly above the through hole 31*h*, a wire guide member 60 and a wire guide member 61 are attached to the vehicle interior side wall 31*a* of the guide rail 31. The wire guide member 60 and the wire guide member 61 are secured to the vehicle interior side wall 31*a* together with the bracket 50*d* of the drum housing 50*b* using bolts 70.

The wire guide member 60 is secured so as to overlap the vehicle interior side of the bracket 50*d*, having a through hole for insertion of the bolt 70 formed on each of the wire guide member 60 and the bracket 50*d*. The wire guide member 61 is located in the second section S2 of the guide rail 31, being in contact with and secured to the vehicle exterior side surface of the vehicle interior side wall 31*a*. The wire guide member 61 has a screw hole facing the vehicle interior side, and a through hole communicating with the screw hole is formed in the vehicle interior side wall 31*a*. The bolt 70 allows its threaded part to be inserted into the through hole on each of the wire guide member 60, the bracket 50*d*, and the vehicle interior side wall 31*a* from the vehicle interior side so as to screw the threaded part to the screw hole of the wire guide member 61. The tip of the threaded part of the bolt 70 in the fixed state is located in the screw hole of the wire guide member 61, not being exposed in the second section S2 of the guide rail 31 (refer to FIG. 22). That is, the bolt 70 would not interfere with the wire end supports 41*f* or 41*g* of the shoe base 41, or the wires 52 and 53 passing through the second section S2.

The wire guide member 60 is provided with an arm part 60*a* extending upward from a position where the wire guide member is fastened by the bolt 70. The upper end of the arm part 60*a* is secured to the guide rail 31 by a bolt different from the bolt 70. The arm part 60*a* is provided with a guide groove 60*b* extending in the vertical direction. The guide groove 60*b* is a bottomed groove that opens toward the vehicle exterior side, arranged to be opposite the vehicle interior side surface of the vehicle interior side wall 31*a* of the guide rail 31 at a predetermined interval (refer to FIG. 22).

As illustrated in FIG. 22, a guide groove 61*a* extending in the vertical direction is formed in the wire guide member 61. The guide groove 61*a* is a bottomed groove that opens toward the vehicle exterior side. A stopper surface 61*b* is formed on the upper end of the wire guide member 61. When the shoe base 41 moves downward in the second section S2 of the guide rail 31, the lower end surface of the lower wire end support 41*g* comes in contact with the stopper surface 61*b* so as to regulate further downward movement of the shoe base 41 (refer to FIG. 24). This contact will determine the downward moving end (bottom dead center) of the window glass W supported by the shoe base 41.

The lower bracket 50*e* of the drum housing 50*b* is secured to the guide rail 31 via a bolt 71 and a nut 72. The bolt 71 allows its threaded part to be inserted from the vehicle exterior side into a through hole formed in the bottom of the second section S2 of the vehicle interior side wall 31*a* and a through hole formed in the bracket 50*d* so as to be screwed to the nut 72. The head of the bolt 71 is located in the second section S2. The fastening position by the bolt 71 is below the winding drum 51 in the drum housing 50*b*. Therefore, the wire end supports 41*f* and 41*g* of the shoe base 41 and the wires 52 and 53 of the shoe base 41 passing through the second section S2 will not reach the position of the head of the bolt 71, with no concern of interference with the bolt 71 (refer to FIG. 22).

In the vicinity of the upper end of the guide rail 31, a pulley bracket 62 is secured to the vehicle interior side surface of the vehicle interior side wall 31*a* by bolting. The guide pulley 54 is rotatably supported by the pulley bracket 62 via a pulley pin 62*a*. The guide pulley 54 is a disc-shaped member including an annular wire guide groove formed on the outer periphery. The rotation center (axis of the pulley pin 62*a*) of the guide pulley 54 faces the inner and outer peripheral directions in a state where the pulley bracket 62 is secured to the guide rail 31.

As illustrated in FIG. 8, the guide rail 31 is provided with a through hole 31*i* penetrating through the vehicle interior side wall 31*a*, in the vicinity of the mounting position of the pulley bracket 62. The through hole 31*i* is provided in a region of the vehicle interior side wall 31*a* that forms the second section S2 (a region closer to the outer peripheral side in the inner and outer peripheral directions). The second section S2 and the third section S3 communicates with each other via the through hole 31*i*. As illustrated in FIG. 16, the pulley pin 62*a* is located in the third section S3, and the guide pulley 54 directs its radial direction orthogonal to the axis of the pulley pin 62*a* to the vehicle interior and exterior directions, so as to be arranged over the second section S2 and the third section S3 through the through hole 31*i*.

The guide rail 31 and the connecting member 35 are combined at the door corner part 10*d* to which the guide pulley 54 is attached. The guide pulley 54 and the pulley bracket 62 are disposed so as to fit in a space surrounded by the vehicle interior side wall 35*e*, the inner peripheral side wall 35*f*, and the outer peripheral side wall 35*g* in the second frame part 35*b* of the connecting member 35, not being exposed to the outside of the upright pillar sash 12.

More specifically, the pulley bracket 62 is long in the vertical direction (refer to FIGS. 6, 8, and 22 to 24), and has an L-shape including: a plate-shaped pulley support 62*b* extending in the vehicle interior and exterior directions; and a pair of upper and lower support seats 62*c* and 62*d* extending from the vehicle exterior side end of the pulley support 62*b* (refer to FIGS. 17 and 18) to the outer peripheral side in a top view (or in a cross-sectional view perpendicular to the longitudinal direction). The support seat 62*c* and the support seat 62*d* come in contact with the vehicle interior side surface of the vehicle interior side wall 31*a* of the guide rail 31. The support seat 62*c* and the support seat 62*d* are vertically separated from each other. The through hole 31*i* is formed in the vehicle interior side wall 31*a* between positions where the support seats 62*c* and the support seat 62*d* come in contact with each other. The pulley pin 62*a* is supported by the pulley support 62b at a vertical position between the support seat 62c and the support seat 62d (refer to FIG. 6).

At the cross-sectional position in FIG. 18 where the upper support seat 62c of the pulley bracket 62 is attached to the guide rail 31, the thick part 35m of the connecting member 35 is arranged on the vehicle interior side of the vehicle interior side wall 31a, and the escape recess 35n and the screw hole 35p are formed in the thick part 35m. The support seat 62c is located in the escape recess 35n, sandwiched between the vehicle interior side wall 31a and the thick part 35m, while a surface facing the vehicle interior side is brought in contact with the thick part 35m. Each of the support seat 62c and the vehicle interior side wall 31a is provided with a through hole communicating with the screw hole 35p. The threaded parts of the bolts 73 are inserted into these through holes from the vehicle exterior side to the vehicle interior side, so as to be screwed into the screw holes 35p. The bolt 73 having its head located in the second section S2 of the guide rail 31 is tightened until the head comes in contact with the vehicle exterior side surface of the vehicle interior side wall 31a with a predetermined pressure. With this configuration, the support seat 62c is secured being sandwiched between the vehicle interior side wall 31a and the thick part 35m.

That is, the thick part 35m provided inside the second frame part 35b (the third section S3) of the connecting member 35 is defined as a support seat surface, and the screw hole 35p is recessed on the support seat surface, thereby providing a mounting part for the support seat 62c of the pulley bracket 62. The mounting part has a structure in which the support seat 62c is supported by the thick part 35m having high rigidity, and the bolt 73 is screwed into the screw hole 35p formed in the thick part 35m, leading to excellent binding strength. In addition, since the bolt 73 is directly screwed into the connecting member 35, leading to excellent workability in assembling parts inside the door corner part 10d having a complicated shape.

Figure 23:
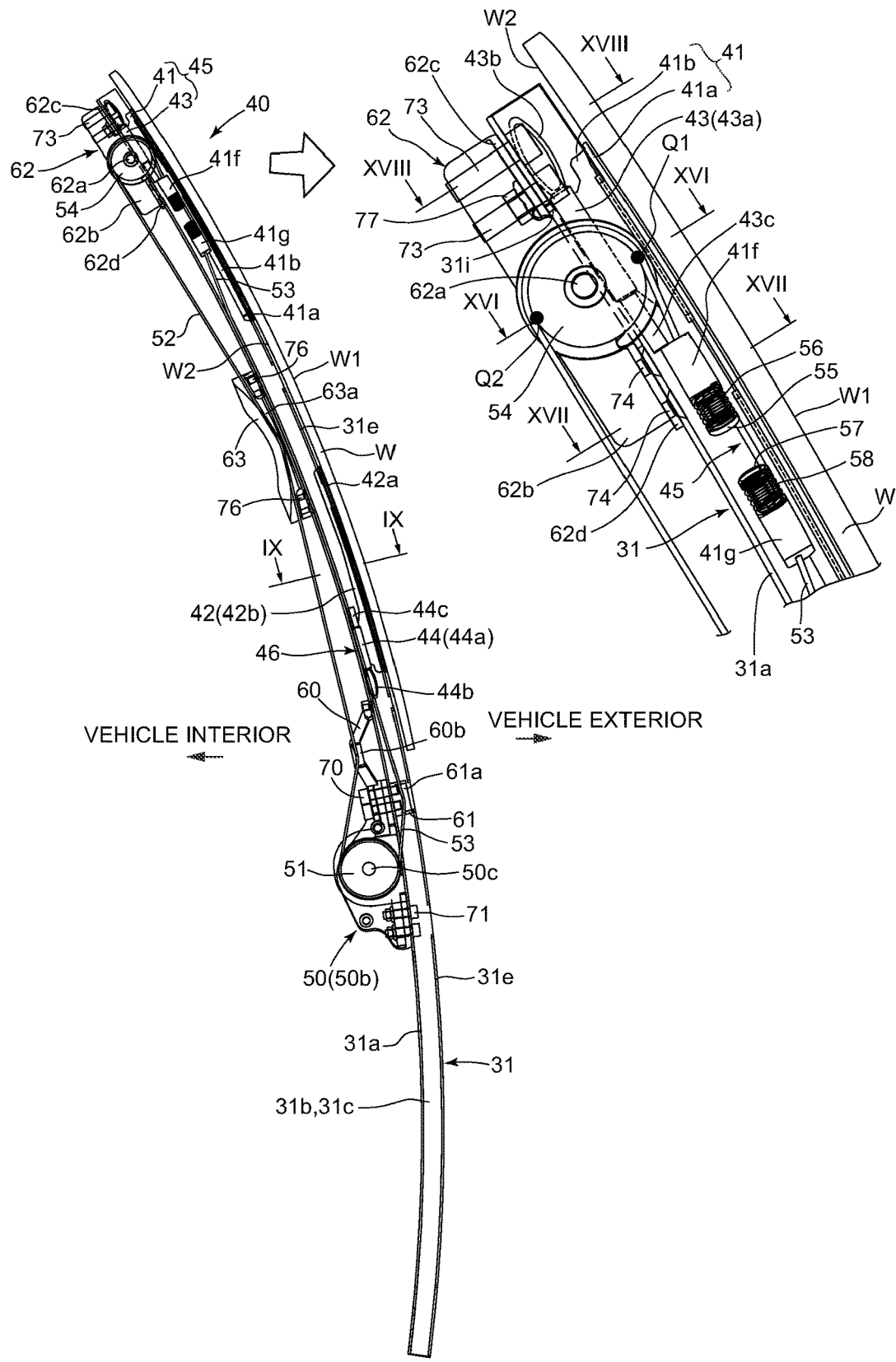
FIG. 23 is a partially see-through rear view of the window regulator in a fully closed state of window glass.

As illustrated in FIGS. 6 and 23, the support seat 62c is secured by using two bolts 73. The upper bolt 73 is screwed into the screw hole 35p of the connecting member 35 as described above. The threaded part of the lower bolt 73 is inserted into the space below the thick part 35m (internal space of the second frame part 35b of the connecting member 35) through each of the through holes of the support seat 62c and the vehicle interior side wall 31a so as to be screwed into the nut 77.

At the fastening position of the pulley bracket 62 by the upper bolt 73 (FIG. 18), the pulley support 62b and the support seat 62c are located in the escape recess 35n. Accordingly, the pulley bracket 62 will not interfere with the thick part 35m, and will not be exposed to affect the appearance of the upright pillar sash 12.

Moreover, the fastening position of the pulley bracket 62 by the bolts 73 is above the guide pulley 54. Therefore, the wire end supports 41f and 41g of the shoe base 41 and the wires 52 and 53 of the shoe base 41 passing through the second section S2 will not reach the position of the head of the bolts 73, with no concern of interference with the bolts 73.

At the cross-sectional position in FIG. 17 at which the lower support seat 62d of the pulley bracket 62 is attached to the guide rail 31, the connecting member 35 does not include the thick part 35m, allowing the third section S3 to have a wider area in the vehicle interior and exterior directions. A nut 75 separate from the connecting member 35 is arranged in the third section S3, and the support seat 62d and the guide rail 31 are fastened using a bolt 74 screwed to the nut 75. Through holes communicating with the screw holes of the nut 75 are individually formed in the support seat 62d and the vehicle interior side wall 31a. The threaded part of the bolt 74 is inserted into each of these through holes from the vehicle exterior side (the second section S2 side) toward the vehicle interior side so as to be screwed into the screw hole of the nut 75. The bolt 74 is tightened until the head comes in contact with the vehicle exterior side surface of the vehicle interior side wall 31a with a predetermined pressure.

At the fastening position of the pulley bracket 62 with the bolt 74, the pulley support 62b, the support seat 62d, and the nut 75 are housed in the third section S3, and thus, the pulley bracket 62 and the nut 75 are not exposed to the outside. Furthermore, since the bolt 74 is a flat head screw having substantially no head protrusion from the vehicle interior side wall 31a toward the vehicle exterior side, each of wire end supports 41f and 41g of the shoe base 41 and each of wires 52 and 53 passing through the second section S2 will not interfere with the head of the bolt 74.

As described above, by setting the direction of the axis of the pulley pin 62a serving as the rotation center in the inner and outer peripheral directions, the guide pulley 54 assembled to the guide rail 31 (and the connecting member 35) via the pulley bracket 62 is arranged over the second section S2 and the third section S3 via the through hole 31i (refer to FIG. 16). This makes it possible to guide the first wire 52 to the wire end support 41f of the shoe base 41 located in the second section S2 and to the winding drum 51 located below the third section S3 via the guide pulley 54.

The frame part 30a of the inner sash 30 and the second frame part 35b of the connecting member 35 in the upright pillar sash 12 have a depth in the vehicle interior and exterior directions greater than the width in the inner and outer peripheral directions (refer to FIGS. 9 and 14 to 17). The guide pulley 54 has a flat shape whose diameter is larger than the thickness in the axial direction. Accordingly, by arranging the guide pulley 54 with a diametric direction oriented in the vehicle interior and exterior directions across the second section S2 and the third section S3 in the second frame part 35b, it is possible to accommodate the guide pulley 54 inside the connecting member 35 with high space efficiency.

As illustrated in FIGS. 16 and 17, in the portion where the connecting member 35 is provided, the presence of the thick inner peripheral side wall 35f slightly decreases the region closer to the inner periphery of the third section S3 (the vehicle interior side region in the first section S1). However, the region of the third section S3 closer to the outer periphery (the region on the vehicle interior side of the second section S2) maintains an area substantially as large as the portion where the inner sash 30 is provided (refer to FIGS. 9, 14, and 15). Therefore, by arranging the guide pulley 54 at a position of a region close to the outer periphery in the third section S3, it is possible to accommodate the guide pulley 54 within the second frame part 35b while using the large-diameter guide pulley 54 having its outer periphery positioned in the vicinity of the vehicle interior side wall 35e. In other words, it is possible to use the guide pulley 54 maximum fittable in the second frame part 35b of the connecting member 35 while achieving the guide of the first wire 52 over the second section S2 and the third section S3 across the vehicle interior side wall 31a of the guide rail 31. The larger the diameter (radius of curvature) of the guide pulley 54, the gentler the curvature of the guided first wire 52 to be guided. Accordingly, this configuration is advantageous in reducing the resistance and achieving smoother operation at the time of driving the window regulator 40.

As illustrated in FIG. 8 and FIG. 22, the guide rail 31 is further equipped with a wire holding member 63 between a position where the motor unit 50 is mounted and a position where the guide pulley 54 (pulley bracket 62) is mounted in the vertical direction (at a substantially equal distance from the guide pulley 54 and the winding drum 51). The wire holding member 63 is provided at a general cross section in which the upright pillar sash 12 is formed by the inner sash 30 and the guide rail 31. The wire holding member 63 is housed inside the third section S3 (the vehicle interior side with respect to the second section S2) (refer to FIG. 14).

The wire holding member 63 is brought into contact with the vehicle interior side surface of the vehicle interior side wall 31a of the guide rail 31 and then bolted. A screw hole is formed in the wire holding member 63 toward the vehicle exterior side. A through hole communicating with the screw hole of the wire holding member 63 is formed in a region of the vehicle interior side wall 31a of the guide rail 31 where the second section S2 is formed. The threaded part of a bolt 76 is inserted into the through hole from the vehicle exterior side and screwed into the screw hole of the wire holding member 63, whereby the wire holding member 63 is secured to the guide rail 31 (refer to FIG. 23). Four bolts 76 are used at different positions in the vertical direction. Since the bolt 76 is a flat head screw having substantially no head protrusion from the vehicle interior side wall 31a toward the vehicle exterior side, each of wire end supports 41f and 41g of the shoe base 41 and each of wires 52 and 53 passing through the second section S2 will not interfere with the head of the bolt 76 (refer to FIG. 14).

The wire holding member 63 directs its longitudinal direction in the vertical direction and has a guide groove 63a extending in the vertical direction. As illustrated in FIG. 23, the guide groove 63a is a bottomed groove opening toward the vehicle exterior side, allowing a predetermined gap between the bottom surface of the guide groove 63a and the vehicle interior side wall 31a of the guide rail 31.

In the window regulator 40, the wires 52 and 53 are routed as follows. On the presumption that the door 10 has a curved outer surface shape protruding toward the vehicle exterior side, and correspondingly, the inner sash 30 and the guide rail 31 of the upright pillar sash 12 have curved shapes in which intermediate portions in the longitudinal direction (vertical direction) protrude toward the vehicle exterior side with respect to the upper and lower ends (refer to FIG. 4).

In the winding drum 51, the starting position of winding (pulling) of the second wire 53 into the spiral groove (illustrated as a winding start point P1 in FIG. 22) is set to the vehicle exterior side with respect to the drive shaft 50c that is the center of rotation. As illustrated in FIG. 22, the second wire 53 extends diagonally upward from the winding start point P1, so as to be guided into the second section S2 via the through hole 31h of the guide rail 31. The second wire 53 introduced to the second section S2 is inserted into the guide groove 61a of the wire guide member 61 located slightly above the through hole 31h. The deflection of the second wire 53 in the inner and outer peripheral directions is regulated by both side surfaces of the guide groove 61a.

The bottom surface of the guide groove 61a of the wire guide member 61 is a curved surface protruding toward the vehicle exterior side, having a curvature greater than in the vehicle interior side wall 31a. Guiding the second wire 53 passing through the through hole 31h of the guide rail 31 directly along the vehicle interior side wall 31a without using the wire guide member 61 would cause rubbing and damage in the second wire 53 with the edge portion (particularly the upper edge) of the through hole 31h. By guiding the second wire 53 at a position away from the vehicle interior side wall 31a to the position spaced away on the vehicle exterior side while supporting the second wire 53 on the bottom surface of the guide groove 61a, it is possible to prevent rubbing of the second wire 53 with the edge portion of the through hole 31h.

Lowering the position of the bottom surface of the guide groove 61a with respect to the vehicle interior side wall 31a (toward the vehicle interior) makes it possible to decrease the entry angle of the second wire 53 from the winding drum 51 side with respect to the through hole 31h, enabling the second wire 53 to be guided to the second section S2 with a smooth trajectory. On the other hand, the second wire 53 is easily rubbed against the edge portion of the through hole 31h. Setting the position of the bottom surface of the guide groove 61a with respect to the vehicle interior side wall 31a higher (toward the vehicle exterior side) would increase the entry angle of the second wire 53 from the winding drum 51 side to the through hole 31h, suppressing occurrence of contact of the second wire 53 against the edge portion of the through hole 31h. This causes, on the other hand, an increase in the degree of bending in the second wire 53 in the second section S2, which might lead to an increase in resistance during driving or the like. In consideration of these conditions, the bottom surface position of the guide groove 61a is set so that the second wire 53 will be smoothly guided from the winding start point P1 of the winding drum 51 to the second section S2, and that the height can be an optimal height that can suppress rubbing of the second wire 53 against the edge portion of the through hole 31h.

Above the wire guide member 61, the second wire 53 extends along the vehicle exterior side surface of the vehicle interior side wall 31a of the guide rail 31 (the bottom surface of the second section S2) (refer to FIGS. 9 and 22). Since the vehicle exterior side surface of the vehicle interior side wall 31a is a smooth surface protrudingly curved toward the vehicle exterior side, the second wire 53 is smoothly guided without being caught or the like.

Subsequently, the second wire 53 is inserted into the wire insertion hole 41i of the wire end support 41g, so as to be connected to the shoe base 41 via the wire end 57 (refer to FIG. 21). The wire insertion hole 41i of the wire end support 41g is a hole having a closed cross-sectional shape without a slit that opens to the side. Therefore, it is preferable, at the time of assembly, to first perform insertion of the second wire 53 into the wire insertion hole 41i (insertion of the end opposite to the wire end 57) and then perform winding of the second wire 53 onto the winding drum 51 and connection.

In the winding drum 51, the starting position of winding (pulling) of the first wire 52 into the spiral groove (illustrated as a winding start point P2 in FIG. 22) is set to the vehicle interior side with respect to the drive shaft 50c that is the center of rotation. As illustrated in FIG. 22, the first wire 52 extends upward from the winding start point P2. The first wire 52 arranged upward from the winding drum 51 is inserted into the guide groove 60b of the wire guide member 60. The deflection of the first wire 52 in the inner and outer peripheral directions is regulated by both side surfaces of the guide groove 60b.

The bottom surface of the guide groove 60b of the wire guide member 60 is a curved surface protruding toward the vehicle exterior side, having a curvature greater than in the vehicle interior side wall 31a. When not held by the wire guide member 60, the trajectory of the first wire 52 connects the winding drum 51 with the guide pulley 54 at the shortest distance on the recess side (on the vehicle interior side) of the guide rail 31 having a shape protruding toward the vehicle exterior side. This virtual wire trajectory is illustrated as a wire short-circuit trajectory 52x in FIG. 22. The bottom surface of the guide groove 60b supports the first wire 52 in a state where the first wire 52 is pushed to the vehicle exterior side with respect to the wire short-circuit trajectory 52x.

As illustrated in FIG. 22, the first wire 52 is further supported by the wire holding member 63 at an intermediate position between the winding drum 51 and the guide pulley 54 in the vertical direction. The deflection of the first wire 52 in the inner and outer peripheral directions is regulated by both side surfaces of the guide groove 63a of the wire holding member 63.

The bottom surface of the guide groove 63a of the wire holding member 63 is a curved surface protruding toward the vehicle exterior side, having a curvature greater than in the vehicle interior side wall 31a. The bottom surface of the guide groove 63a is less distant from the vehicle interior side wall 31a of the guide rail 31 than the bottom surface of the guide groove 60b of the wire guide member 60 (refer to FIG. 22), so as to push the first wire 52 held by the bottom surface of the guide groove 60b further toward the vehicle exterior side.

The first wire 52 whose trajectory has been changed from the wire short-circuit trajectory 52x by the wire guide member 60 and the wire holding member 63 is routed in the vertical direction while maintaining an appropriate distance from the vehicle interior side surface of the vehicle interior side wall 31a of the guide rail 31 curved in a recess (maintaining the position that fits in the third section S3).

Inside the door panel 10a in which the guide rail 31 is exposed without being covered with the inner sash 30, the first wire 52 extends in an exposed state in a vertical direction while maintaining a predetermined distance with the vehicle interior side wall 31a of the guide rail 31.

In the general cross section of the upright pillar sash 12 above the belt line reinforcement 16, the first wire 52 passes through the third section S3 surrounded by the frame part 30a of the inner sash 30 and by the vehicle interior side wall 31a of the guide rail 31 (refer to FIG. 9). The wire holding member 63, housed in the third section S3 at the general cross section, reliably guides the first wire 52 (refer to FIG. 14). In the door corner part 10d where the connecting member 35 is provided instead of the frame part 30a of the inner sash 30, the first wire 52 continues to pass through the third section S3 surrounded by the second frame part 35b and by the vehicle interior side wall 31a (refer to FIG. 17).

Then, the first wire 52 that has reached near the upper end of the guide rail 31 is looped around a wire guide groove on the outer periphery of the guide pulley 54. As described above, the guide pulley 54 is provided at a position straddling the second section S2 and the third section S3 via the through hole 31i of the guide rail 31. Therefore, the first wire 52 that extends upward on the third section S3 side and that has been guided to the guide pulley 54 reverses the extending direction along the wire guide groove of the guide pulley 54 so as to go downward in the second section S2. In other words, one end and the other end of the winding region of the first wire 52 with respect to the wire guide groove of the guide pulley 54 (a winding start point Q1 and a winding start point Q2 illustrated in FIGS. 16 and 23) are arranged in the second section S2 and the third section S3 respectively in a substantially symmetrical positional relationship with respect to the pulley pin 62a.

The first wire 52 extending downward from the winding start point Q2 of the guide pulley 54 is inserted into the wire insertion hole 41h of the wire end support 41f in the second section S2, so as to be connected to the shoe base 41 via the wire end 55 (refer to FIG. 21). The wire insertion hole 41h of the wire end support 41f is a hole having a closed cross-sectional shape without a slit that opens to the side. Therefore, it is preferable, at the time of assembly, to first perform insertion of the first wire 52 into the wire insertion hole 41h (insertion of the end opposite to the wire end 55) and then perform winding of the first wire 52 onto the guide pulley 54 and the winding drum 51 and connection.

When the first wire 52 and the second wire 53 are routed as described above, the compression spring 56 and the compression spring 58 press the wire end 55 and the wire end 57 in mutual approaching directions, producing a predetermined tension applied to the wire 52 and 53, respectively. Thereby, the slider 45 connected to the wires 52 and 53 is stabilized, leading to high accuracy holding and elevating/lowering of the window glass W whose position is controlled via the slider 45.

As illustrated in FIG. 21, the shoe base 41 houses 56 and 57 and compression springs 56 and 58 between the wire end support 41f and the wire end support 41g. Only the opposite end portions of the two wire end supports 41f and 41g (the surfaces with which the end surfaces of the wire end 55 and the wire end 57 come in contact) constitute the housing portion, with no side walls surrounding the side surfaces of the wire end 55 or wire end 57. This makes it possible to establish a wire connection structure with a very compact and simple configuration.

As illustrated in FIG. 21, each of the wire end supports 41f and 41g has a length in the vertical direction greater than the width of the end surface with which the wire ends 55 and 57 come in contact. That is, the support length for each of the wires 52 and 53 by the wire insertion holes 41h and 41h has been increased. By maintaining the linearity of each of the wires 52 and 53 by the wire insertion holes 41h and 41h having a long support length, it is possible to obtain an effect of suppressing the lateral deflection of the wire ends 55 and 57 located immediately adjacent to the wires.

In a state where the wire end supports 41f and 41g are inserted into the second section S2 of the guide rail 31, the inner surfaces (the vehicle interior side wall 31a, the outer peripheral side wall 31c, the cover wall 31e, and the partition wall 31f) of the second section S2 surrounds the sides of the wire ends 55 and 57 to suppress deflection. As illustrated in FIG. 17, there is a clearance of a predetermined size between the inner surface of the second section S2 and the wire end 55 (or the wire end 57), and thus the positions of the wire ends 55 and 57 are not strictly determined. Still, it is possible to prevent excessive displacement of the wire ends 55 and 57 such as deviation from the extended upper positions of the wire end supports 41f and 41g by the presence of the inner surface of the second section S2.

As described above, the wire connection structure in the shoe base 41 can be realized with a minimum configuration (driving force transmitting portion) that receives the traction force by the contact of the end surfaces of the wire ends 55 and 57 in the extending direction of the wires 52 and 53. In particular, the window regulator 40 of the present embodiment houses most of the elevating/lowering mechanism excluding the motor unit 50 in the internal space of the vertically elongated upright pillar sash 12. For this reason, it is extremely effective in terms of space efficiency to complete the wire connection structure in the elongated space between the opposing surfaces of the wire end supports 41f and 41g that are vertically separated from each other. Specifically, the cross-sectional area of the second section S2 that houses the wire end supports 41f and 41g can be downsized. This makes it possible to perform parallel arrangement of the first section S1 into which the shoes 43 and 44 are inserted and the second section S2 through which the wires 52 and 53 are inserted without increasing the width of the frame part 30a in the inner and outer peripheral directions. In addition, since the second section S2 is also compact in the vehicle interior and exterior directions, it is also possible to perform parallel arrangement of the second section S2 and the third section S3 through which the wires 52 and 53 are inserted within a dimension with a limited depth ranging from the window glass W to the vehicle interior side wall 30d of the frame part 30a (vehicle interior side wall 35e of the second frame part 35b).

When assembling the window regulator 40, it is preferable from the viewpoint of workability that the work is performed in a state where the wires 52 and 53 are loosened and the final tension is applied to the wires 52 and 53 as late as possible. In the manufacture of the window regulator 40 of the present embodiment, the wires 52 and 53 are tensioned by attaching the wire holding member 63 after general parts assembling and wire arrangement are performed. As described above, the wire holding member 63 supports the first wire 52 at a position on the vehicle exterior side (inside the recess) of the wire short-circuit trajectory 52x connecting the winding drum 51 and the guide pulley 54 at the shortest distance, on the recessed side (vehicle interior side) of the curved guide rail 31. That is, the tension of the first wire 52 is increased by changing the wiring trajectory of the first wire 52 toward the vehicle exterior side and increasing the actual trajectory of the first wire 52 to be longer than the wire short-circuit trajectory 52x.

On the recessed side (on the vehicle interior side) of the guide rail 31, the wire guide member 60 also supports the first wire 52 in addition to the wire holding member 63. For this reason, even when the wire holding member 63 is not attached, a certain level of tension is applied to each of the wires 52 and 53 at a stage where the wire guide member 60 has been attached. Excessively loose states of the wires 52 and 53 would lead to dislocation of the wires from the guide pulley 54 or the like, causing deterioration in the assemblability. However, with the presence of the wire guide member 60, it is possible to proceed with the work in a state where the wires 52 and 53 are appropriately stabilized. In addition, it is only necessary to press a small amount of the first wire 52 preliminarily supported by the wire guide member 60 in assembling the wire holding member 63 in the final stage, leading to excellent assembling property of the wire holding member 63.

Figure 14:
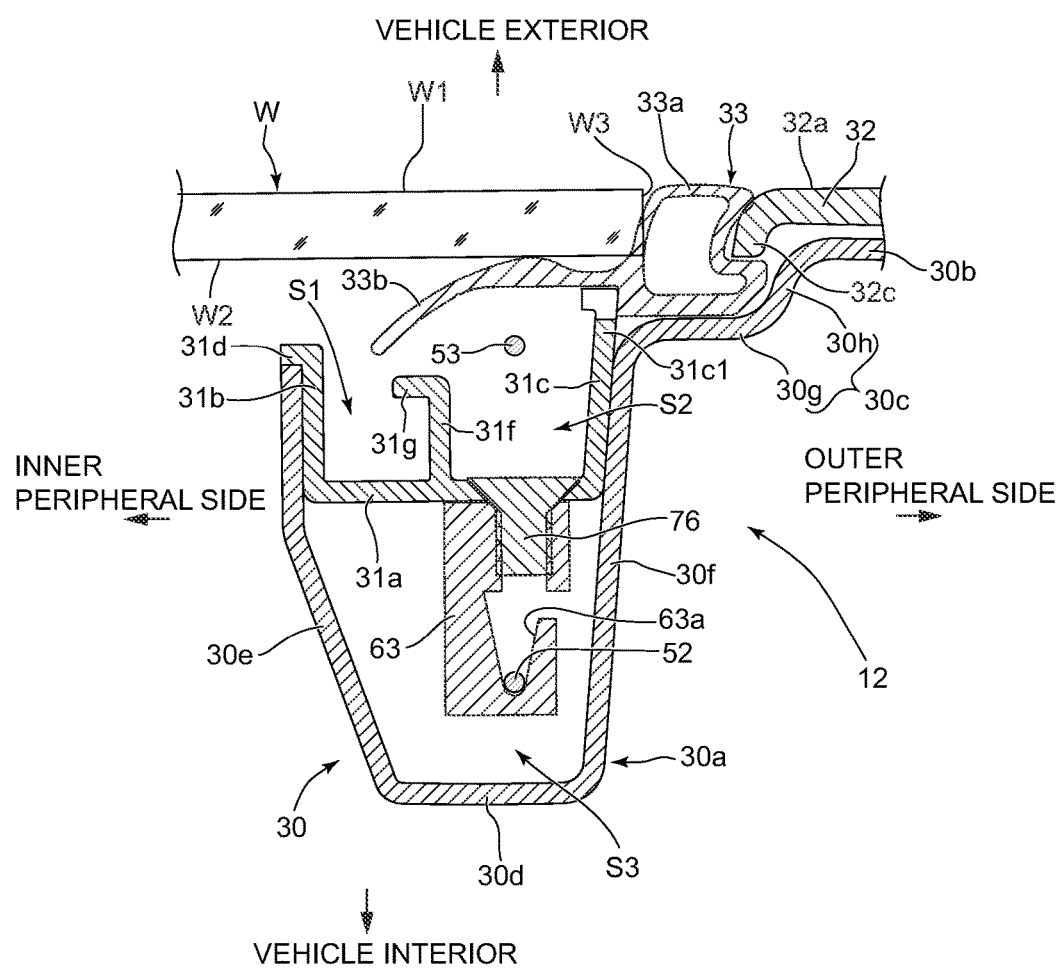
FIG. 14 is a cross-sectional view of the upright pillar sash at a position along line XIV-XIV in FIG. 22.
Figure 19:
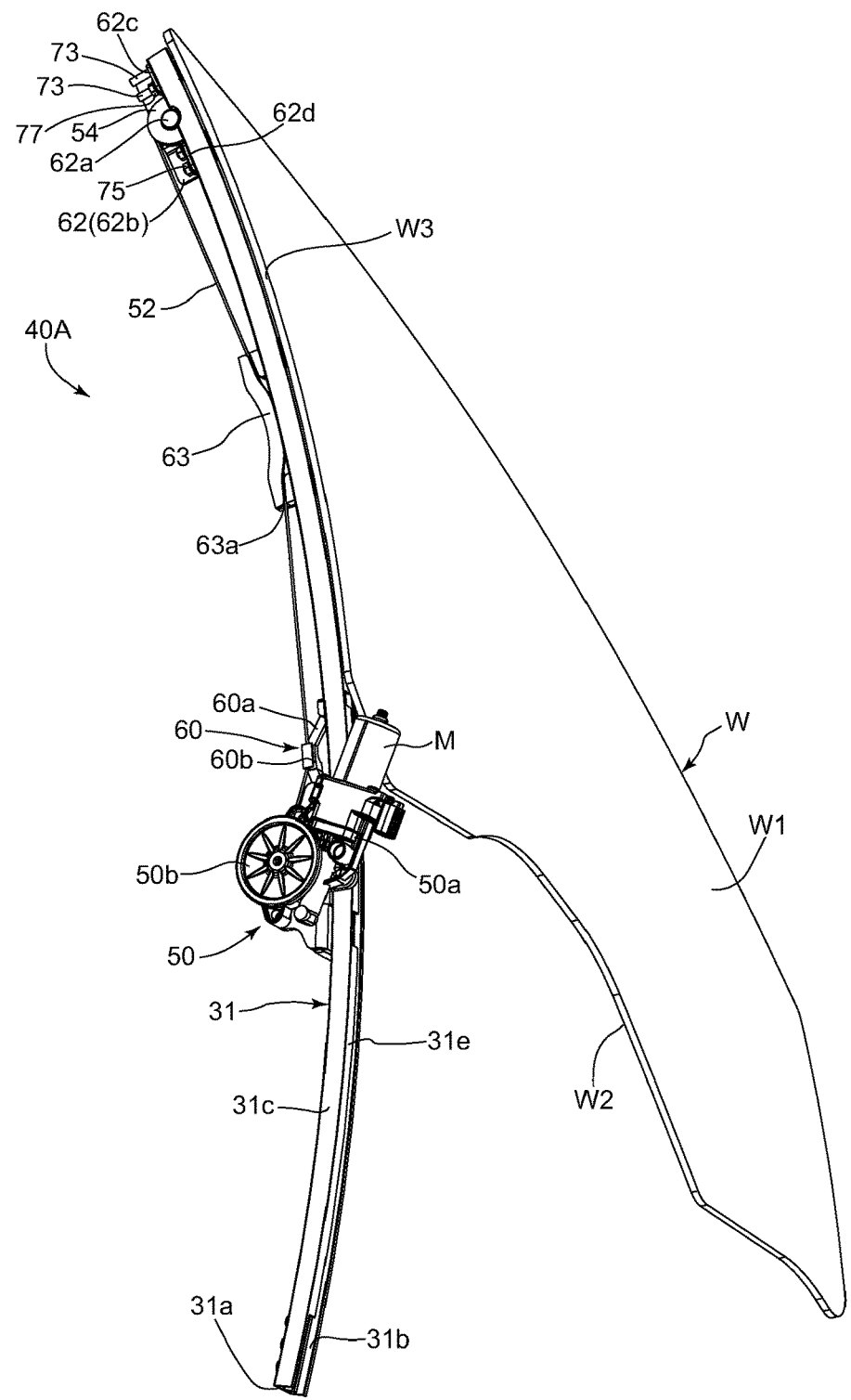
FIG. 19 is a perspective view of a window regulator assembly.

The wire holding member 63 is housed in the third section S3 in a state where the upright pillar sash 12 is completed (refer to FIG. 14). Therefore, the assembly of the components of the window regulator 40 including the wire holding member 63 is to be completed before assembling the guide rail 31 with the inner sash 30 and the connecting member 35. FIG. 19 illustrates a regulator assembly 40A in this state. The regulator assembly 40A has already been completed as a functional part for moving (elevating/lowering) the window glass W along the guide rail 31. Therefore, it is possible to perform operation check, inspection, shipment (sales), maintenance, or the like in the state of the regulator assembly 40A.

Note that the connecting member 35 is not attached in the regulator assembly 40A illustrated in FIG. 19. Therefore, the upper bolt 73 (refer to FIGS. 18 and 23) of the pair of bolts 73 for fastening the support seat 62c of the pulley bracket 62 is not secured to the screw hole 35p of the connecting member 35. However, the lower bolt 73 is screwed into the nut 77 and thus, the support seat 62c is stably secured to the guide rail 31.

Figure 24:
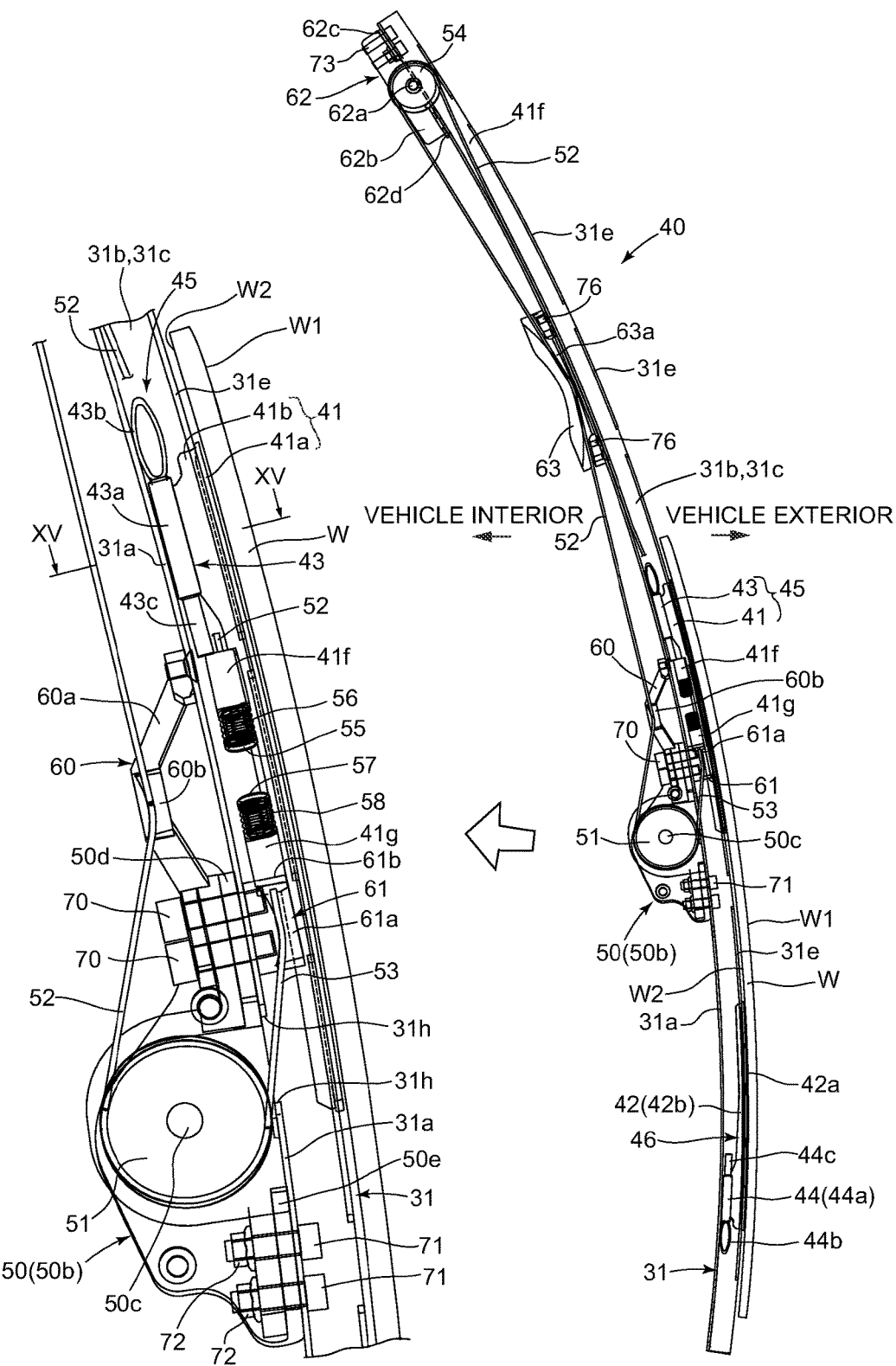
FIG. 24 is a partially see-through rear view of the window regulator in a fully open state of window glass.

FIGS. 20, 23, and 24 illustrate a state where the window glass W is elevated and lowered by the window regulator 40 having the above configuration. The solid line in FIG. 20 illustrates the fully closed position (top dead center) where the window glass W rises most, while the two-dot chain line in FIG. 20 illustrates the fully open position (bottom dead center) where the window glass W descends most. FIG. 23 illustrates a state of the window regulator 40 when the window glass W is fully open, while FIG. 24 illustrates a state of the window regulator 40 when the window glass W is fully open.

As illustrated in FIG. 23, the shoe 43 of the upper slider 45 reaches near the upper end of the guide rail 31 when the window glass W is in the fully closed position. Although the guide pulley 54 is provided near the upper end of the guide rail 31, the first section S1 in which the shoe 43 is inserted and the second section S2 in which the guide pulley 54 is disposed are separately arranged in parallel in the inner and outer peripheral directions, and thus, the shoe 43 and the guide pulley 54 will not interfere with each other.

At the fully closed position of the window glass W, as illustrated in FIG. 23, the upper wire end support 41f provided on the slider 45 is located immediately below the guide pulley 54 (winding start point Q1). In the slider 45, the wire end support 41f is provided so as to be shifted downward with respect to the shoe 43 (shoe support 41c) (refer to FIG. 21). Therefore, it is possible to position the wire end support 41f directly below the guide pulley 54 in a state where the shoe 43 has reached a position in parallel with the guide pulley 54 as described above. That is, individual elements of the drive system can be housed with high space efficiency in the vicinity of the upper end of the guide rail 31 without impairing the smooth routing of the first wire 52 around the guide pulley 54.

Furthermore, the upper part of the upper slider 45 is located near the upper end of the upright pillar sash 12 (door corner part 10d), while the lower part of the lower slider 46 is located near the belt line reinforcement 16 (refer to FIG. 1), so as to support the window glass W over substantially the entire area of the upright pillar sash 12 in the vertical direction. This makes it possible to stably support the window glass W with extremely high accuracy, leading to improvement of the fall resistance of the window glass W in the vehicle front-rear directions and the vehicle interior and exterior directions.

As illustrated in FIG. 24, at the fully open position of the window glass W, the lower end surface of the lower wire end support 41g of the shoe base 41 constituting the slider 45 comes in contact with the stopper surface 61b of the wire guide member 61 so as to regulate further lowering of the window glass W. That is, the wire guide member 61 also functions as a mechanical stopper that determines the downward moving end of the window regulator 40.

Even in the fully open position, the window glass W is supported in a wide range in the vertical direction within the door panel 10a with respect to the guide rail 31, leading to achievement of high support accuracy and stability of the window glass W similar to the case of the fully closed position described above.

As described above, in the door 10 of the present embodiment, of the window regulator 40, the components of the elevating/lowering mechanism for transmitting the driving force of the motor M, which is the drive source, to the window glass W are incorporated in the upright pillar sash 12. This configuration improves the space efficiency and layout flexibility around the door panel 10a as compared with the existing configuration in which the window regulator is arranged in the internal space of the door panel 10a below the window opening 10c. For example, the degree of freedom in door trim shape setting on the door inner surface side will be enhanced. In addition, the shape of the door inner surface closer to the vehicle exterior side makes it possible to improve the ease of stride when getting on and off the vehicle. Furthermore, increasing the internal space of the door panel 10a leads to acquisition of a space for arranging functional components other than the window regulator or improvement of the assemblability of components into the door panel 10a.

Figure 26:
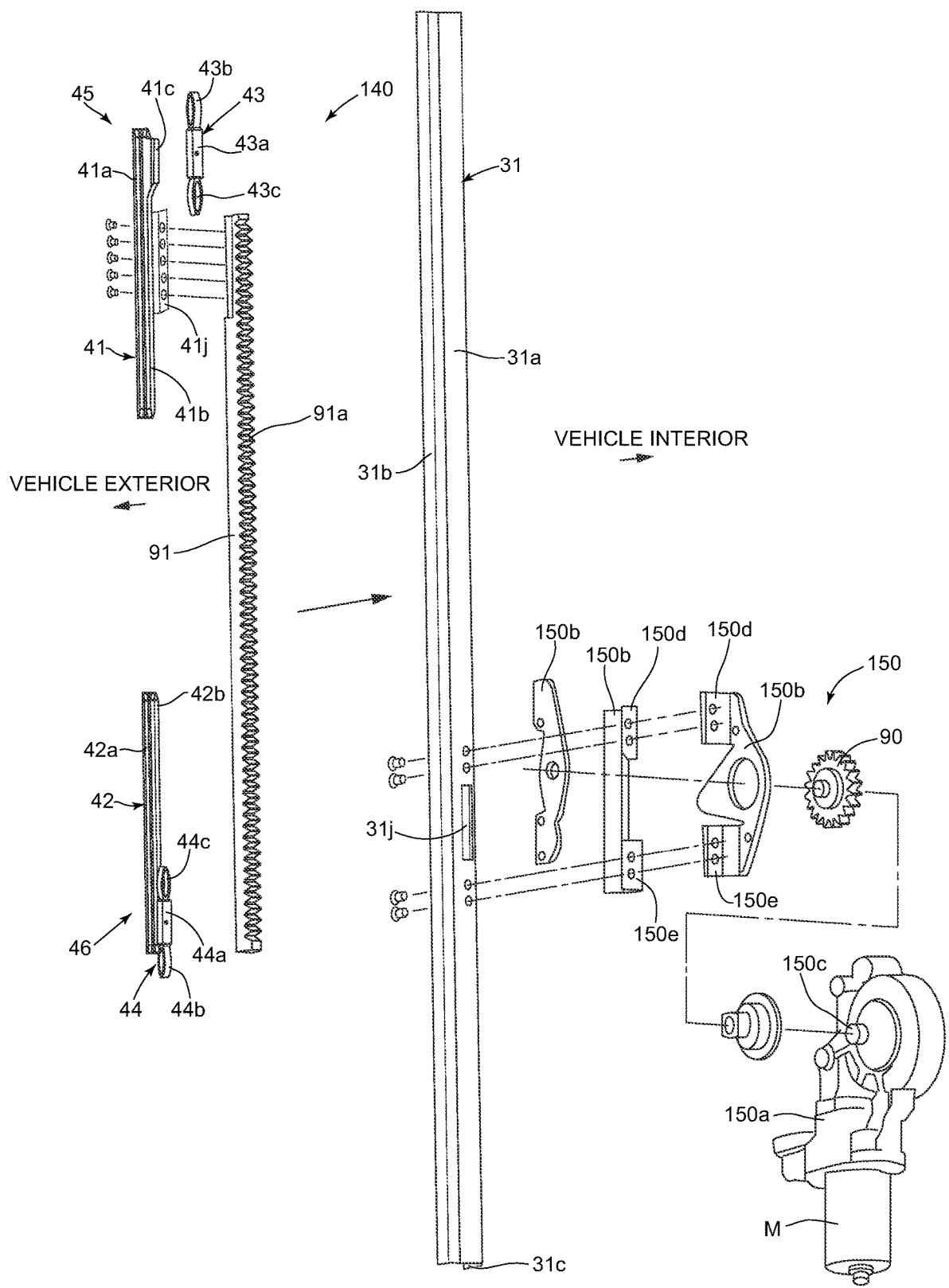
FIG. 26 is an exploded perspective view of a window regulator according to a second embodiment.
Figure 27:
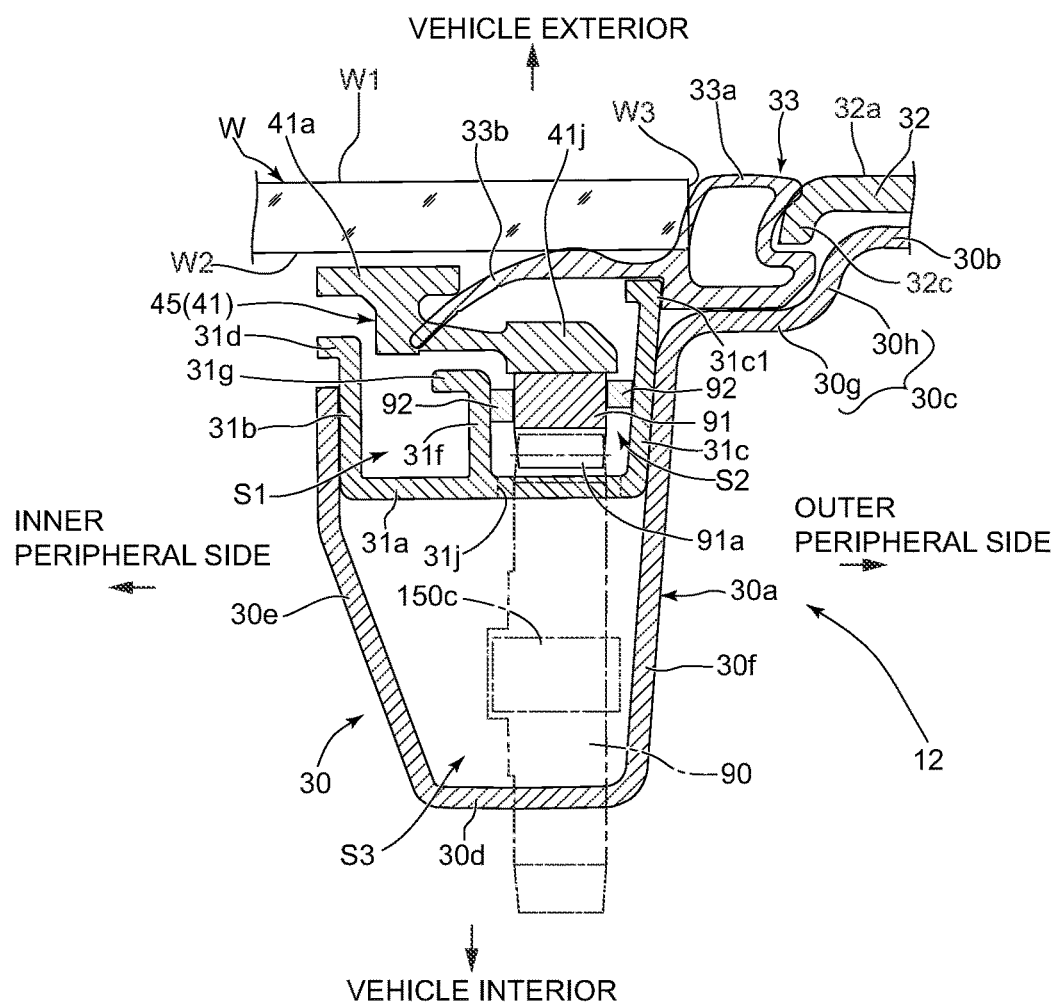
FIG. 27 is a cross-sectional view of the window regulator according to the second embodiment.

FIGS. 26 and 27 illustrate a window regulator 140 according to a second embodiment. While the window regulator 40 of the previous embodiment includes a wire type transmission mechanism, the window regulator 140 includes a rack and pinion type transmission mechanism. Other configurations are similar to the previous embodiment, and the common parts are denoted by the same reference numerals as in the previous embodiment, and description thereof is omitted.

As illustrated in FIG. 26, a motor unit 150 constituting the window regulator 140 is attached to the guide rail 31 at substantially the same position as the motor unit 50 of the previous embodiment (that is, inside the door panel 10a). The motor unit 150 includes a drive unit 150a having a motor M, and a pinion support member 150b that rotatably supports a pinion 90. The pinion 90 is connected to a drive shaft 150c, and rotational driving force is transmitted from the drive unit 150a via the drive shaft 150c. The pinion support member 150b is fastened and secured by bringing upper and lower brackets 150d and 150e into contact with the vehicle interior side wall 31a of the guide rail 31 from the vehicle interior side. The pinion 90 supported in this manner is driven to rotate about the drive shaft 150c extending in the inner and outer peripheral directions.

The vehicle interior side wall 31a of the guide rail 31 is provided with a through hole 31j penetrating vehicle interior and exterior directions, formed between positions where the upper and lower brackets 150d and 150e of the pinion support member 150b are to be secured. The through hole 31j is formed at a position where the second section S2 and the third section S3 (refer to FIG. 27) in the upright pillar sash 12 communicate with each other. The pinion 90 partially enters the second section S2 through the through hole 31j. FIG. 27 illustrates the general cross-sectional position of the upright pillar sash 12 above the position of the pinion 90, in which the pinion 90 is virtually represented by a one-dot chain line.

A rack 91 is arranged in the second section S2 in the upright pillar sash 12 (guide rail 31). The rack 91 is a long member extending in the longitudinal direction of the guide rail 31, including teeth 91a facing the vehicle interior side formed continuously in the longitudinal direction. The second section S2 includes a rack guide 92 for enabling stable movement of the rack 91 in the vertical direction (refer to FIG. 27).

The shoe base 41 of the slider 45 is provided with a rack connection part 41j protruding from the connection part 41b to the outer peripheral side, near the center in the longitudinal direction (below the shoe support 41c). The rack connection part 41j extends into the second section S2 and is secured to a vehicle exterior side surface of the rack 91 (a surface on which the teeth 91a are not formed). The part secured to the rack connection part 41j is a part near the upper end of the rack 91.

The rack 91 disposed in the second section S2 extends to the position where the through hole 31j is formed, and the pinion 90 that enters the second section S2 via the through hole 31j meshes with the teeth 91a of the rack 91. When the pinion 90 rotates in the normal or reverse direction by the driving force of the motor M, the meshing rack 91 moves in the vertical direction. The movement of the rack 91 is transmitted to the slider 45 so as to raise or lower the window glass W. The rack 91 has a length that meshes with the pinion 90 in the entire movable range from the fully closed position to the fully open position of the window glass W (refer to FIG. 20).

Similar to the window regulator 40 of the previous embodiment, the window regulator 140 incorporates, into the upright pillar sash 12, components of an elevating/lowering mechanism for transmitting the driving force of the motor M being a drive source to the window glass W. In particular, the transmitting portion for transmitting the driving force to the slider 45 includes merely the pinion 90 and the rack 91, leading to the small number of components, which is advantageous in terms of simplicity of the configuration, facilitated production, or the like.

As described above, in the door 10 of the above embodiment, the guide rail 31 is first incorporated into the upright pillar sash 12, and then the shoe 43 of the slider 45 is positioned within the first section S1 of the guide rail 31, so as to determine the vehicle interior and exterior directions and the inner and outer peripheral directions (intersecting direction that intersects the vehicle interior and exterior directions) of the window glass W at the fully closed position (uppermost position). Unlike elastic holding and deflection suppression using a glass run in the existing door sash, this position regulation is strict positioning in which the solid and rigid sliding base 43a constituting the shoe 43 is brought into contact with the wall of the metal guide rail 31 and thus enables acquisition of highly strict position accuracy and stability of the window glass W. Note that the guide rail 31 is not limited to a metal product and may be formed of another material such as a synthetic resin. Moreover, since the position of the window glass W is directly determined with reference to the wall in the upright pillar sash 12, it is possible to obtain extremely high relative position accuracy between the window glass W and the door sash 10b and facilitates accuracy control as well.

The door 10 of the above-described embodiment is designed to set an outermost surface (the vehicle exterior side surface 32a of the garnish 32) of the vehicle interior side of the upright pillar sash 12 to be substantially flush with the vehicle exterior side surface W1 of the window glass W after the window glass W has been positioned on the vehicle exterior side of the frame part 30a and the guide rail 31 of the upright pillar sash 12 (refer to FIG. 9). Therefore, with the presence of displacement between the mutual positions of the upright pillar sash 12 and the window glass W (displacement in the vehicle interior and exterior directions in particular), this displacement would appear as a displacement on the outer surface of the door, resulting in a poor appearance or a wind noise. Such problems can be prevented by controlling the position of the window glass W by using the position regulating means provided in the upright pillar sash 12.

Moreover, in the above embodiment, the position of the slider 45 with respect to the shoe 43 by the guide rail 31 is regulated at a position near the upper end of the upright pillar sash 12 that is, at the door corner part 10*d*, in the fully closed position of the window glass W. In the fully closed position, the upper edge of the window glass W enters the glass run storage 22 of the upper sash 11, with substantially the entire rear edge of the window glass W running along the upright pillar sash 12. That is, the length of the peripheral edge of the window glass W along the door sash 10*b* is maximized at the fully closed position. Furthermore, reliable waterproofness between the window glass W and the door sash 10*b* and high stability of the window glass W are required particularly in the fully closed position. Therefore, it is particularly advantageous to provide a position regulating means for the window glass W at the door corner part 10*d* where the upper sash 11 and the upright pillar sash 12 meet in ensuring the accuracy and waterproof performance of the window glass W over the entire door sash 10*b*.

In the door 10 of the above embodiment, the guide rail 31 extends not only at the door corner part 10*d* but also over the entire upright pillar sash 12 and inside the door panel 10*a*. By performing high-accuracy positioning of the window glass W with reference to the wall of the guide rail 31 over the entire movable range from the fully closed position to the fully open position of the window glass W, it is possible to improve the sliding stability of the window glass W when it is in the elevating/lowering operation. That is, it is possible to suppress backlash or the like of the window glass W with respect to the upright pillar sash 12 over the entire movable range of the window glass W.

The door 10 of the above embodiment is a type of door (sash door) in which the frame-shaped door sash 10*b* formed of a member different from the door panel 10*a* is provided above the door panel 10*a*. However, the present invention is applicable to other doors. For example, the present invention is also applicable to a type of door in which a door panel and a door sash are integrally formed (an inner full door in which an inner panel and a door sash are integrally formed, a panel door first integrally forming each of an inner panel and an outer panel with each of an inner side and an outer side of a door sash and then combining each of portions), or a type of door (kind of hard top door) having only a portion corresponding to the upright pillar sash 12 without having a portion corresponding to the upper sash 11. By applying the present invention to these doors, it is possible to provide the sash part extending in the elevating/lowering directions of the window glass with a position regulating means that performs positioning in each of directions at the fully closed position of the window glass W. That is, regardless of whether it is integral with or separate from the door panel, or whether it is a form that surrounds the window glass all around, any vehicle door that includes a sash part protruding upward with respect to the door panel would be applicable.

Furthermore, in the above-described embodiment, since the upright pillar sash 12 is longer in the elevating/lowering directions than the front sash 13, it is preferable that the glass position regulating means that performs positioning in each of directions at the fully closed position of the window glass W is provided on the upright pillar sash 12 side. However, in the case of a vehicle door having a sufficient length on the front sash, the glass position regulating means may be provided on the front sash side. Alternatively, in the case of a vehicle door having a division bar that separates a window opening that is opened and closed by the window glass elevated or lowered from a fixed window frame that is closed by a fixed window, it is possible to provide a glass position regulating means in the division bar. That is, in these cases, the front sash and the division bar correspond to the sash part of the present invention.

In the above embodiment, all the components of the window regulators 40 or 140 are assembled to the guide rail 31 incorporated in the upright pillar sash 12 and the connecting member 35 constituting the door corner part 10*d*. In contrast, a part other than the parts (in the above embodiment, the guide rail 31 and the sliders 45 and 46) related to positioning of the window glass W can be arranged in another position of the door 10. For example, a motor that is a drive source in the elevating/lowering directions, a wire mechanism or a rack and pinion mechanism that transmits a driving force to the window glass W can also be assembled to the door panel 10*a*.

In the above-described embodiment, the first elastic contact parts 43*b* and 44*b* and the second elastic contact parts 43*c* and 44*c* provided on the shoes 43 and 44 that slide with respect to the guide rail 31 are both elongated ring-shaped bodies. Alternatively, the elastic contact parts provided on the shoes 43 and 44 may be changed to a cantilever shape or the like. The elastic contact part is biased so as to always come in contact with the inner wall surface of the guide rail 31 to suppress backlash of the shoes 43 and 44. Therefore, the elastic contact part having a cantilever shape arranged only in the biasing direction would be able to obtain necessary functions.

In the door sash 10*b* of the above-described embodiment, the upper sash 11 and the upright pillar sash 12 are connected by the connecting member 35 at the door corner part 10*d*. However, the present invention is also applicable to the door sash in which the upper sash and the upright pillar sash are directly joined at the door corner part.

The above embodiment is applied to the side door attached to the side of the right front seat of the vehicle, but can be applied to other doors.

Furthermore, although individual embodiments of the present invention have been described, it is allowable, as another embodiment of the present invention, to combine the above-described embodiments and modifications in whole or in part.

The embodiments of the present invention are not limited to the above embodiments and modifications, and may be changed, replaced, or modified in various manners without departing from the spirit of the technical idea of the present invention. Furthermore, the technical idea of the present invention may be implemented in another practical possible way by another advanced or derived technology. Therefore, the claims cover all embodiments that can be included in the scope of the technical idea of the present invention.

INDUSTRIAL APPLICABILITY

According to the present invention, it is possible to obtain a vehicle door window glass support structure which is excellent in the position accuracy of a window glass with respect to a sash part, so as to be useful especially for the vehicle door aiming at the improvement of appearance quality.

REFERENCE SIGNS LIST

10 Door
10*a* Door panel
10*b* Door sash
10*c* Window opening
10*d* Door corner part
11 Upper sash
12 Upright pillar sash (sash part)
13 Front sash 20 Sash body
20a Frame part
21 Sash molding
22 Glass run storage
23 Glass run
24 weather-strip holder
30 Inner Sash
30a Frame part
30b Design part
30c Step part
30d Vehicle interior side wall
30e Inner peripheral side wall
30f Outer peripheral side wall
30g Outer peripheral extension
30h Vehicle exterior extension
30i Side contact surface
31 Guide rail (glass position regulating means)
31a Vehicle interior side wall (glass position regulating means)
31b Inner peripheral side wall (glass position regulating means)
31c Outer peripheral side wall
31c1 Positioning part
31d Bent part
31e Cover wall
31f Partition wall (glass position regulating means)
31g Holding wall (glass position regulating means)
31h Through hole
31i Through hole
31j Through hole
32 Garnish
32a Vehicle exterior side surface
32b Vehicle interior side surface
32c Inner peripheral edge
32c1 Positioning part
32d Outer peripheral edge
32e Inner peripheral side surface
32f Outer peripheral side surface
32g End surface
33 Elastic cover
33a Hollow part
33b Lip part
33c Vehicle exterior side wall
33d Inner peripheral side wall
33e Outer peripheral side wall
33f Outer peripheral protruding wall
33g Vehicle interior side wall
33h Inner peripheral side base wall
33i Outer peripheral side base wall
33j Vehicle interior side surface
33k Vehicle exterior side surface
35 Connecting member
35a First frame part
35b Second frame part
35c Contact end surface
35d Insertion projection
35e Vehicle interior side wall
35f Inner peripheral side wall
35g Outer peripheral side wall
35h Bent part
35i Plate part
35j Insertion projection
35k Step part
35m Thick part
35n Escape recess
35p Screw hole
36 Inner cover
40 Window regulator
40A Regulator assembly
41 Shoe base
41a Glass support (glass securing part)
41b Connection part
41c Shoe support
41d Load reduction part
41e Load reduction part
41e1 Tapered surface
41e2 Tapered surface
41f Wire end support
41g Wire end support
41h Wire insertion hole
41i Wire insertion hole
41j Rack connection part
42 Shoe base
42a Glass support (glass securing part)
42b Connection part
42c Shoe support
42e Load reduction part
43 Shoe (sliding part)
43a Sliding base
43b First elastic contact part
43c Second elastic contact part
44 Shoe (sliding part)
44a Sliding base
44b First elastic contact part
44c Second elastic contact part
45 Slider
46 Slider
50 Motor unit
50a Drive unit
50b Drum housing
50c Drive shaft
51 Winding drum
52 First wire
52x Wire short-circuit trajectory
53 Second wire
54 Guide pulley
55 Wire end
56 Compression spring
57 Wire end
58 Compression spring
60 Wire guide member
60a Arm part
60b Guide groove
61 Wire guide member
61a Guide groove
61b Stopper surface
62 Pulley bracket
62a Pulley pin
62b Pulley support
62c Support seat
62d Support seat
63 Wire holding member
63a Guide groove
73 Bolt
80 Upper die
81 Lower die
90 Pinion
91 Rack
92 Rack guide
140 Window regulator
150 Motor unit
150a Drive unit
150b Pinion support member
150c Drive shaft L1 Parting line
M Motor
S1 First section (guide section)
S2 Second section
S3 Third section
U1 Holding recess
U2 Gap
W Window glass
W1 Vehicle exterior side surface
W2 Vehicle interior side surface
W3 Edge surface

The invention claimed is:

1. A vehicle door window glass support structure comprising:
a sash part protruding upward with respect to a door panel; and window glass that is elevated or lowered along the sash part,
wherein the sash part includes a glass position regulating means including a guide rail extending in a longitudinal direction of the sash part and a slider that is secured to the window glass and slidably inserted into the guide rail,
wherein the guide rail and the slider determine the position of the window glass in both vehicle interior and exterior directions and an intersecting direction that intersects the vehicle interior and exterior directions at least at a position where the window glass is elevated most,
wherein the vehicle door window glass support structure includes a transmission mechanism connected to the slider that transmits a driving force from a drive source to the window glass,
wherein the guide rail includes a guide section that is provided in the sash part and is surrounded by a first pair of walls arranged opposite the vehicle interior and exterior directions and a second pair of walls arranged opposite the intersecting direction so as to be continuous to the longitudinal direction of the sash part,
wherein the position of the window glass is determined by the slider and the walls of the guide section,
wherein the guide rail includes a second section that is provided adjacent to the guide section in the intersecting direction that intersects the vehicle interior and exterior directions, and
the transmission mechanism is provided in the second section.

2. The vehicle door window glass support structure according to claim 1,
wherein the guide rail is open toward the vehicle exterior side, and the window glass is positioned on the vehicle exterior side of the guide rail, and
the slider includes: a glass securing part secured to a vehicle interior side surface of the window glass arranged opposite an open portion of the guide rail; and a sliding part located at vehicle interior side with respect to the glass securing part so as to be slidably disposed in the guide section.

3. The vehicle door window glass support structure according to claim 2,
wherein the sliding part includes:
a sliding base having a solid structure that brings an outer surface into contact with the walls forming the guide section;
a first elastic contact part that is provided at a position in the longitudinal direction of the sash part with respect to the sliding base, and is configured to elastically and deformably contact at least one of the first pair of walls; and
a second elastic contact part that is provided at another position, different from the position of the first elastic contact part, in the longitudinal direction of the sash part with respect to the sliding base, and is configured to elastically and deformably contact at least one of the second pair of walls.

4. The vehicle door window glass support structure according to claim 1,
wherein a door sash surrounding a window opening opened and closed by the window glass is provided above the door panel, and the sash part is an upright pillar sash extending downward from an end of an upper sash located at an upper edge of the door sash, and
the intersecting direction is inner and outer peripheral directions of the door sash that defines the window opening as an inner peripheral side.

* * * * *